(12) United States Patent
Norrie

(10) Patent No.: US 8,161,210 B1
(45) Date of Patent: *Apr. 17, 2012

(54) MULTI-QUEUE SYSTEM AND METHOD FOR DESKEWING SYMBOLS IN DATA STREAMS

(75) Inventor: Christopher I. W. Norrie, San Jose, CA (US)

(73) Assignee: Integrated Device Technology Inc., San Jose, CA (US)

( * ) Notice: Subject to any disclaimer, the term of this patent is extended or adjusted under 35 U.S.C. 154(b) by 782 days.

This patent is subject to a terminal disclaimer.

(21) Appl. No.: 12/264,158

(22) Filed: Nov. 3, 2008

(51) Int. Cl.
*G06F 3/03* (2006.01)
(52) U.S. Cl. .......................................... 710/65; 710/33
(58) Field of Classification Search ...................... 710/71
See application file for complete search history.

(56) References Cited

U.S. PATENT DOCUMENTS

| | | | |
|---|---|---|---|
| 6,628,679 B1 * | 9/2003 | Talarek | 370/536 |
| 6,690,757 B1 | 2/2004 | Bunton et al. | |
| 6,865,231 B1 | 3/2005 | Bunton et al. | |
| 6,961,347 B1 | 11/2005 | Bunton et al. | |
| 6,985,502 B2 | 1/2006 | Bunton et al. | |
| 7,010,607 B1 | 3/2006 | Bunton et al. | |
| 7,082,504 B2 | 7/2006 | Rojas et al. | |
| 7,092,629 B2 | 8/2006 | Bunton et al. | |
| 7,197,100 B2 * | 3/2007 | Bunton et al. | 375/372 |
| 7,230,549 B1 | 6/2007 | Woodral et al. | |
| 7,242,736 B2 | 7/2007 | Schanke et al. | |
| 7,406,616 B2 * | 7/2008 | Hendrickson et al. | 713/500 |
| 7,467,335 B2 * | 12/2008 | Otto et al. | 714/700 |
| 7,549,074 B2 * | 6/2009 | Charath et al. | 713/503 |
| 7,599,459 B2 | 10/2009 | Okuyama | |
| 7,672,340 B2 * | 3/2010 | Schoch et al. | 370/535 |
| 7,809,969 B2 | 10/2010 | Das Scharma et al. | |
| 2007/0177701 A1 * | 8/2007 | Thanigasalam | 375/372 |

* cited by examiner

*Primary Examiner* — Cheng-Yuan Tseng
(74) *Attorney, Agent, or Firm* — Kenneth Glass; Stanley J. Pawlik; Glass & Associates

(57) ABSTRACT

A communication system includes a transmitter that transmits multiple data streams to a receiver in the communication system. Each of the data streams includes data and a skip ordered set. The receiver includes a deskew unit for each data stream, each of which includes multiple data queues. Each of the deskew units stores symbols of the data stream received by the deskew unit into the data queues of the data unit by distributing the symbols among the data queues. The deskew unit aligns data symbols across the data streams by deskewing symbols stored in the data queues of the deskew units based on skip ordered sets in the deskew units. Moreover, the receiver may deskew more than one symbol per clock cycle.

14 Claims, 34 Drawing Sheets

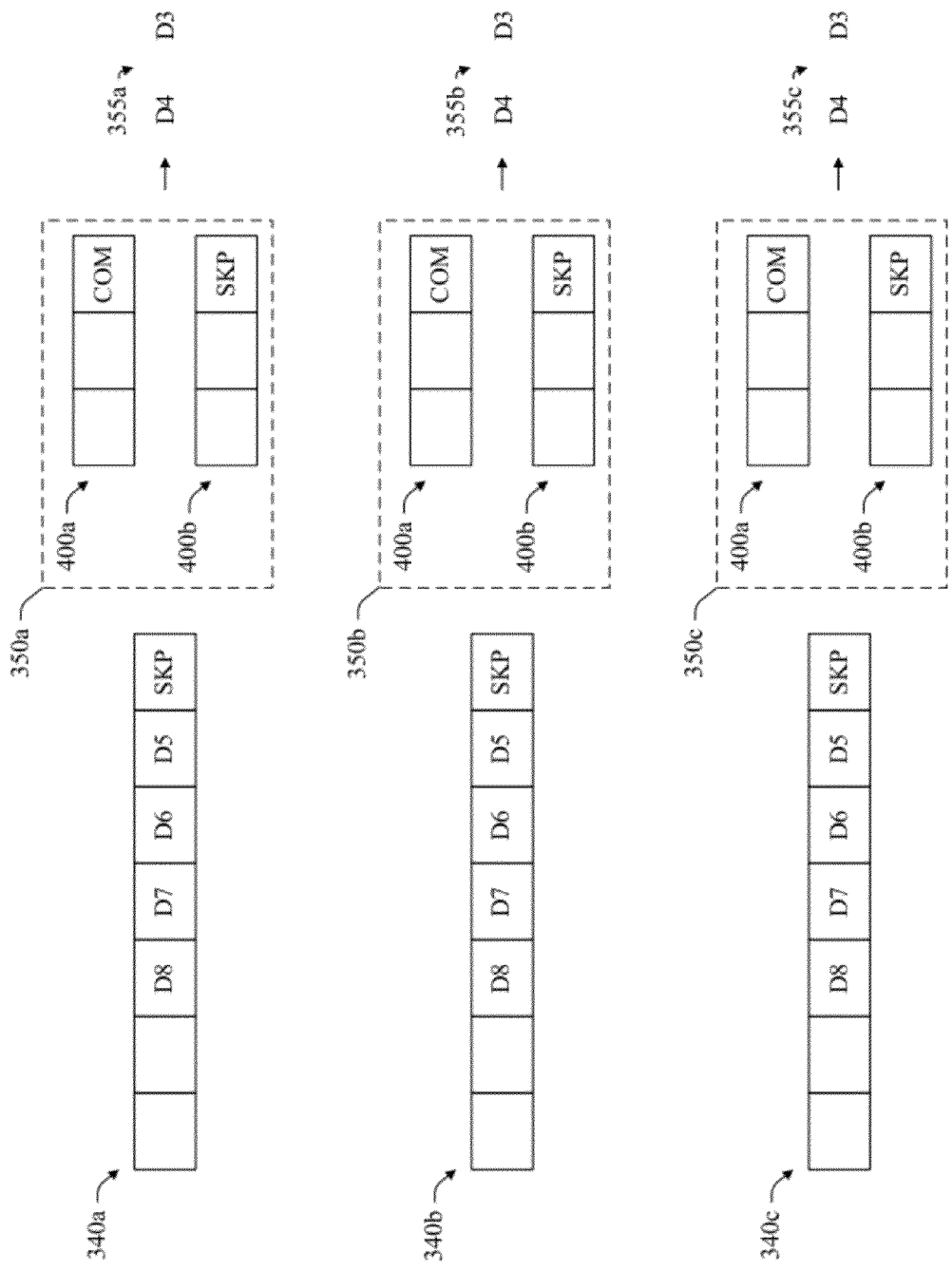

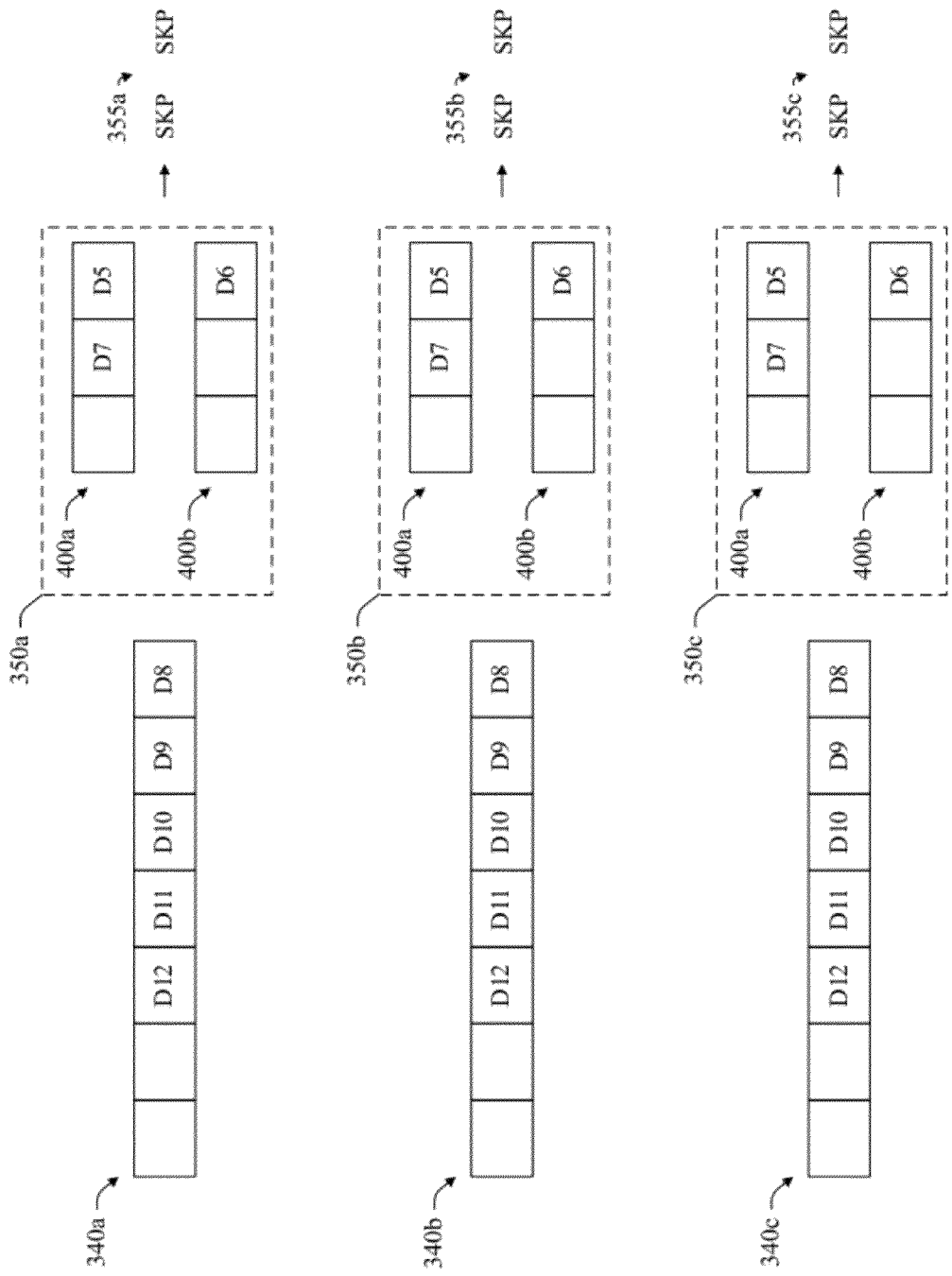

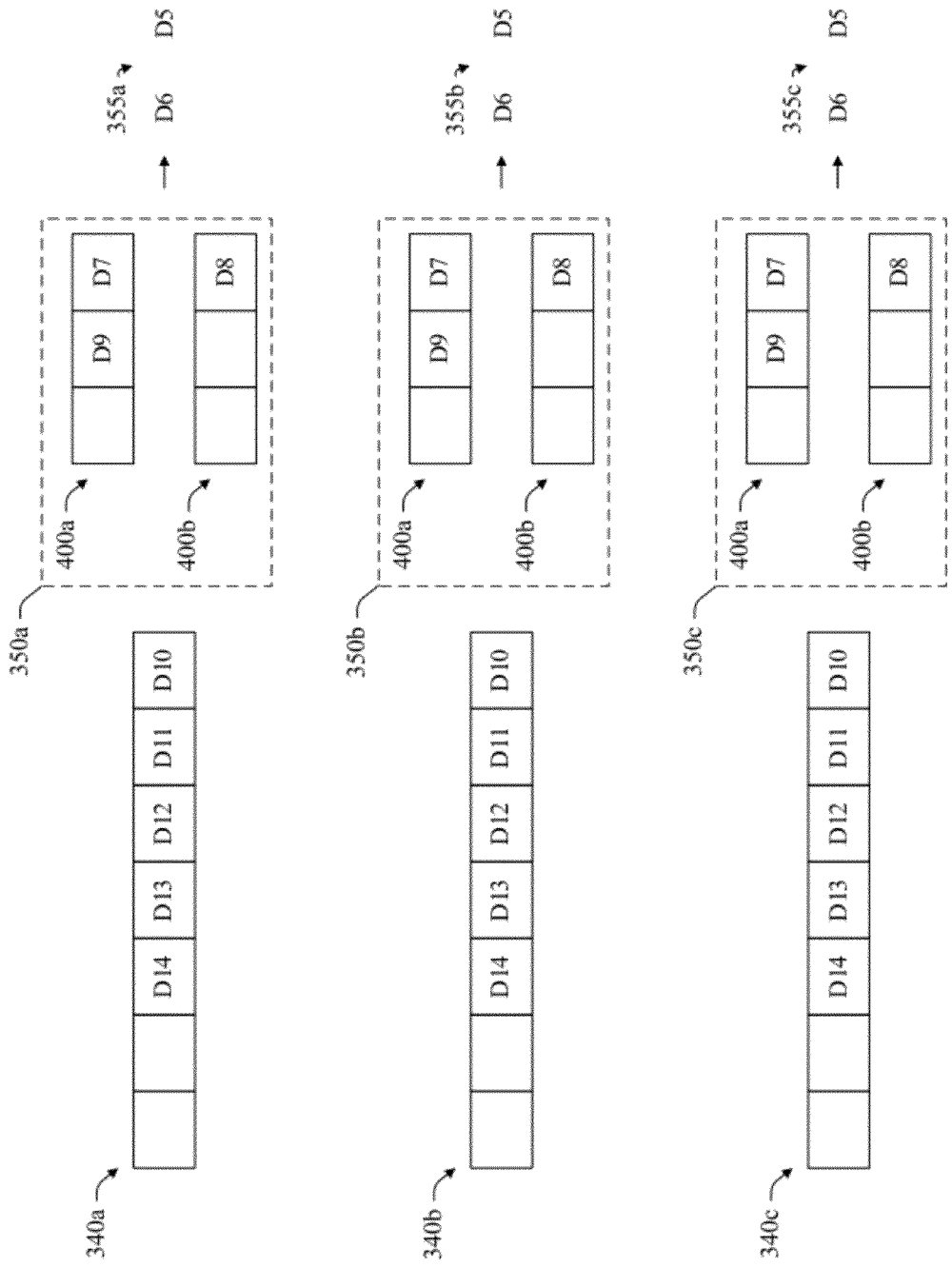

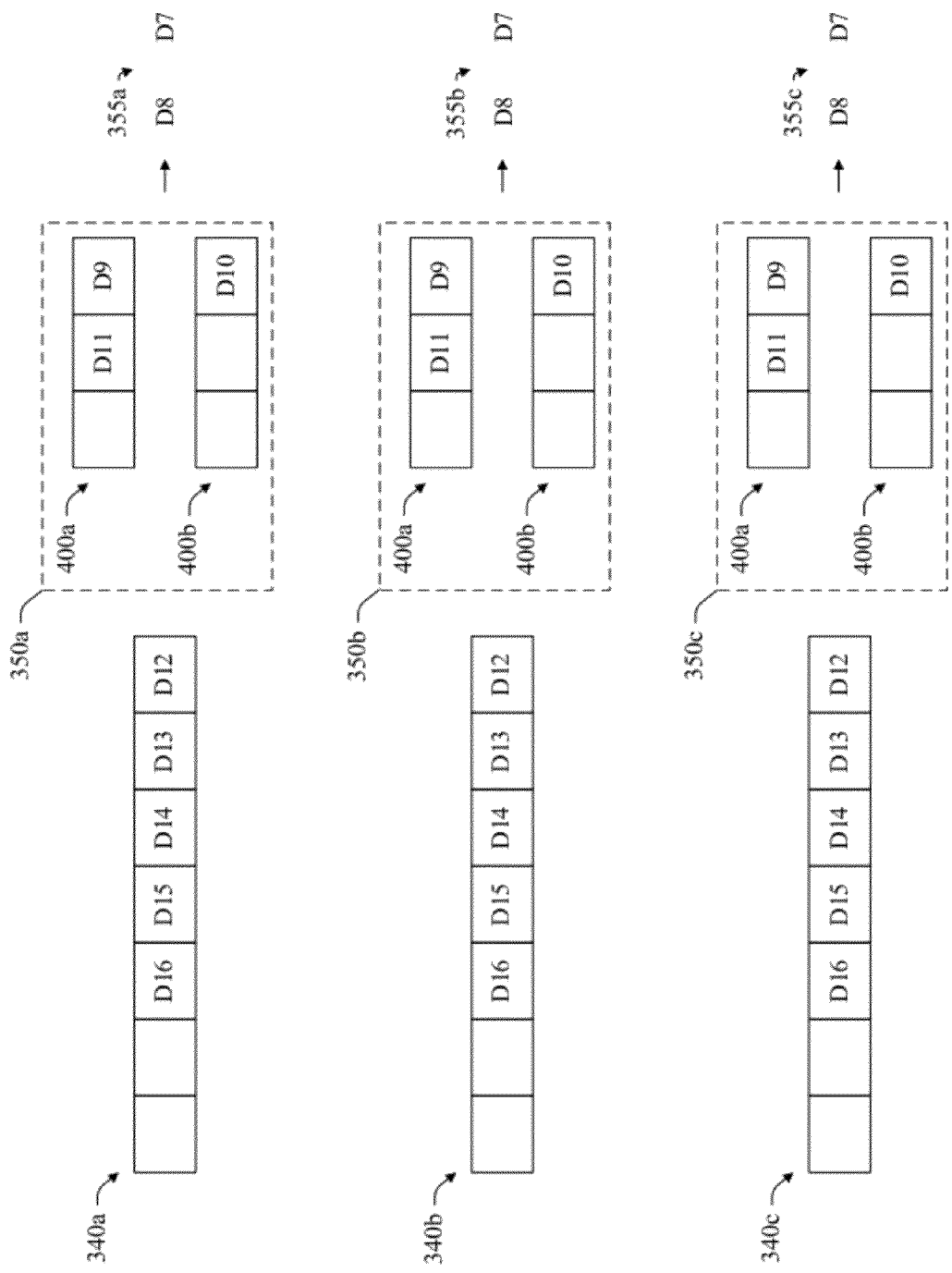

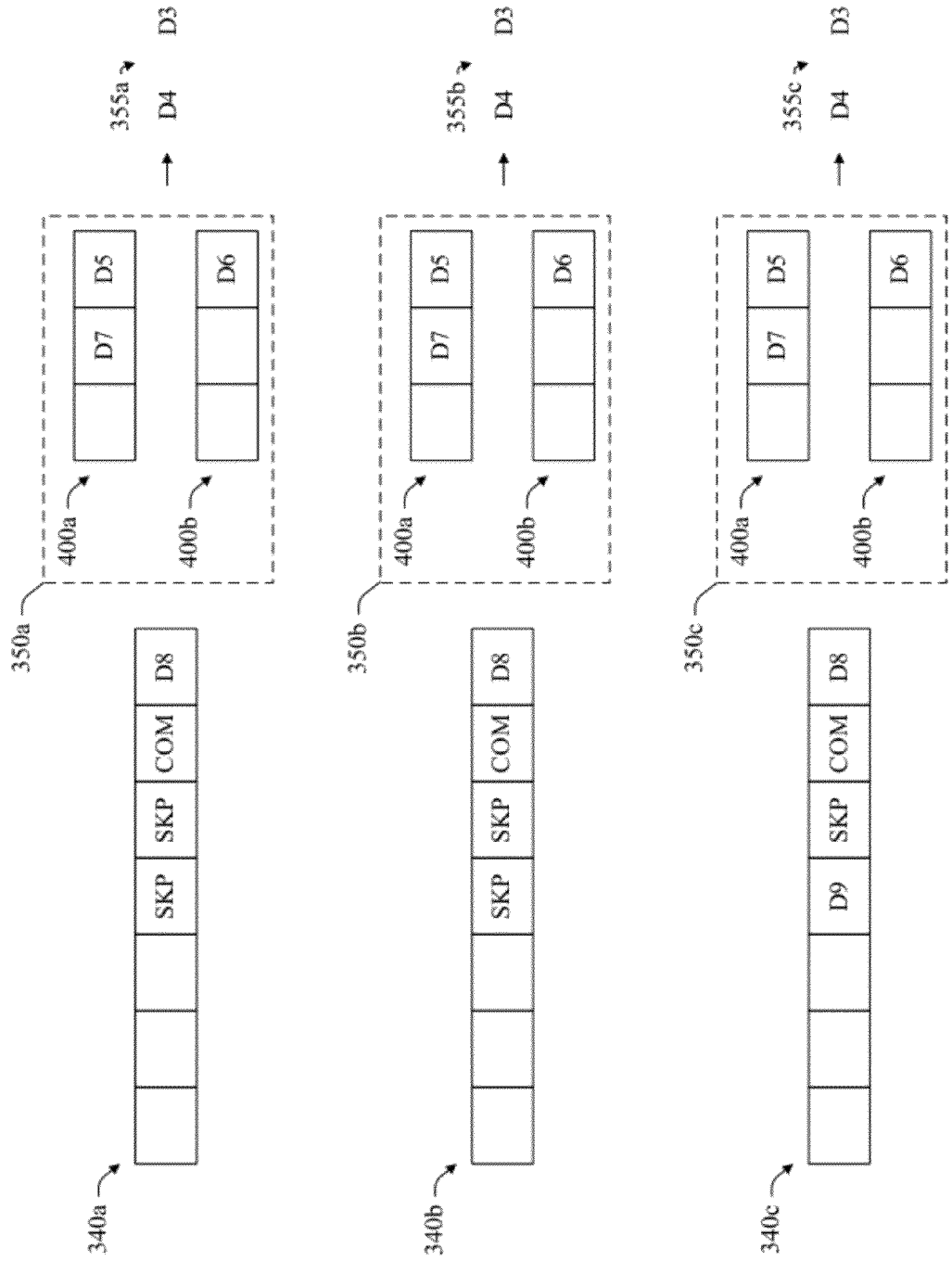

MULTI-QUEUE SYSTEM AND METHOD FOR DESKEWING SYMBOLS IN DATA STREAMS

CROSS-REFERENCE TO RELATED APPLICATIONS

The present patent application is related to U.S. patent application Ser. No. 12/188,195 entitled "System and Method for Deskewing Data Transmitted through Data Lanes" filed on Aug. 7, 2008, and U.S. patent application Ser. No. 12/264,184 entitled "Data Aggregation System and Method for Deskewing Data at Selectable Data Rates" filed on even date herewith, each of which is incorporated herein by reference in its entirety.

BACKGROUND

In some types of communications systems, a transmitter converts a sequence of data symbols into multiple serial data streams and transmits the serial data streams over multiple data lanes to a receiver by using a transmitter clock signal. The receiver reconstructs the transmitter clock signal of the transmitter for each data stream, converts data in each data stream into data symbols based on the reconstructed clock signal of the data stream, and stores the data symbols of each data stream into a corresponding elastic buffer based on the reconstructed clock signal of the data stream. Although the reconstructed clock signals have the same average frequency as the transmitter clock signal over a sufficiently long time period, the frequency of each reconstructed clock signal may independently drift away from the average frequency in shorter time periods because of changing conditions in the data lanes.

Because of the frequency variations in the reconstructed clock signals, the data rates of the data streams may differ over shorter time periods. To compensate for the different rates of the data streams, the transmitter periodically inserts a skip ordered set containing control symbols into each data steam. In turn, the receiver selectively adds or deletes control symbols in the skip ordered sets, as is appropriate, and stores each skip ordered set of a data stream into the elastic buffer corresponding to the data stream. Further, the receiver reads data symbols of each data stream from the elastic buffers and stores the data symbols of each data stream into a corresponding deskew circuit by using a receiver clock signal. The frequency of the receiver clock signal is approximately the same as the frequency of the transmitter clock signal but has an average frequency that may differ slightly from the average frequency of the transmitter clock signal. Because of different propagation delays in the receiver (e.g., static skew) and as a result of the receiver adding or deleting control symbols in skip ordered sets (e.g., dynamic skew), the data symbols stored in the deskew circuits may be misaligned from each other. Nonetheless, the receiver aligns the data symbols stored in the deskew circuits based on the receiver clock signal and reconstructs the sequence of data symbols from the aligned data symbols.

In some communication systems, each of the deskew circuits receives one symbol per clock cycle and is capable of deskewing one symbol per clock cycle. In other communication systems, each of the deskew circuits receives a pair of symbols per clock cycle and is capable of deskewing two symbols per clock cycle. In these communication systems, design and manufacture of the receiver is complicated by wire interconnects in the deskew circuits and wire interconnects between the elastic buffers and the deskew circuits. In particular, the number of wire interconnects needed for receiving and deskewing a pair of symbols per clock cycle is substantially greater than the number of wire interconnects needed for receiving and deskewing a single symbol per clock cycle. As a result, routing the wire interconnects in the receiver takes a considerable amount of time in a design cycle of the receiver and has a higher likelihood of creating timing problems late in the design cycle. Moreover, the receiver is typically implemented in a semiconductor chip and the wire interconnects consume a considerable amount of die area and power in the semiconductor chip.

In light of the above, a need exists for an improved system and method for deskewing multiple symbols of a data stream in a clock cycle. A further need exists for reducing the design cycle of a receiver capable of receiving and deskewing multiple symbols of a data stream in a clock cycle. An additional need exists for reducing size and power consumption of deskew circuits capable of receiving and deskewing multiple symbols of a data stream in a clock cycle.

SUMMARY

In various embodiments, a communication system includes a transmitter and a receiver. The transmitter distributes a sequence of symbols among a number of data streams and transmits the data streams to the receiver. The receiver includes a deskew unit corresponding to each data stream, each of which includes a number of data queues. The deskew module stores symbols of each data stream into the data queues of the corresponding data unit by distributing the symbols of the data stream among the data queues in the data unit. Additionally, the deskew module aligns the symbols across the data streams by individually deskewing symbols stored in the deskew units in each clock cycle of a receiver clock signal. Moreover, each data unit is capable of deskewing a number of symbols in a clock cycle of the receiver clock signal up to the number of data queues in the data unit.

Because the symbols of the data stream stored in each deskew unit are distributed among the data queues in the deskew unit, the number and complexity of wire interconnects in the deskew unit are reduced. As a result, a design cycle for designing the deskew module is reduced and timing issues are avoided late in the design cycle. Moreover, the size and power consumption of the deskew module are reduced in embodiments in which the deskew module is implemented in an integrated circuit.

In further embodiments, the deskew module is configurable to receive and align symbols of data streams at more than one data rate. In one embodiment, the deskew module is configurable into a first configuration or a second configuration. In the first configuration, the receiver aligns data symbols at a first data rate in which each of the deskew units is capable of deskewing up to one symbol per clock cycle. In the second configuration, the receiver aligns data symbols at a second data rate in which each of the deskew units is capable of deskewing up to two symbols per clock cycle. For example, the first data rate may be a gen-1 serdes data rate and the second rate may be a gen-2 serdes data rate, which is twice the gen-1 serdes data rate.

A deskew module, in accordance with one embodiment, aligns data symbols in data streams. Each of the data streams contains symbols including data symbols and a skip ordered set including a number of symbols. The deskew module includes deskew units and a controller coupled to the deskew units. Each of the deskew units includes data queues and is configured to receive symbols of a corresponding data stream. The controller is configured to write symbols of the data stream corresponding to each deskew unit into the data queues of the deskew unit by distributing symbols of the corresponding data stream among the data queues of the deskew unit. Further, the controller is configured to deskew data symbols stored in the data queues of the deskew units based on the skip ordered sets.

A system, in accordance with one embodiment, includes a compensation module and a deskew module coupled to the compensation module. The compensation module is configured to receive data streams. Each of the data streams has a data rate and contains symbols including data symbols and a skip ordered set including a number of symbols. The compensation module is further configured to selectively modify the number of symbols in the skip ordered sets of the data streams to compensate for differences in the data rates of the data streams. The deskew module includes deskew units, each of which includes data queues and is configured to receive symbols of a corresponding data stream. The deskew module is further configured to write symbols of the data stream corresponding to each deskew unit into the data queues of the deskew unit by distributing symbols of the corresponding data stream among the data queues of the deskew unit. Further, the deskew module is configured to deskew data symbols stored in the data queues of the deskew units based on the skip ordered sets.

A method comprising, in accordance with one embodiment, includes receiving data streams. Each of the data streams contains symbols including data symbols and a skip ordered set including a number of symbols. The method also includes storing symbols of each data stream into the data queues corresponding to the data stream by distributing symbols of the corresponding data stream among the data queues. The method further includes aligning data symbols across the data streams based on the skip ordered sets of the data streams by deskewing symbols stored in the data queues.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIGS. 5A-F are block diagrams of data buffers of a compensation module and data queues of a deskew module, in accordance with an embodiment of the present invention.

FIGS. 6A-G are block diagrams of data buffers of a compensation module and data queues of a deskew module, in accordance with an embodiment of the present invention.

FIGS. 7A-H are block diagrams of data buffers of a compensation module and data queues of a deskew module, in accordance with an embodiment of the present invention.

DETAILED DESCRIPTION

In various embodiments, a communication system includes a transmitter that transmits multiple data streams each including symbols to a receiver in the communication system. The symbols in each of the data streams includes data symbols and a skip ordered set comprising a number of symbols. The receiver includes a compensation module that selectively modifies the number of symbols in the skip ordered sets to compensate for differences between a transmit data rate of the transmitter and a receive data rate of the receiver as well as differences in data rates of the data streams received by the receiver. Additionally, the receiver includes a deskew module including deskew units, each of which corresponds to a data stream and includes data queues. Moreover, the deskew module stores symbols of each data stream and symbols of the skip ordered set of the data stream into the data queues of the data unit corresponding to the data stream. Further, the receiver aligns data symbols across the data streams based on the skip ordered sets by deskewing symbols stored in the data queues of the deskew units.

Because the symbols of the data stream stored in each deskew unit are distributed among the data queues in the deskew unit, the number and complexity of wire interconnects in the deskew unit are reduced. As a result, the design cycle for designing the deskew module is reduced and timing issues are avoided late in the design cycle. Moreover, the size and power consumption of the deskew module are reduced in embodiments in which the deskew module is implemented in an integrated circuit.

Figure 1:
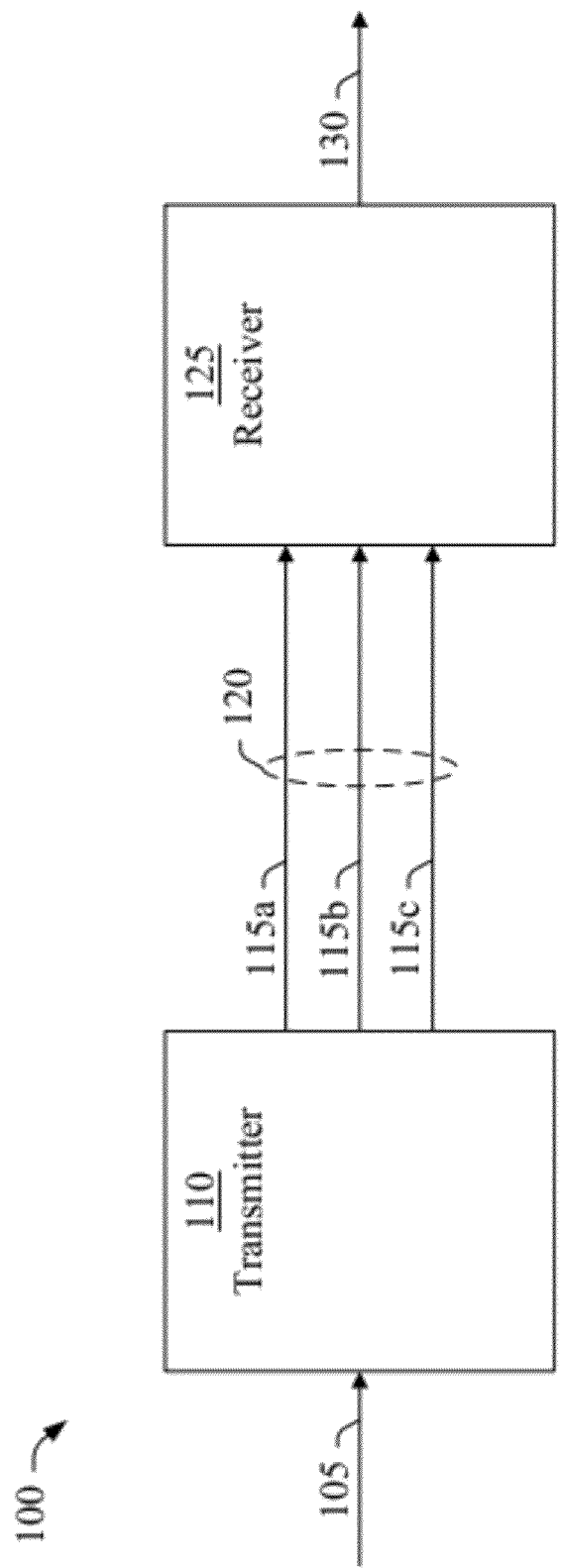
FIG. 1 is a block diagram of a communication system, in accordance with an embodiment of the present invention.

FIG. 1 illustrates a communication system 100, in accordance with an embodiment of the present invention. The communication system 100 includes a transmitter 110 and a receiver 125. The transmitter 110 is coupled (e.g., connected) to the receiver 125 via multiple data lanes 120 (e.g., data lanes 120a-c). The transmitter 110 receives a data stream 105, converts (e.g., serializes) the data stream 105 into multiple data streams 115 (e.g., serial data streams), and transmits the multiple data streams 115 via corresponding data lanes 120 to the receiver 125. The receiver 125 converts the data streams 115 received from the transmitter 110 through the data lanes 120 into symbols (e.g., deserializes the data streams 115), generates a data stream 130 representing the data stream 105 (e.g., the original data stream), and outputs the data stream 130. In this way, the receiver 125 reconstructs the data stream 105 from the data streams 115 received through the data lanes 120. Although three data lanes 120 are illustrated in FIG. 1, the communication system 100 may have more or fewer than three data lanes 120 in other embodiments.

In various embodiments, the transmitter 110 transmits the data streams 115 through the data lanes 120 by distributing data symbols in the data stream 105 among the data streams 115. Because the data lanes 120 may have different electrical properties, the data rates of the data streams 115 received by the receiver 125 through the data lanes 120 may vary. For example, the propagation delays of the data streams 115 may vary because of different physical characteristics of the data lanes 120, such as the lengths and impedances of the data lanes 120. The receiver 125 aligns the data symbols of the data streams 115 by compensating for the different data rates of the data streams 115 and generates the sequence of symbols 130 based on the aligned data symbols. In this way, the data stream 130 includes the same data symbols as the data stream 105 (e.g., the original data stream).

In some embodiments, the data lanes 120 are part of a serial data link. For example, the serial link may be a PCI-Express™ bus or a wireless communication link. In these embodiments, the transmitter 110 generates the data streams 115 by converting (e.g., serializing) symbols of the data stream 105 and transmits the data streams 115 serially through the data lanes 120 to the receiver 125. In turn, the receiver 125 converts (e.g., deserializes) the data streams 115 into symbols and aligns the symbols. In some embodiments, the transmitter 110 encodes the symbols in the data streams 105 before transmitting the data streams 115 to the receiver 125. For example, the transmitter 110 may encode the symbols in the data stream 105 and generate the data streams 115 by using the encoded symbols. In these embodiments, the receiver 125 decodes the symbols in the data streams 115 received from the transmitter 110. For example, the transmitter 110 may generate the data streams 115 by encoding the symbols in the data stream 105 and serializing the encoded symbols, and the receiver 125 may deserialize the encoded symbols in the data streams 115 and decode the encoded symbols.

In various embodiments, each of the data symbols in the data stream 105 includes eight data bits and the transmitter 110 encodes the data symbols into data symbols having ten bits by using an 8b/10b transmission code. For example, the transmission code may be the 8b/10b transmission code specified in the ANSI X3.230-1994 standard, the IEEE 802z standard, or the IEEE 36.2.4 standard. In these embodiments, an 8-bit data symbol is divided into three data bits and five data bits that are mapped onto a four-bit code group and a six-bit code group, respectfully. Moreover, the four-bit group code and the six-bit group code together form a 10-bit data symbol in the 8b/10b transmission code. In addition to encoding the 8-bit data symbols into 10-bit data symbols, the 8b/10b transmission code is used to encode control symbols (e.g., special symbols) for controlling transmission of data. For example, the 8b/10b transmission code may include a skip symbol (SKP) and a comma symbol (COM). In some embodiments, the receiver 125 is implemented in a single semiconductor die. In other embodiments, the receiver 125 is implemented in multiple semiconductor die and contained in a chip package. For example, the receiver 125 may be contained in a multichip package.

In operation, the transmitter 110 periodically inserts a skip ordered set (SKPOS) into each data stream 115 transmitted through the data lanes 120 to the receiver 125. Each skip order set includes one or more control symbols. For example, a skip ordered set may include a comma symbol followed by one or more skip symbols. The receiver 125 aligns the data streams 115 based on the skip ordered sets to compensate for differences in data rates of the data streams 115 received by the receiver 125 as well as frequency differences between a clock signal in the transmitter 110 and a clock signal in the receiver 125. In this process, the receiver 125 selectively deletes and inserts control symbols (e.g., skip symbols) in the skip ordered sets of the data streams 115 to compensate for the different data rates of the data streams 115 received by the receiver 125 and the frequency differences between the clock signals in the transmitter 110 and the receiver 125.

For example, the receiver 125 may delete one or more control symbols (e.g., skip symbols) from a data stream 115 having a faster data rate and insert one or more control symbols (e.g., skip symbols) into a data stream 115 having a slower data rate. In this way, the receiver 125 compensates for differences in the data rates of the data streams 115 received by the receiver 125. As another example, the receiver 125 may delete control symbols from data streams 115 if the clock signal in the transmitter 110 has a higher frequency than the clock signal in the receiver 125 or add control symbols to data streams 115 when the clock signal in the transmitter 110 has a lower frequency than the clock signal in the receiver 125. In this way, the receiver 125 compensates for differences between the frequencies of the clock signal in the transmitter 110 and the clock signal in the receiver 125.

In various embodiments, a skip ordered set includes a comma symbol followed by three skip symbols. In these embodiments, the receiver 125 may delete one or two control symbols (e.g., skip symbols) or insert one or two control symbols (e.g., skip symbols) in one or more of the skip ordered sets to compensate for different data rates of the data streams 115 or frequency differences between the clock signals in the transmitter 110 and the receiver 125. For example, the receiver 125 may insert up to two skip symbols or delete up to two skip symbols in a skip ordered set to compensate for the different data rates of the data streams 115 received by the receiver 125. In this example, a skip ordered set contains a comma symbol followed by a number of skip symbols in the range of one to five.

Additionally, the receiver 125 aligns the data symbols in the data streams 115 based on the skip ordered sets. In some embodiments, the receiver 125 generates minimal skip ordered sets by selectively deleting one or more symbols in the skip ordered sets of the data streams 115. Each of the minimal skip ordered sets includes a same predetermined number of symbols (e.g., control symbols). In this way, storage requirements in the receiver 125 for storing control symbols of skip ordered sets for aligning data symbols in data streams 115 is reduced. Further, the receiver 125 generates the data stream 130 by selectively adding control symbols to the minimal skip ordered sets, as is described more fully herein. Although the receiver 125 deletes one or more symbols in the skip ordered sets of the data streams 115, the receiver 125 need not delete a symbol from each of those skip ordered sets to generate the minimal skip ordered sets. For example, a skip ordered set in a data stream 115 may have the same number of symbols as the minimal skip ordered set generated from the skip ordered set in the data stream 115, namely the predetermined number of control symbols. Thus, the receiver 125 need not delete a symbol from the skip ordered set in a data stream 115 to generate the minimal skip ordered set.

In embodiments in which the receiver 125 generates minimal skip ordered sets, control circuitry in the receiver 125 for aligning the data symbols in the data streams 115 may determine a priori a clock cycle of the receiver 125 is which data symbols of the data streams 115 will be aligned in the receiver 125. As a result, the control circuitry has multiple clock cycles to determine when the data symbols of the data streams 115 will be aligned in the receiver 125, which allows the control circuitry to operate as a higher frequency of the clock signal in the receiver 125. Moreover, because the clock signal of the receiver 125 may operate at a higher frequency, the receiver 125 may receive the data streams 115 at a higher data rate and generate the data stream 130 at a higher data rate. As a result, the communication system 100 may operate at a higher communication rate.

Figure 2:
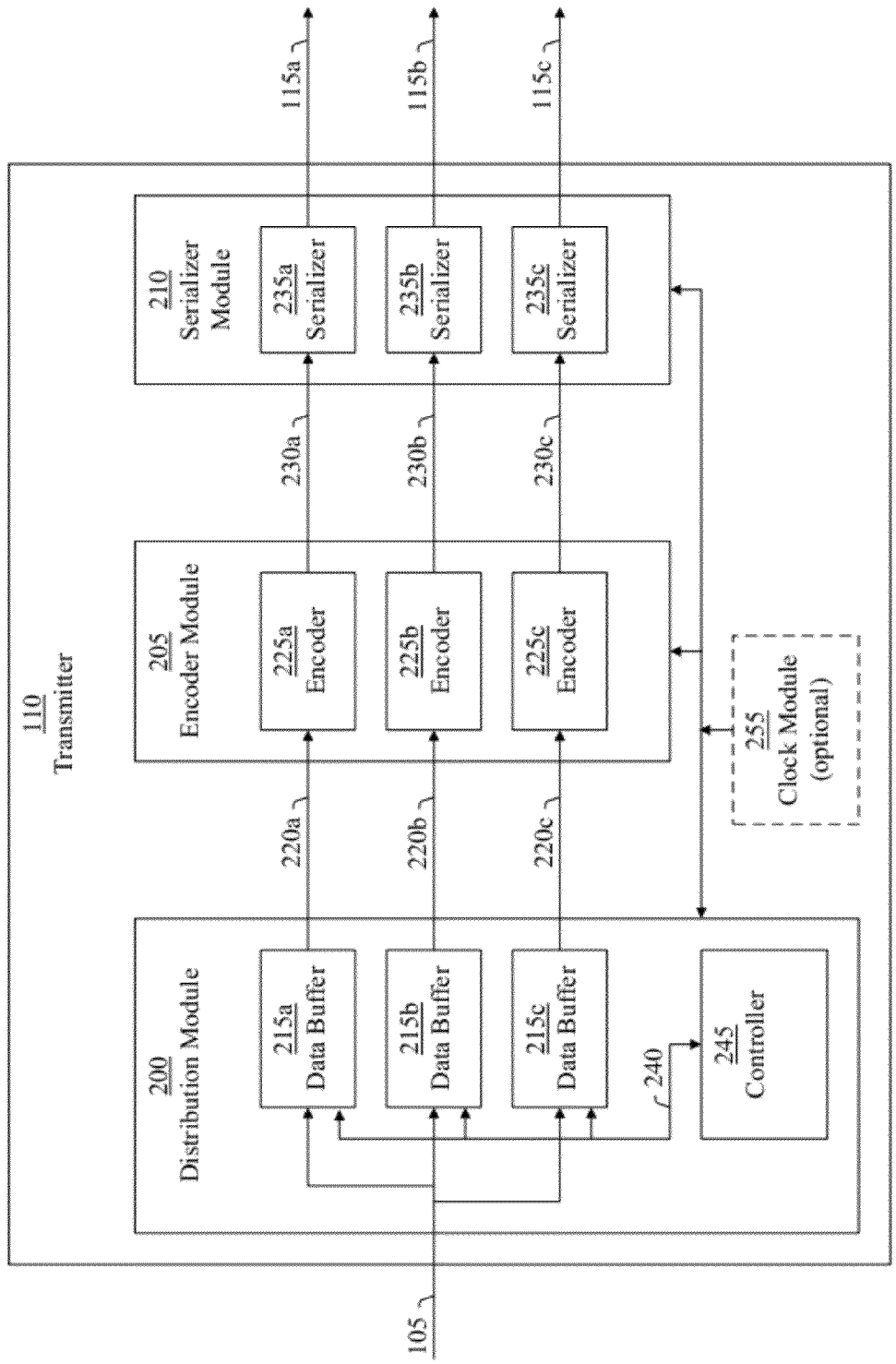
FIG. 2 is a block diagram of a transmitter, in accordance with an embodiment of the present invention.

FIG. 2 illustrates the transmitter 110, in accordance with an embodiment of the present invention. The transmitter 110 includes a distribution module 200, an encoder module 205, a serializer module 210, and an optional clock module 255. The encoder module 205 is coupled (e.g., connected) to the distribution module 200 and the serializer module 210. The distribution module 200 generates data streams 220 (e.g., data streams 220a-c) by distributing data symbols in the data stream 105 among the data streams 220. For example, the distribution module 200 may stripe data symbols in the data stream 105 among the data streams 220. The encoder module 205 generates data streams 230 (e.g., data streams 230a-c) by encoding the symbols in the data streams 220. The serializer module 210 generates the data streams 115 (e.g., the data streams 115a-c) by serializing the symbols in the data streams 230.

In embodiments including the clock module 255, the clock module 255 is coupled (e.g., connected) to the distribution module 200, the encoder module 205, and the serializer module 210. Moreover, the clock module 255 generates a transmitter clock signal 250 and provides the transmitter clock signal 250 to the distribution module 200, the encoder module 205, and the serializer module 210. In embodiments without the clock module 255, the transmitter 110 receives the transmitter clock signal 250 from a clock source external of the transmitter 110.

Although the transmitter 110 has been described herein as generating the data streams 220 based on the data stream 105, the data streams 230 based on the data streams 220, and the data streams 115 based on the data streams 230, in various embodiments some or all of the data stream 105, the data streams 220, the data streams 230, and the data streams 115 are considered to be part of the same data stream. In these embodiments, components of the transmitter 110 perform operations or functions on the same data stream. For example, the distribution module 200 may distribute symbols in the data stream 105 among the data streams 220, the encoder module 205 may encode symbols in the data stream 105, and the serializer module 210 may generate the data streams 115 by serializing the encoded data symbols in the data stream 105.

In one embodiment, the distribution module 200 includes data buffers 215 (e.g., data buffers 215a-c) and a controller 245 coupled (e.g., connected) to each of the data buffers 215. The controller 245 generates a control signal 240 for controlling operation of the distribution module 200. In some embodiments, the controller 245 also controls operation of the encoder module 205 or the serializer module 210, or both. Further, the encoder module 205 includes encoders 225 (e.g., encoders 225a-c) and the serializer module 210 includes serializers 235 (e.g., serializers 235a-c). Each of the encoders 225 is coupled (e.g., connected) to a corresponding data buffer 215 and a corresponding serializer 235. As illustrated in FIG. 2, the encoders 225a-c are coupled (e.g., connected) to corresponding data buffers 215a-c and corresponding serializers 235a-c. In other embodiments, the distribution module 200 may have more or fewer than three data buffers 215, the encoder module 205 may have more or fewer than three encoders 225, and the serializer module 210 may have more or fewer than three serializers 235.

In operation, the data buffers 215 receive the data stream 105 and the controller 245 distributes data symbols in the data stream 105 among the data buffers 215 by selectively writing the data symbols into the data buffers 215 based on the transmitter clock signal 250. For example, the controller 245 may stripe the data symbols in the data stream 105 among the data buffers 215. Each of the data buffers 215 generates a data stream 220, which includes the data symbols of the data stream 105 written into the data buffer 215, and provides the data stream 220 to the encoder 225 corresponding to the data buffer 215 based on the transmitter clock signal 250.

Each of the encoders 225 encodes the symbols in the data stream 220 received from the data buffer 215 corresponding to the encoder 225. In one embodiment, each of the symbols in the data stream 220 is an 8-bit data symbol and each encoder 225 encodes the data symbols in the data stream 220 received from data buffer 215 corresponding to the encoder 225 into 10-bit data symbols. Additionally, the encoder 225 generates a data stream 230, which includes the 10-bit data symbols encoded by the encoder 225, and provides the data stream 230 to the serializer 235 corresponding to the encoder 225 based on the transmitter clock signal 250. Periodically, the controller 245 simultaneously inserts a skipped order set into each of the data streams 220. For example, the controller 245 my write the skip ordered sets into the data buffers 215. As another example, the controller 245 may write the skip ordered sets into the encoders 225. Each of the skipped ordered sets includes one or more 10-bit control symbols. In various embodiments, each of the skipped ordered sets includes a 10-bit comma symbol followed by three 10-bit skip symbols.

Each of the serializers 235 generates a data stream 115 by serializing the data symbols and the control symbols in the data stream 230 received from the corresponding encoder 225. Further, the serializer module 210 transmits each of the data streams 115 to the receiver 125 through the data lane 120 corresponding to the data stream 115 based on the transmitter clock signal 250. In some embodiments, the serializer module 210 is optional. In embodiments without the serializer module 210, the transmitter 110 transmits parallel data (e.g., data symbols and control symbols) to the receiver 125 through each of the data lanes 120.

Figure 3:
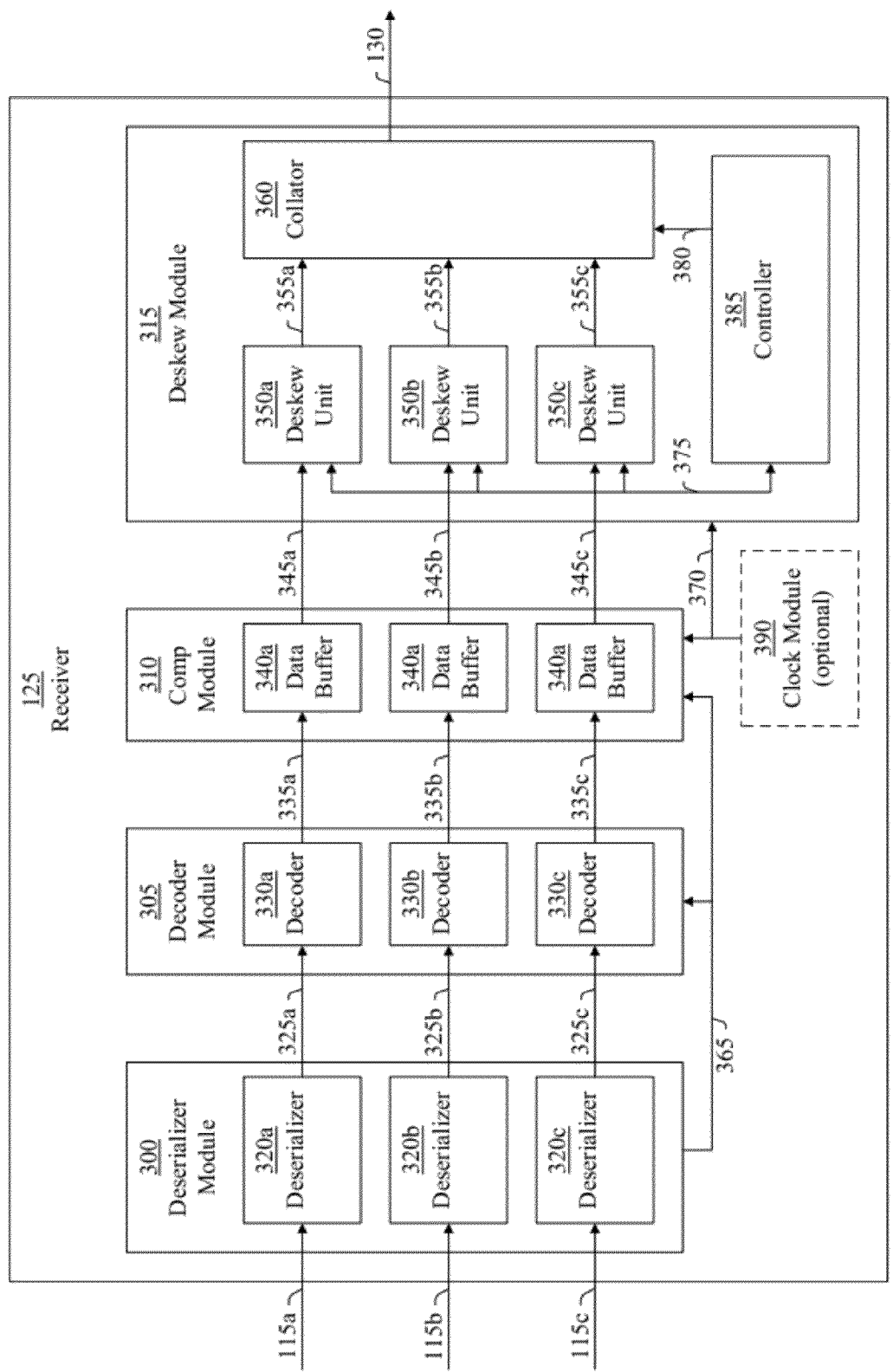
FIG. 3 is a block diagram of a receiver, in accordance with an embodiment of the present invention.

FIG. 3 illustrates the receiver 125, in accordance with an embodiment of the present invention. The receiver 125 includes a deserializer module 300, a decoder module 305, a compensation module (Comp Module) 310, a deskew module 315, and an optional clock module 390. The decoder module 305 is coupled (e.g., connected) to the deserializer module 300 and the compensation module 310. Additionally, the compensation module 310 is coupled (e.g., connected) to the deserializer module 300 and the deskew module 315.

In embodiments including the clock module 390, the clock module 390 is coupled (e.g., connected) to the compensation module 310 and the deskew module 315. Moreover, the clock module 390 generates a receiver clock signal 370 having a frequency that is approximately the same as the frequency of the transmitter clock signal 250 of the transmitter 110. The clock module 390 provides the receiver clock signal 370 to the compensation module 310 and the deskew module 315. In embodiments without the clock module 390, the receiver 125 receives the receiver clock signal 370 from a clock source external of the receiver 125.

The deserializer module 300 receives the data streams 115 from the transmitter 110 through the data lanes 120 and generates data streams 325 corresponding to the data streams 115 by deserializing symbols (e.g., data symbols and control symbols) in the data streams 115. In this process, the deserializer module 300 reconstructs clock signals 365 (e.g., reconstructed clock signals 365) corresponding to the data streams 115 based on the symbols (e.g., serial symbols) in the data stream 115. Further, the deserializer module 300 generates the data streams 325 by converting each data stream 115 (e.g., a serial data stream) into symbols (e.g., a parallel stream) based on the reconstructed clock signal 365 corresponding to the data stream 115. The symbols in each data stream 325 represent the encoded data symbols of a corresponding data stream 115 as well as encoded control symbols of skip ordered sets generated by the transmitter 110 and inserted into the data stream 115. For example, each data stream 325 may be a sequence of symbols including encoded data symbols and encoded control symbols.

The decoder module 305 receives the data streams 325 from the deserializer module 300 based on the reconstructed clock signals 365 and generates data streams 335 corresponding to the data streams 325 by decoding symbols in the data streams 325 based on the reconstructed clock signals 365 corresponding to the data streams 325. For example, each of the data streams 335 may be a sequence of symbols included decoded data symbols and decoded control symbols. In various embodiments, each of the symbols in the data streams 325 includes ten data bits and the decoder module 305 decodes the symbols in the data stream 325 into symbols having eight bits by using an 8b/10b transmission code. For example, the transmission code may be the 8b/10b transmission code specified in the ANSI X3.230-1994 standard, the IEEE 802z standard, or the IEEE 36.2.4 standard. In these embodiments, each of the data streams 335 includes data symbols having eight-bits and control symbols having eight bits. Moreover, each of the data streams 335 includes skip ordered sets including control symbols. For example, each of the data streams 335 may include a skip ordered set including a comma symbol followed by three skip symbols. The decoder module 305 provides the data streams 335 to the compensation module 310.

The compensation module 310 receives data streams 335 from the decoder module 305 and stores the symbols of the data streams 335 based on the reconstructed clock signals 365 corresponding to the data streams 335. Additionally, the compensation module generates the data streams 345 based on the receiver clock signal 370. The compensation module 310 generates the data streams 345 by selectively adding control symbols (e.g., skip symbols) to skip ordered sets in the data streams 335 and selectively deleting control symbols from skip ordered sets in the data streams 335. In this way, the compensation module 310 selectively modifies the number of control symbols in the skip ordered sets of the data streams 345 to compensate for the different data rates at which the receiver 125 receives the data streams 115 as well as frequency differences between the clock signals of the transmitter 110 and the receiver 125. Moreover, the compensation module 310 inhibits data underflow and data overflow from occurring in the receiver 125 because of the different data rates of the data streams 115 received by the receiver 125. For example, the compensation module 310 may add a skip symbol to a skip ordered set of a data stream 345 in which the corresponding data stream 115 has a slower data rate and delete a skip symbol from a skip ordered set of a data stream 345 in which the corresponding data stream 115 has a faster data rate. The compensation module 310 provides the data streams 345 to the deskew module 315. Because the compensation module 310 generates the data streams 345 by individually adding symbols to skip ordered sets in the data streams 335 and individually deleting symbols from the skip ordered sets in the data streams 335, the data symbols following the skip ordered sets in the data streams 345 may not be aligned with each other.

In some embodiments, the compensation module 310 deletes each symbol from a skip ordered set of a data stream 335 and adds another symbol to the corresponding data stream 345. In these embodiments, the symbol added to the data stream 345 is a minimal skip ordered set that includes the symbol. In other embodiments, the compensation module 310 deletes each symbol from the skip ordered sets in the data streams 335 and adds minimal skip ordered sets to the data streams 345 by adding symbols to the data streams 345. In these embodiments, each of the skip ordered sets in the data streams 345 has the same number of symbols. In some embodiments, the compensation module 310 deletes each symbol from a skip ordered set of a data stream 335 and generates a tag in the corresponding data stream 345 for indicating a location of a minimal skip ordered set. Further, the compensation module 310 associates the tag with a data symbol in the data stream 345. In turn, the deskew module 315 stores the tag along with the data symbol.

In one embodiment, a tag is a binary value and each location in the data buffer 340 includes a bit for storing a tag along with a data symbol. For example, a tag having a binary value of one stored at a location of the deskew module 315 may indicate a minimal skip ordered set associated with a data symbol stored at that location. Conversely, a tag having a binary value of zero stored at a location of the deskew module 315 may indicate a skip ordered set is not associated with a data symbol stored at that location.

In various embodiments, a minimal skip ordered set includes the tag indicating the location of the minimal skip ordered set. In this way, the symbols of a skip ordered set in a data stream 335 are replaced with a corresponding minimal skip ordered set containing a tag in the corresponding data stream 345. In one embodiment, a tag associated with a data symbol in a data stream 345 indicates that the location of a minimal skip ordered set containing the tag follows the data symbol. In another embodiment, a tag associated with a data symbol in a data stream 345 indicates that the location of a minimal skip ordered set containing the tag precedes the data symbol.

In various embodiment, the compensation module 310 receives each of the data streams 335 based on the reconstructed clock signal 365 of the data stream 335 and provides the data streams 345 to the deskew module 315 based on the receiver clock signal 370. In this way, the compensation module 310 synchronizes the reconstructed clock signals 365 with the receiver clock signal 370 and synchronizes the data streams 335 with the data streams 345. Moreover, the compensation module 310 modifies the skip ordered sets in the data streams 335 based on the reconstructed clock signals 365 corresponding to the data streams 335. Because the reconstructed clock signals 365 may operate at slightly different frequencies from each other and from the receiver clock signal 370, the data symbols of the data streams 345 may be misaligned from each other. The data symbols of the data streams 345 may be further misaligned from each other because of different propagation delays among the data streams 115, different propagation delays among the data streams 325, or different propagation delays among the data streams 335. For example, propagation delays may vary among the data streams 115 because signal traces used to transmit the data streams 115 in the receiver 125 have different lengths or impedances.

The deskew module 315 receives the data streams 355 from the compensation module 310 based on the receiver clock signal 370 and generates the data streams 355 based on the data streams 345 and the receiver clock signal 370. In this process, the deskew module 315 stores data symbols of the data streams 345 as well as symbols of skip ordered sets in the data streams 345. Additionally, the deskew module 315 aligns the data symbols stored in the deskew module 315 based on the skip ordered sets stored in the deskew module 315. In some embodiments, the deskew module 315 generates and stores minimal skip ordered sets by selectively deleting control symbols from the skip ordered sets in the data streams 345 such that each minimal skip ordered set stored in the deskew module 315 has the same number of control symbols. For example, each of the minimal skip ordered sets stored in the deskew module 315 may consist of a single comma symbol followed by a single skip symbol. Because the number of control symbols in the minimal skip ordered sets stored in the deskew module 315 is less than a maximum specified number of control symbols in the skip ordered sets of the data streams 345, the required size and storage capacity of the deskew module 315 is reduced. Furthermore, because each of the minimal skip ordered sets stored in the deskew module 315 has the same number of control symbols, control circuitry in the deskew module 315 may have multiple clock cycles of the receiver clock signal 370 for aligning data symbols based on the minimal skip ordered sets stored in the deskew module 315, as is described more fully herein.

In one embodiment, the deskew module 315 outputs two symbols of each data stream 355 in a single clock cycle. For example, the deskew module 315 may output two symbols of each data stream 355 on a rising edge of the receiver clock signal 370. In this way, the receiver 125 may operate at a higher communication rate by receiving the data streams 115 from the data lanes 120 at a higher data rate (e.g., twice the data rate).

In various embodiments, the receiver 125 includes a physical media access sublayer (PMA), a physical coding sublayer (PCS), and a media access control (MAC). In this embodiment, the physical media access layer includes the deserializer module 300, the physical coding sublayer includes the decoder module 305 and the compensation module 310, and the media access control includes the deskew module 315.

In various embodiments, the deserializer module 300 includes deserializers 320 (e.g., deserializers 320a-c), the decoder module 305 includes decoders 330 (e.g., decoders 330a-c), the compensation module 310 includes data buffers 340 (e.g., data buffers 340a-c). Each of the decoders 330 corresponds to a deserializer 320 and to a data buffer 340. In these embodiments, each deserializer 320 receives a corresponding data stream 115 from the transmitter 110 through a corresponding data lane 120 and generates a corresponding data stream 325 by deserializing symbols in the data stream 115. In this process, the deserializer module 300 generates the reconstructed clock signal 365 for each data stream 115 based on the symbols in the data stream 115. Further, each deserializer 320 generates a data stream 325 by converting the data stream 115 (e.g., serial data) received by the deserializer 320 into symbols (e.g., parallel data) based on the reconstructed clock signal 365 of the data stream 115. The symbols in each of the data streams 325 include encoded data symbols of the data stream 115 as well as encoded control symbols of skip ordered sets in the data stream 115. For example, each of the data streams 325 may be a sequence of symbols including encoded data symbols and encoded control symbols.

Each of the decoders 330 receives a data stream 325 from the deserializer 320 corresponding to the decoder 330 and generates a data stream 335 corresponding to the data stream 325 by decoding the symbols (e.g., the encoded data symbols and encoded control symbols) in the data stream 325. In various embodiments, the symbols in the data streams 325 are 10-bit data symbols and the symbols in the data streams 335 are 8-bit symbols. In some embodiments, each of the symbols in the data steams 335 further includes a data bit indicating whether the symbol is a data symbol or a control symbol. In these embodiments, each symbol in the data stream 335 has at least nine bits. In some embodiments, each of the symbols in the data stream 335 includes a data bit indicating whether the symbol is valid (e.g., contains valid data). In these embodiments, each symbol in the data stream 335 has at least nine bits. In some embodiments, each of the symbols in the data stream 335 includes a data bit indicating whether the symbol is a data symbol or a control symbol and a data bit indicating whether the symbol is valid. In these embodiments, each symbol in the data stream 335 has at least ten bits. In some embodiments, each of the symbols in the data stream 335 includes a bit indicating whether a minimal skip ordered set is associated with the symbol, as is described more fully herein.

Each of the data buffers 340 in the compensation module 310 receives a data stream 335 from the decoder 330 corresponding to the data buffer 340 and the compensation module 310 generates the data streams 345 corresponding to the data streams 335 by selectively modifying symbols (e.g., control symbols) in the skip ordered sets of the data streams 335. Further, the compensation module 310 stores the data symbols of each data stream 335 and the resulting skip ordered set of the data stream 335 into the data buffer 340 (e.g., a compensation buffer) corresponding to the data stream 335. In this way, the compensation module 310 prevents data underflow and data overflow from occurring in the data buffers 340. In various embodiments, the compensation module 310 selectively modifies the skip ordered sets in the data stream 335 by selectively adding one or more symbols (e.g., control symbols) to the skip ordered set in the data stream 335 or selectively deleting one or more symbols from the skip ordered set in the data streams 335.

By selectively modifying the number of symbols in the skip ordered sets of the data stream 335 to prevent data underflow or data overflow from occurring in the data buffers 340, the compensation module 310 compensates for the different data rates of the data streams 115 received by the receiver 125. For example, the compensation module 310 may add a skip symbol to a skip ordered set of a data stream 335 having a slower data rate and delete a skip symbol from a skip ordered set of a data stream 335 having a faster data rate. Because the compensation module 310 generates the data streams 345 by individually adding symbols to, or deleting symbols from, skip ordered sets in the data streams 335, the data symbols following the skip ordered sets in the data streams 345 may not be aligned with each other.

In various embodiments, the deskew module 315 includes deskew units 350 (e.g., deskew units 350a-c), a collator 360, and a controller 385. The deskew units 350 are coupled (e.g., connected) to the collator 360 and the controller 385. Additionally, the collator 360 is coupled (e.g., connected) to the controller 385. Each of the deskew units 350 corresponds to a data buffer 340 in the compensation module 310 and receives a data stream 345 from the corresponding data buffer 340. The controller 385 generates a control signal 375 for controlling operation of the deskew units 350 and a control signal 380 for controlling operation of the collator 360. In operation, the controller 385 stores the data symbols of the data stream 345 and symbols of skip ordered sets generated from the data stream 345 into the deskew unit 350 (e.g., a deskew buffer) corresponding to the data stream 345.

In some embodiments, the controller 385 identifies a skip ordered set in a data stream 345, generates a minimal skip ordered set based on the skip ordered set in the data stream 345, and writes the minimal skip ordered set into the deskew unit 350. The minimal skip ordered set includes a predetermined number of symbols, which may include one or more control symbols in the identified skip ordered set. In other embodiments, the controller 385 identifies skip ordered sets in the data streams 345, generates skip ordered sets based on the skip ordered sets in the data stream 345, and writes the skip ordered sets into the corresponding deskew units 350. In these embodiments, each of the minimal skip ordered sets generated by the controller 385 has a same number of symbols. For example, a minimal skip ordered set may be a tag indicating a location of the minimal skip ordered set. In this example, the minimal skip ordered set contains no symbols (e.g., zero symbols).

In various embodiments, the controller 385 generates a minimal skip ordered set based on an identified skip ordered set by selectively deleting one or more control symbols from the identified skip ordered set. Moreover, each of the minimal skip ordered sets has a same predetermined number of control symbols. In some cases, the minimal skip ordered set is the same as the identified skip ordered set. In these cases, the identified skip ordered set has the same number of symbols as the predetermined number of symbols in the minimal skip ordered set. By storing the minimal skip ordered sets instead of the skip ordered sets identified in the data streams 345, the size and storage capacity requirements of the deskew units 350 is reduced, which also decreases power consumption in the deskew module 315.

In various embodiments, a minimal skip ordered set is a sequence of two symbols (e.g., two control symbols). For example, a minimal skip ordered set may be a comma symbol followed by a skip symbol. In some embodiments, the controller 385 writes a minimal skip ordered set into a deskew unit 350 by writing the first two symbols of an identified skip ordered set into the deskew unit 350 and discarding any remaining symbols of the identified skip ordered set. In other embodiments, the controller 385 generates the minimal skip ordered set, stores the minimal skip ordered set into the deskew unit 350, and discards the identified skip ordered set.

In various embodiments, a minimal skip ordered set is single symbol (e.g., a single control symbol). For example, a minimal skip ordered set may be a comma symbol. In some embodiments, the controller 385 writes a minimal skip ordered set into a deskew unit 350 by writing the first symbol of an identified skip ordered set into the deskew unit 350 and discarding any remaining symbols of the identified skip ordered set. In other embodiments, the controller 385 generates the minimal skip ordered set, stores the minimal skip ordered set into the deskew unit 350, and discards the identified skip ordered set.

Figure 4:
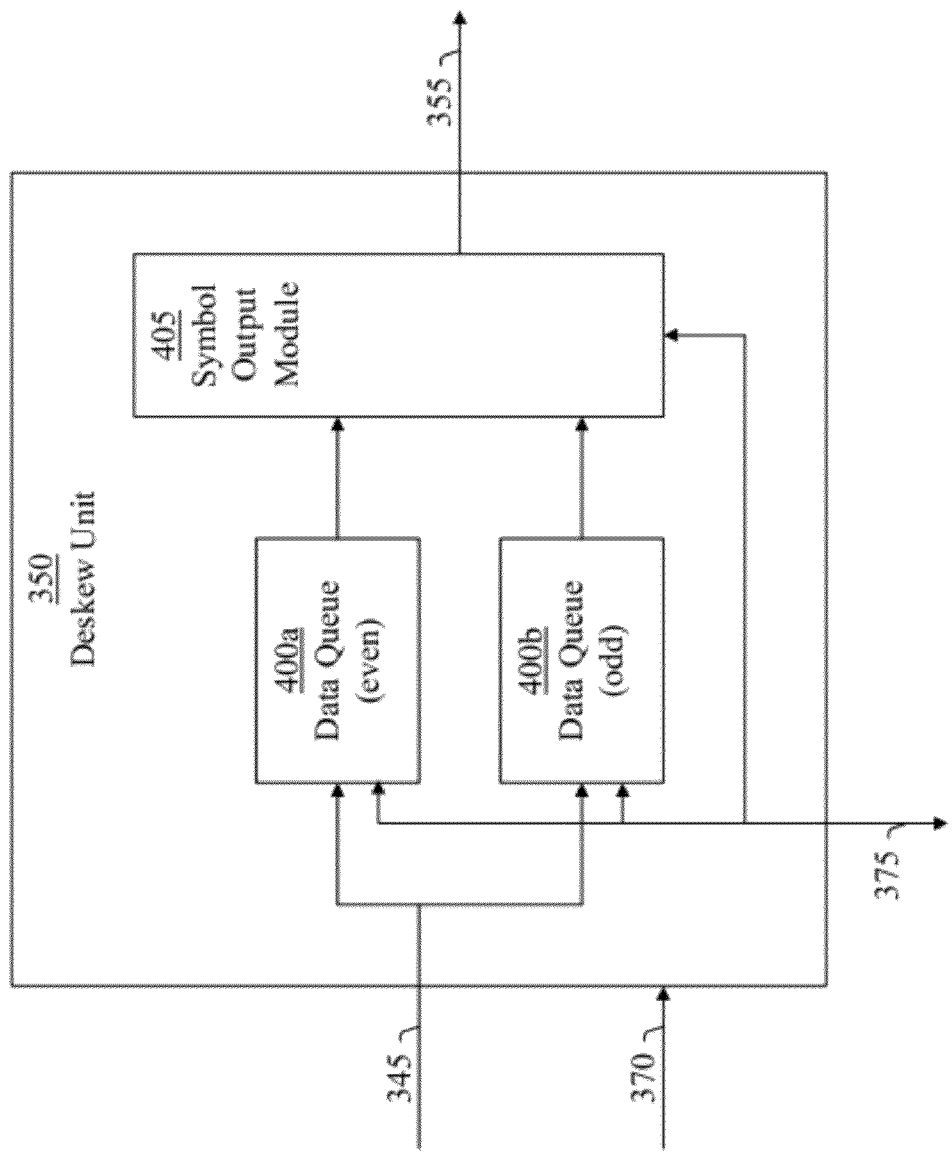
FIG. 4 is a block diagram of a deskew unit, in accordance with an embodiment of the present invention.

FIG. 4 illustrates the deskew unit 350, in accordance with an embodiment of the present invention. The deskew unit 350 includes data queues 400 (e.g., data queue 400a and data queue 400b) and a symbol output module 405 coupled (e.g., connected) to the data queues 400. In operation, the controller 385 writes symbols of the data stream 345 corresponding to the deskew unit 350 into the data queues 400 by distributing the symbols among the data queues 400. In embodiments in which the deskew unit 350 contains two data queues 400, the controller 385 distributes symbols among the data queues 400 by writing symbols of the data stream 345 corresponding to the deskew unit 350 alternatively into the data queues 400. In embodiments containing more than two data queues 400, the data queues 400 in each deskew unit 350 are ordered in a circular sequence and the controller 385 distributes symbols among the data queues 400 by writing symbols of the data stream 345 corresponding to the deskew unit 350 into the data queues 400 according to the circular sequence. In various embodiments, the data queues 400 deskew symbols stored in the data queues 400 and output the deskewed symbols to the symbol output module 405. In turn, the symbol output module 405 generates the data stream 355 corresponding to the deskew unit 350 based on the symbols output from the data queues 400.

The controller 385 controls operation of the data queues 400 and the symbol output module 405 based on the receiver clock signal 370. In this process, the controller 385 aligns data symbols in the deskew units 350 based on skip ordered sets stored in the deskew units 350. Moreover, each deskew unit 350 is capable of deskewing a number of symbols in a clock cycle of the receiver clock signal 370 up to the number of data queues 400 in the deskew unit 350. For example, the deskew unit 350 may include two data queues 400 (e.g., the data queue 400a and data queue 400b) and deskew up to two symbols stored in the data queues 400 in a clock cycle. Although two data queues 400 are illustrated in the embodiment of FIG. 4, the deskew unit 350 may have more than two data queues 400 in other embodiments.

In the embodiment of FIG. 4, the controller 385 identifies a skip ordered set first to reach a head of at least one data queue 400 of the deskew unit 350 in a clock cycle and the deskew unit 350 outputs symbols of the skip ordered set from the deskew unit 350 in one or more subsequent clock cycles. If each of the data queues 400 has a symbol of the skip ordered set at the head of the data queue 400, the deskew unit 350 outputs the symbols of the skip ordered set at the heads of the data queues 400 to the symbol output module 405 in the clock cycle. Further, deskew unit 350 advances any symbol remaining in each data queue 400 toward the head of that data queue 400 in the clock cycle. In this way, the deskew unit 350 deskews and outputs two symbols of the skip ordered set to the symbol output module 405 in the clock cycle. In turn, the symbol output module 405 outputs the symbols of the skip ordered set in a subsequent clock cycle in the same order in which the deskew unit 350 received the symbols of the skip ordered set.

Otherwise, if the head of the data queue 400a (e.g., the even data queue) contains a symbol of a skip ordered set and the head of the data queue 400b (e.g., the odd data queue) contains a data symbol, the deskew unit 350 outputs the symbol of the skip ordered set at the head of the data queue 400a in the clock cycle but does not advance any symbol remaining in the data queue 400a toward the head of the data queue 400a. In this way, the deskew unit 350 deskews and outputs one symbol of the skip ordered set to the symbol output module 405 in the clock cycle and the head of the data queue 400a does not contain a symbol at the end of the clock cycle. Although the head of the data queue 400a is void after the deskew unit 350 outputs the symbol of the skip ordered set at the head of the data queue 400a and the data queue 400a does not advance another symbol to the head of the data queue 400a in the clock cycle, the deskew unit 350 does not move the symbol at the head of the data queue 400b to the head of the data queue 400a because the deskew unit 350 does not move symbols between the data queues 400a and 400b. Moreover, the deskew unit 350 does not advance any symbol in the data queue 400b toward the head of the data queue 400b in the clock cycle.

The symbol output module 405 generates a symbol for the skip ordered set and outputs the symbol of the skip ordered set received from the data queue 400a and the generated symbol in a subsequent clock cycle. In this way, the symbol output module 405 inserts a symbol into the skip ordered set. For example, the controller 385 may provide the control signal 375 to the symbol output module 405 indicating that a control symbol (e.g., a skip symbol) is to be inserted into the skip ordered set. In turn, the symbol output module 405 outputs the symbol of the skip ordered set received from the deskew unit 350 as well as the inserted control symbol in the subsequent clock cycle based on the control signal 375.

In various embodiments, the controller 385 controls operation of the deskew units 350 as described above until each of the deskew units 350 outputs a skip ordered set to the symbol output module 405 of the deskew unit 350. In this process, each of the deskew units 350 does not output a data symbol after outputting a skip ordered set until each of the deskew units 350 has output a skip ordered set and the head of at least one data queue 400 in each deskew unit 350 contains a data symbol. For example, the head of each data queue 400 of a deskew unit 350 may contain a data symbol. As another example, the head of the data queue 400b of the deskew unit 350 may contain a data symbol and the head of the data queue 400a of the deskew unit 350 may be void but the data queue 400a may contain a data symbol following the head of the data queue 400a. In this way, the controller 385 aligns data symbols at the heads of the data queues 400 in the deskew units 350.

In the next clock cycle, the controller 385 determines for each deskew unit 350 whether the head of each data queue 400 in the deskew unit 350 (e.g., the even data queue and the odd data queue) contains a data symbol. If the head of each data queue 400 in the deskew unit 350 contains a data symbol, the deskew unit 350 outputs the data symbols at the heads of the data queues 400 to the symbol output module 405 of the deskew unit 350 in the same order in which the deskew unit 350 received the data symbols.

If the controller 385 determines the head of each data queue 400 in a deskew unit 350 does not contain a data symbol, the controller 385 determines whether the data queue 400a (e.g., the even data queue) contains a data symbol following the head of the data queue 400a and the data queue 400b (e.g., the odd data queue) contains a data symbol at the head of the data queue 400b. If the data queue 400a contains a data symbol following the head of the data queue 400a and the data queue 400b contains a data symbol at the head of the data queue 400b, the deskew unit 350 outputs the data symbol at the head of the data queue 400b (e.g., the odd data queue) and the data symbol following the head of data queue 400a (e.g., the even data queue) to the symbol output module 405 of the deskew unit 350 in the clock cycle. In this way, the deskew unit 350 outputs a data symbol from each data queue 400 of the deskew unit 350 in the clock cycle in the same order in which the deskew unit 350 received the data symbols.

Otherwise, if the data queue 400a of a deskew unit 350 (e.g., the even data queue) does not contain a data symbol, the deskew unit 350 does not output a data symbol from the data queue 400a or the data queue 400b (e.g., the odd data queue) to the symbol output module 405 of the deskew unit 350 in the clock cycle. Moreover, the deskew unit 350 does not advance any symbol in the data queue 400b toward the head of the data queue 400b in the clock cycle. In this way, the deskew unit 350 does not deskew or output any symbol to the symbol output module 405 in the clock cycle. Additionally, the symbol output module 405 generates two symbols (e.g., two skip symbols) and outputs the generated symbols. In this way, the symbol output module 405 inserts the generated symbols into the skip ordered set previously received from the deskew unit 350 by appending the generated symbols to the skip ordered set. For example, the controller 385 may provide the control signal 375 to the symbol output module 405 indicating that two symbols (e.g., two skip symbols) are to be inserted into the skip ordered set. In turn, the symbol output module 405 generates two symbols and outputs the generated symbols in the clock cycle based on the control signal 375.

In some embodiments, the controller 385 generates minimal skip ordered sets based on skip ordered sets in the data streams 345 received by the deskew units 350 in the deskew module 315. Further, the controller 385 stores the minimal skip ordered sets into the deskew units 350 instead of the skip ordered sets received in the data stream 345. In some embodiments, the controller 385 identifies a minimal skip ordered set first to reach a head of a data queue 400 of a deskew unit 350. Additionally, the controller 385 identifies a skip ordered set last to reach the head of a data queue 400 of a deskew unit 350 in a clock cycle and determines a priori the subsequent clock cycle in which a data symbol will be at the head of the deskew unit 350. In this way, the controller 385 determines a priori when data symbols will be aligned at the heads of the data queues 400 in the deskew units 350.

In some embodiments, the controller 385 inserts a symbol into a minimal skip ordered set output from a deskew unit 350 by providing the control signal 380 to the collator 360 and the collator 360 appends the symbol to the minimal skip ordered set based on the control signal 380. In some embodiments, the collator 360 generates the data stream 130 by outputting symbols received from the deskew units 350 without storing the symbols. In these embodiments, the collator 360 appends a symbol to a minimal skip ordered set based on the control signal 380 received from the controller 385 by outputting the symbol in response to receiving the control signal 380. In this way, the collator 360 need not store the symbols appended to the minimal skip ordered set. In various embodiments, the collator 360 generates the data stream 130 by collating the symbols received from the deskew units 350 and the controller 385 to reconstruct the data stream 105. In some embodiments, the collator 360 stores symbols received from the deskew units 350 and the controller 385, and generates the data stream 105 by collating the data symbols stored in the collator 360.

For example, the collator 360 may receive a symbol corresponding to each deskew unit 350 in a clock cycle by receiving the symbol from the corresponding deskew unit 350 or the controller 385, store the symbols, and add the symbols to the data stream 130 in a subsequent clock cycle by interleaving and outputting the symbols stored in the collator 360. As another example, the collator 360 may receive a symbol corresponding to each deskew unit 350 at a first edge (e.g., a rising edge) of a clock cycle by receiving the symbol from the corresponding deskew unit 350 or the controller 385, store the symbols, and add the symbols to the data stream 130 at a second edge (e.g., a falling edge) of the clock cycle by interleaving and outputting the symbols stored in the collator 360.

In one embodiment, the controller 385 writes a skip symbol to the collator 360 to insert the skip symbol into a minimal skip ordered set output from a deskew unit 350 to the collator 360. In another embodiment, the controller 385 provides the control signal 380 to the collator 360 for inserting a skip symbol into a minimal skip ordered set and the collator 360 inserts the skip symbol into the minimal skip ordered set based on the control signal 380. For example, the collator 360 may store symbols received from the deskew units 350 and add the symbols stored in the collator 360 to the data stream 130 by collating the stored data symbols. In this example, the collator 360 stores a skip symbol after outputting the skip symbol and outputs the stored skip symbol more than once based on the control signal 380 received from the controller 385. In this way, the controller 385 adds the stored skip symbol to a minimal skip ordered set by providing the control signal 380 to the collator 360, and the collator 360 inserts the skip symbol into the minimal skip ordered set based on the control signal 380. Moreover, the collator 360 generates an expanded skip ordered set, which includes the minimal skip ordered set and the skip symbol inserted into the minimal skip order set, and outputs the expanded skip ordered set in the data stream 130. In this way, a device receiving the data stream 130 from the receiver 125 may identify the expanded skip ordered set and use the expanded skip ordered sets to identify data symbols from the data stream 130. Moreover, from the perspective of the device, the data stream 130 is a properly formatted data stream including data symbols and skip ordered sets.

Although the receiver 125 has been described herein as generating the data streams 325 based on the data streams 115, the data streams 335 based on the data streams 325, the data streams 345 based on the data streams 335, the data streams 355 based on the data streams 335, and the data stream 130 based on the data streams 355, in various embodiments some or all of the data streams 115, the data streams 325, the data streams 335, the data streams 345, the data streams 335, and the data stream 130 are considered to be part of the same data stream. In these embodiments, components of the receiver 125 perform operations or functions on the same data stream. For example, the deserializer module 300 may deserialize symbols in the data streams 115, the decoder module 305 may decode symbols in the data streams 115, and the compensation module 310 may modify the number of symbols in skip ordered sets of the data streams 115 to compensate for different data rates of the data streams 115. Further, the deskew module 315 may generate minimal skip ordered sets based on the skip ordered sets in the data streams 115, align data symbols in the data streams 115 based on the minimal skip ordered sets, selectively add symbols to the minimal skip ordered sets during alignment of the data symbols, collate symbols in the data streams 115, and output the data streams 115 as the data stream 130.

In some embodiments, the deskew module 315 is configurable to receive and align symbols of data streams 345 at more than one data rate. In these embodiments, the deskew module 315 is configurable so that each deskew unit 350 is capable of deskewing a number of symbols equal to or less than the number of data queues 400 in the deskew unit 350 in a clock cycle. In one embodiment, each deskew unit 350 in the deskew module 315 includes two data queues 400 and the deskew module 315 is configurable into a first configuration or a second configuration. In the first configuration, each deskew unit 350 in the deskew module 315 is capable of deskewing symbols at a data rate of two symbols per clock cycle. In the second configuration, each deskew unit 350 in the deskew module 315 is capable of deskewing symbols at a data rate of one symbol per clock cycle. For example, the deskew units 350 of the deskew module 315 may be capable of deskewing data streams 345 at a PCI Express™ Gen-1 SerDes data rate in the first configuration and a PCI Express Gen-2 SerDes data rate in the second configuration. In this way, the receiver 125 may receive data streams 115 at different data rates and align data symbols across the data streams 115 at the different data rates based on the configuration of the deskew module 315.

Figure 5A:
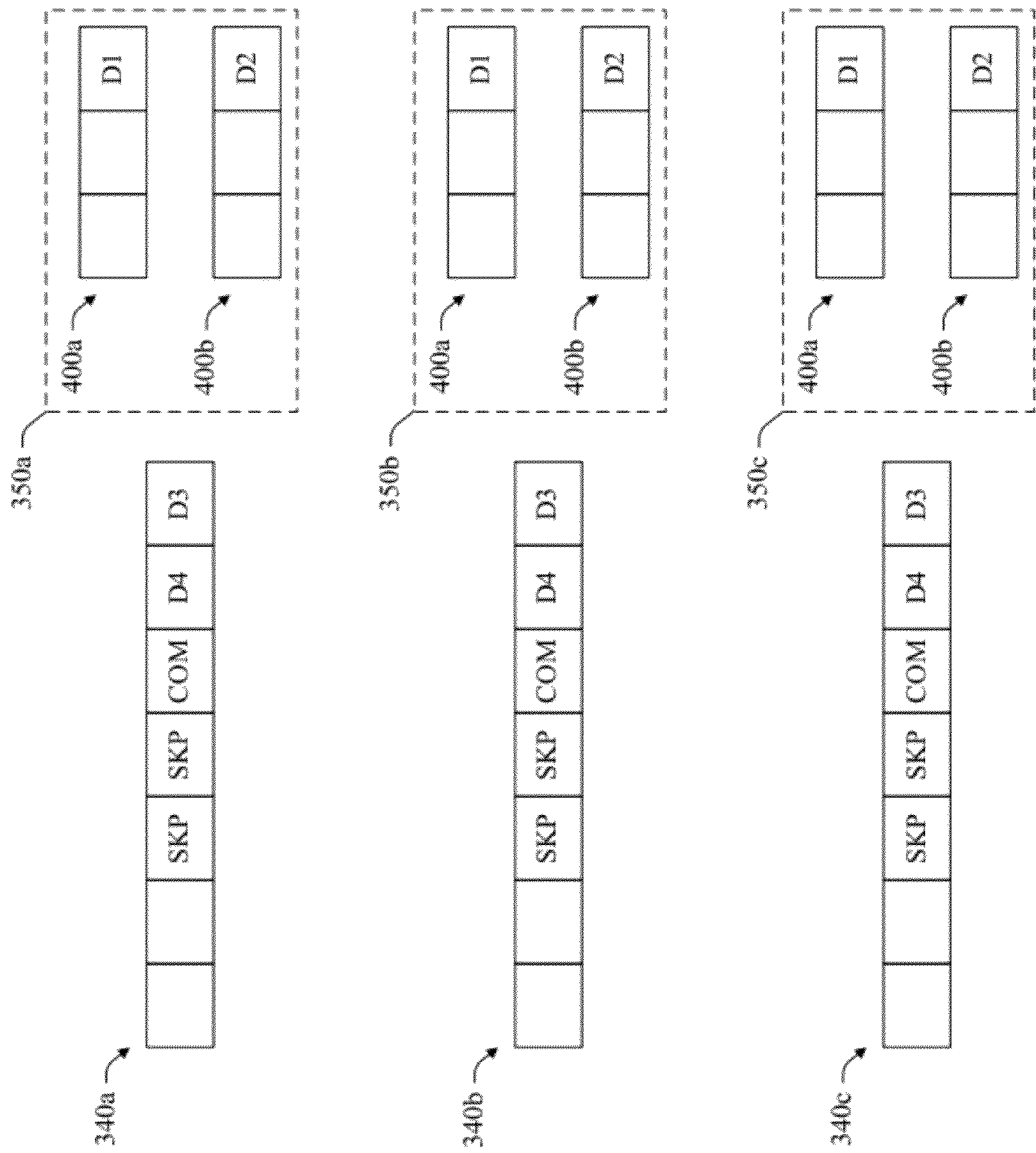

FIGS. 5A-F illustrate data buffers 340 of the compensation module 310 and data queues 400 of the deskew module 315, in accordance with an embodiment of the present invention. In this embodiment, the deskew module 315 writes skip ordered sets of the data streams 345 into the deskew units 350 (e.g., the deskew units 350a-c) of the deskew module 315 without generating minimal skip ordered sets. As illustrated in FIG. 5A, the data buffers 340 (e.g., the data buffers 340a-c) of the compensation module 310 contain symbols of exemplary data streams 335 and the deskew units 350 of the deskew module 315 contain symbols of exemplary data streams 345.

Each of the data buffers 340 contains symbols of the data stream 335 corresponding to the data buffer 340 and each of the data queues 400 of the deskew units 350 contains symbols of the data stream 345 corresponding to the deskew unit 350. In FIGS. 5A-F, the data symbols (D) are enumerated in the order in which each data buffer 340 of the compensation module 310 receives the data symbols from the corresponding data stream 335. Although the symbols stored in the data buffers 340 are aligned across the data buffers 340 in FIG. 5A, the symbols may be misaligned from each other because the compensation module 310 modifies the number of symbols in skip ordered sets of the data streams 335 to compensate for frequency differences between the transmitter clock signal 250 and the receiver clock signal 370 and between the reconstructed clock signals 365 and the receiver clock signal 370.

As further illustrated in FIG. 5A, each of the data queues 400a contains a data symbol (D1) at the head of the data queue 400a and each of the data queues 400b contains a data symbol (D2) at the head of the data queue 400b. Each of the data buffers 340 contains a data symbol (D3) at the head of the data buffer 340, followed by another data symbol (D4) which is followed by a skip ordered set containing a comma symbol (COM) followed by two skip symbols (SKP).

Figure 5B:
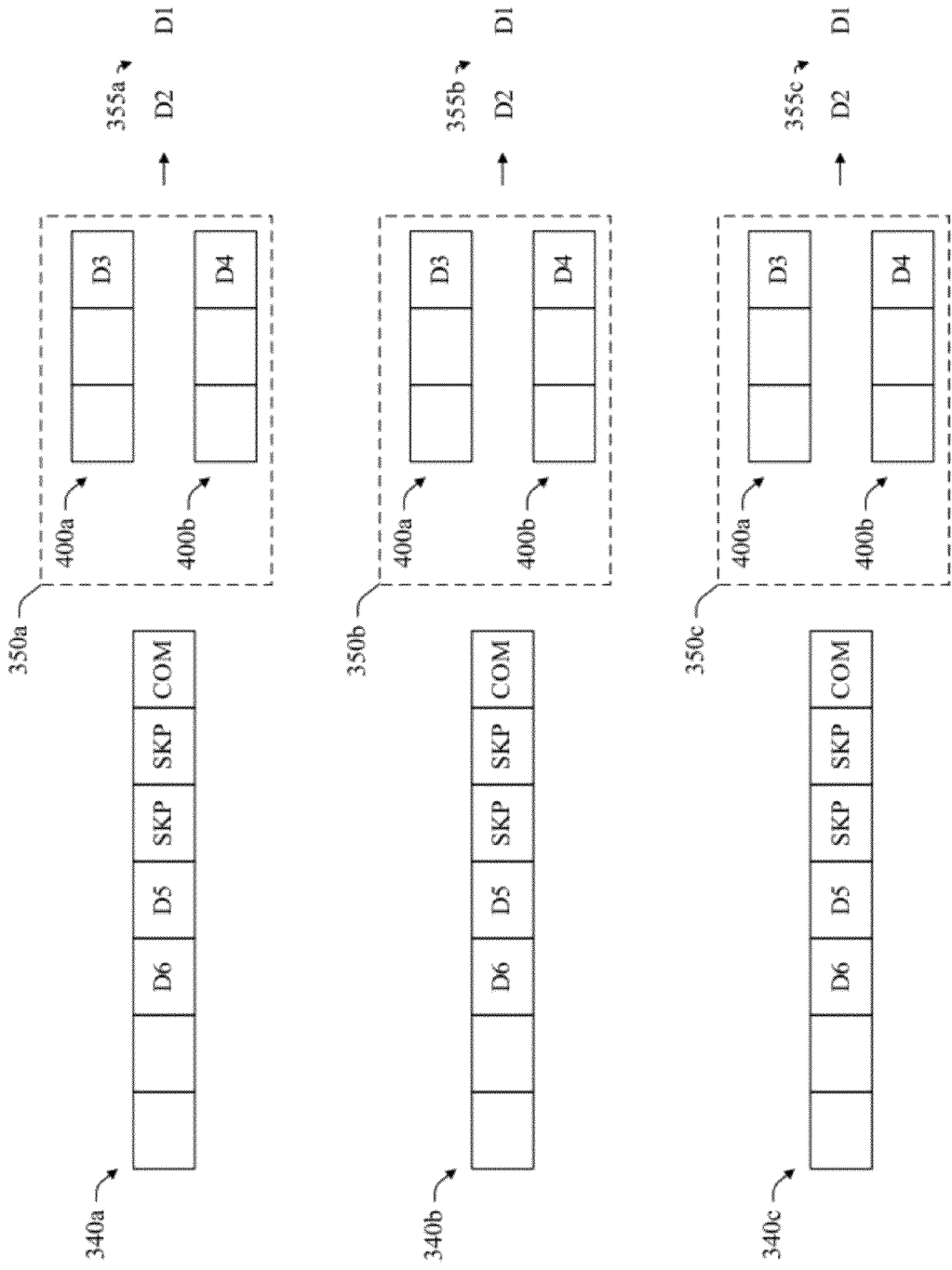

FIG. 5B illustrates the data buffers 340 and the deskew units 350 in the next clock cycle of the receiver clock signal 370. As may be envisioned from FIGS. 5A and 5B, each of the deskew units 350 has output the data symbol (D1) at the head of the data queue 400a in the deskew unit 350 and the data symbol (D2) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Each of the data buffers 340 has output the data symbol (D3) at the head of the data buffer 340 and the following data symbol (D4) in the data buffer 340 to the deskew unit 350 corresponding to the data buffer 340. Each of the deskew units 350 has received the data symbols (D3 and D4) output from the corresponding data buffer 340 and stored the first data symbol (D3) received from the data buffer 340 at the tail of the data queue 400a in the deskew unit 350, which is also the head of the data queue 400a in the deskew unit 350. Further, each of the deskew units 350 has stored the second data symbol (D4) received from the corresponding data buffer 340 at the tail of the data queue 400b in the deskew unit 350, which is also the head of the data queue 400b in the deskew unit 350.

Additionally, each of the data buffers 340 has received two data symbol (D5 and D6) of the corresponding data stream 335 and stored the data symbols (D5 and D6) at the tail of the data buffer 340 based on the reconstructed clock signal 365 corresponding to the data buffer 340 in the order in which the data buffer 340 received the data symbols (D5 and D6). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

FIG. 5C illustrates the data buffers 340 and the deskew units 350 in the next clock cycle of the receiver clock signal 370. As may be envisioned from FIGS. 5B and 5C, each of the deskew units 350 has output the data symbol (D3) at the head of the data queue 400a in the deskew unit 350 and the data symbol (D4) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Each of the data buffers 340 has output the comma symbol (COM) at the head of the data buffer 340 and the following skip symbol (SKP) in the data buffer 340 to the deskew unit 350 corresponding to the data buffer 340. Each of the deskew units 350 has received the comma symbol (COM) and the skip symbol (SKP) output from the corresponding data buffer 340 and stored the comma symbol (COM) received from the data buffer 340 at the tail of the data queue 400a in the deskew unit 350, which is also the head of the data queue 400a in the deskew unit 350. Further, each of the deskew units 350 has stored the skip symbol (SKP) received from the corresponding data buffer 340 at the tail of the data queue 400b in the deskew unit 350, which is also the head of the data queue 400b in the deskew unit 350.

Additionally, each of the data buffers 340 has received two data symbol (D7 and D8) of the corresponding data stream 335 and stored the data symbols (D7 and D8) at the tail of the data buffer 340 based on the reconstructed clock signal 365 corresponding to the data buffer 340 in the order in which the data buffer 340 received the data symbols (D7 and D8). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 5D:
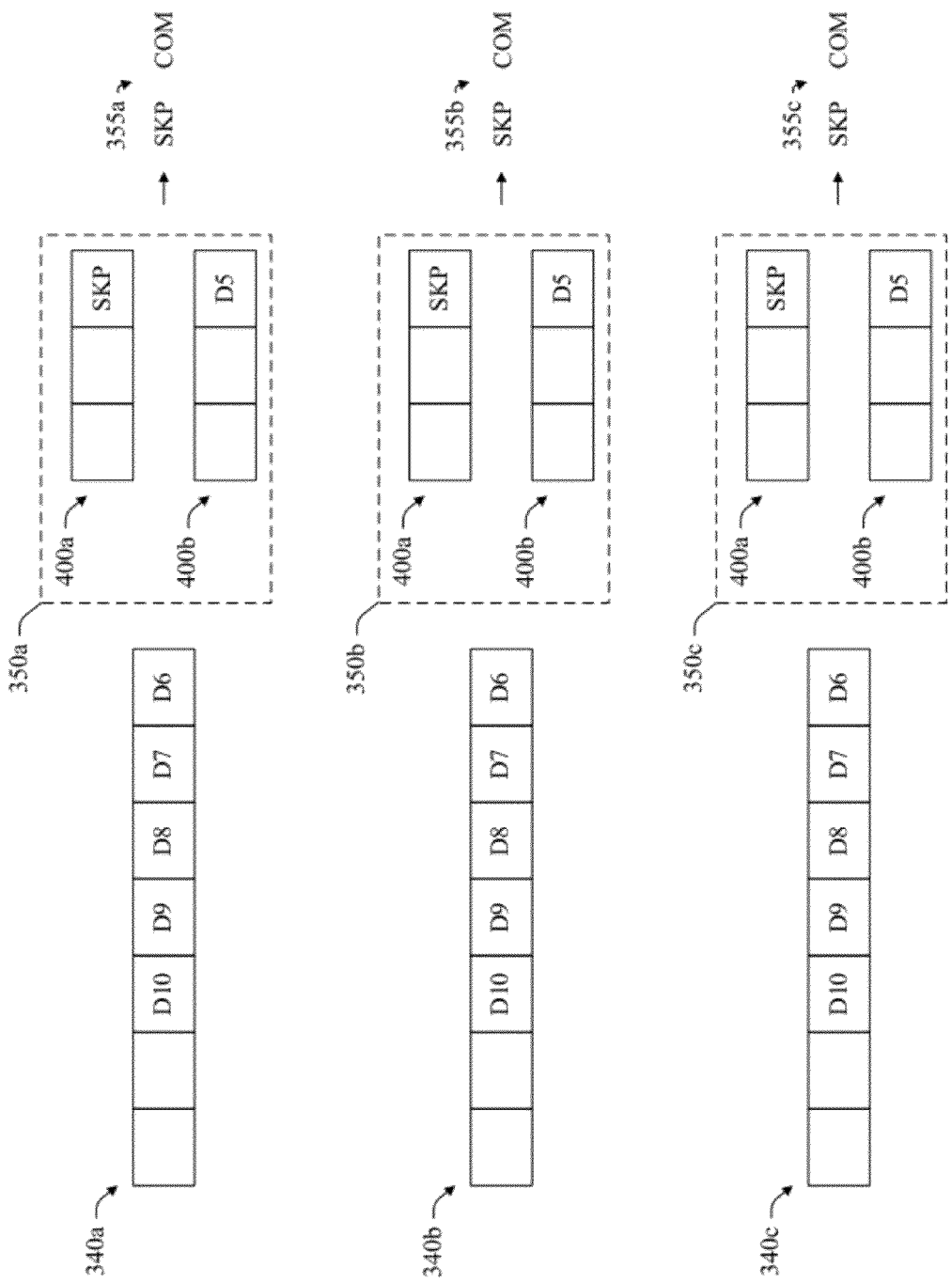

FIG. 5D illustrates the data buffers 340 and the deskew units 350 in the next clock cycle of the receiver clock signal 370. As may be envisioned from FIGS. 5C and 5D, each of the deskew units 350 has output the comma symbol (COM) at the head of the data queue 400a in the deskew unit 350 and the skip symbol (SKP) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbol from the corresponding data buffer 340.

Each of the data buffers 340 has output the skip symbol (SKP) at the head of the data buffer 340 and the following data symbol (D5) in the data buffer 340 to the deskew unit 350 corresponding to the data buffer 340. Each of the deskew units 350 has received the skip symbol (SKP) and the data symbol (D5) output from the corresponding data buffer 340 and stored the skip symbol (SKP) received from the data buffer 340 at the tail of the data queue 400a in the deskew unit 350, which is also the head of the data queue 400a in the deskew unit 350. Further, each of the deskew units 350 has stored the data symbol (D5) received from the corresponding data buffer 340 at the tail of the data queue 400b in the deskew unit 350, which is also the head of the data queue 400b in the deskew unit 350.

Additionally, each of the data buffers 340 has received two data symbol (D9 and D10) of the corresponding data stream 335 and stored the data symbols (D9 and D10) at the tail of the data buffer 340 based on the reconstructed clock signal 365 corresponding to the data buffer 340 in the order in which the data buffer 340 received the data symbols (D9 and D10). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 5E:
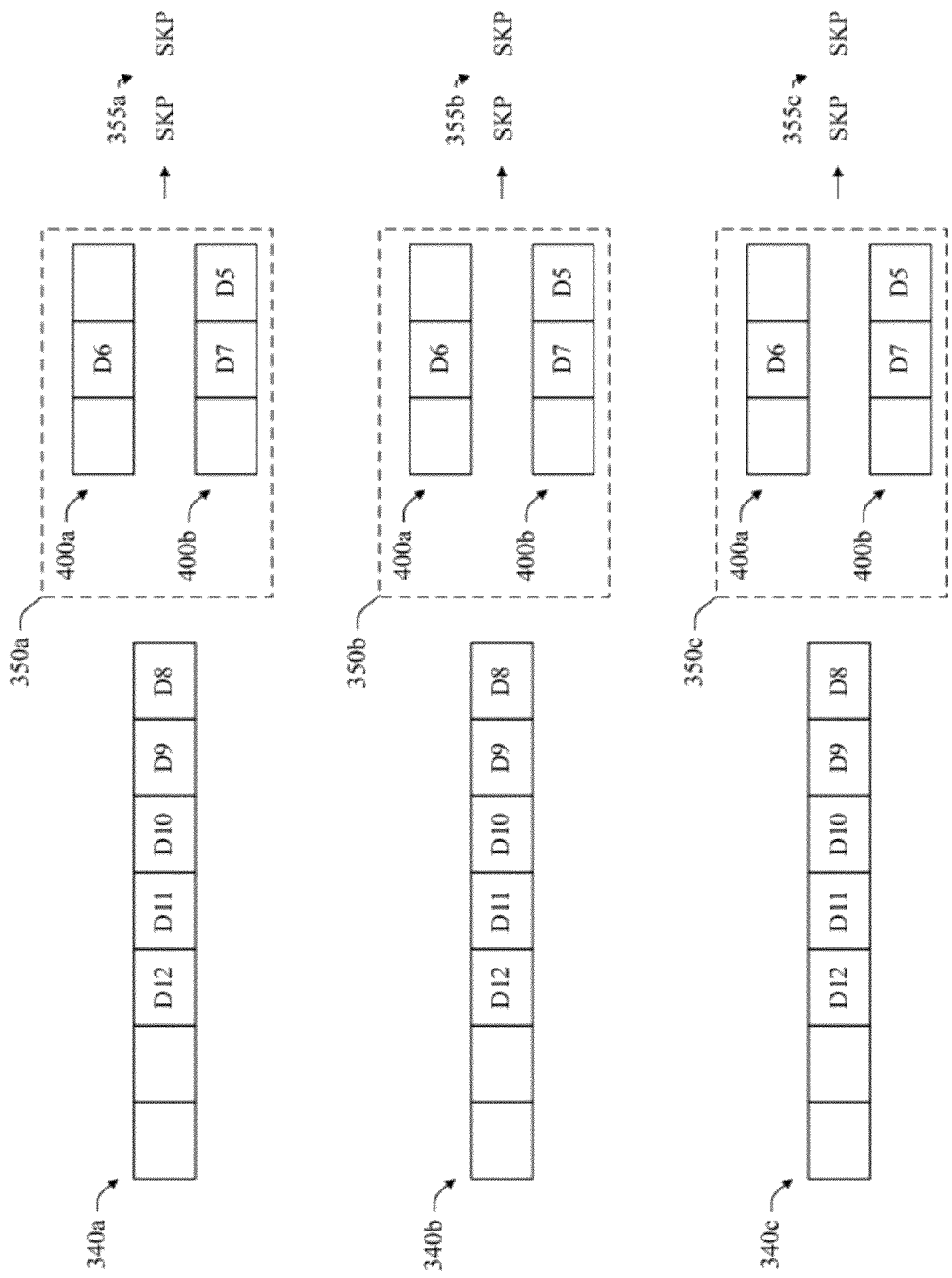

FIG. 5E illustrates the data buffers 340 and the deskew units 350 in the next clock cycle of the receiver clock signal 370. As may be envisioned from FIGS. 5D and 5E, each of the deskew units 350 has output the skip symbol (SKP) at the head of the data queue 400a in the deskew unit 350 into the corresponding data stream 355 in the clock cycle. Further, each of the deskew units 350 has inserted a skip symbol (SKP) into the corresponding data stream 355 in the clock cycle. In this way, each of the deskew units 350 has output a symbol received from the corresponding data buffer 340 of the compensation module 310 into the corresponding data stream 355 in the same order in which the deskew unit 350 received the symbols from the corresponding data buffer 340.

Each of the data buffers 340 has output the data symbol (D6) at the head of the data buffer 340 and the following data symbol (D7) in the data buffer 340 to the deskew unit 350 corresponding to the data buffer 340. Each of the deskew units 350 has received the data symbols (D6 and D7) output from the corresponding data buffer 340 and stored the first data symbol (D6) received from the data buffer 340 at the tail of the data queue 400a in the deskew unit 350, which follows the head of the data queue 400a in the deskew unit 350. Further, each of the deskew units 350 has stored the second data symbol (D7) received from the corresponding data buffer 340 at the tail of the data queue 400b in the deskew unit 350, which follows the head of the data queue 400b in the deskew unit 350.

Additionally, each of the data buffers 340 has received two data symbol (D11 and D12) of the corresponding data stream 335 and stored the data symbols (D11 and D12) at the tail of the data buffer 340 based on the reconstructed clock signal 365 corresponding to the data buffer 340 in the order in which the data buffer 340 received the data symbols (D11 and D12). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 5F:
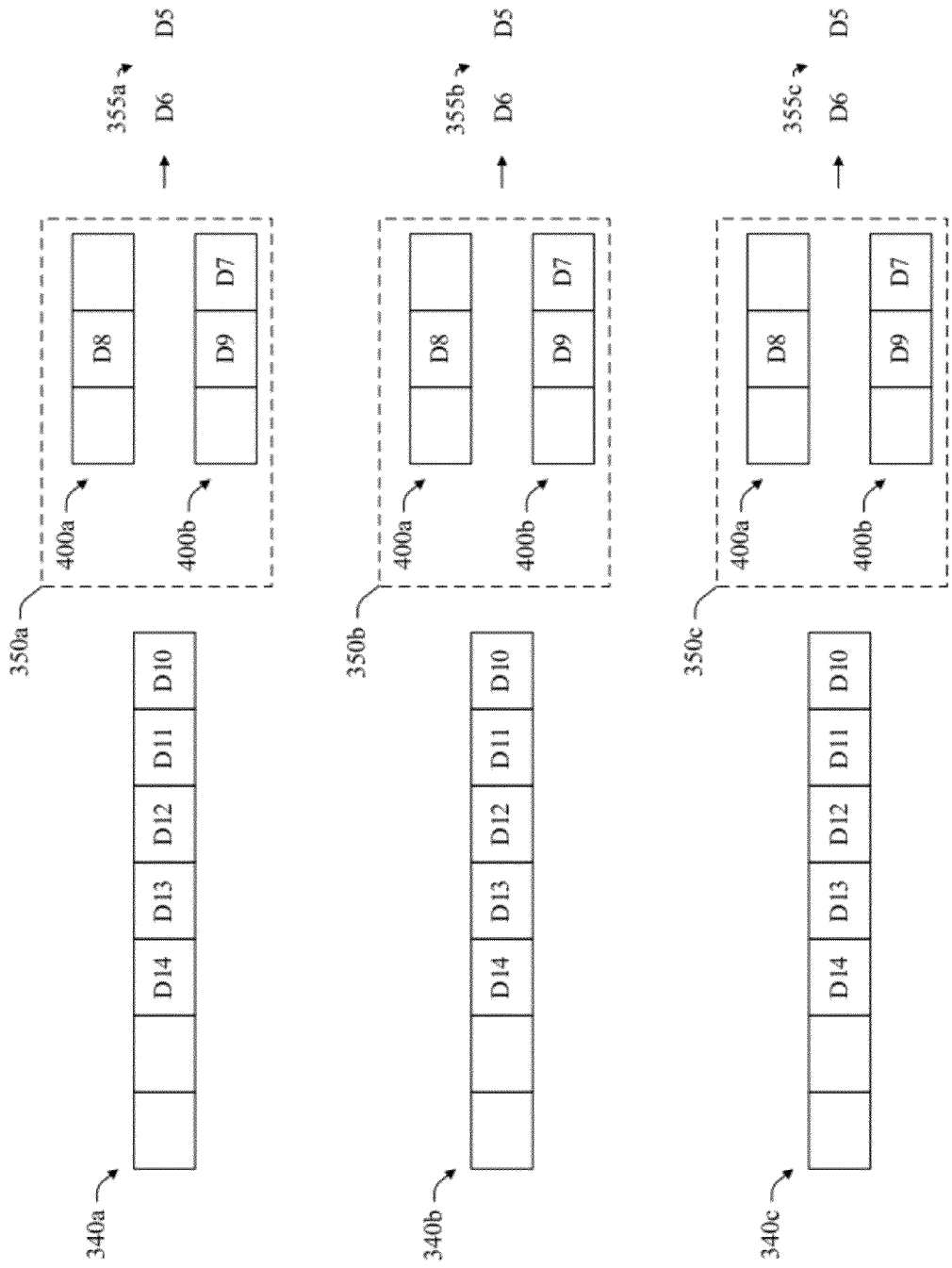

FIG. 5F illustrates the data buffers 340 and the deskew units 350 in the next clock cycle of the receiver clock signal 370. As may be envisioned from FIGS. 5E and 5F, each of the deskew units 350 has output the data symbol (D5) at the head of the data queue 400b in the deskew unit 350 and the data symbol (D6) following the head of the data queue 400a in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Further, each of the deskew units 350 has advanced the data symbol (D7) in the data queue 400b of the deskew unit 350 toward the head of the data queue 400b in the deskew unit 350. Each of the data buffers 340 has output the data symbol (D8) at the head of the data buffer 340 and the following data symbol (D9) in the data buffer 340 to the deskew unit 350 corresponding to the data buffer 340. Each of the deskew units 350 has received the data symbols (D8 and D9) output from the corresponding data buffer 340 and stored the first data symbol (D8) received from the data buffer 340 at the tail of the data queue 400a in the deskew unit 350, which follows the head of the data queue 400*a* in the deskew unit 350. Further, each of the deskew units 350 has stored the second data symbol (D9) received from the corresponding data buffer 340 at the tail of the data queue 400*b* in the deskew unit 350, which follows the head of the data queue 400*b* in the deskew unit 350.

Additionally, each of the data buffers 340 has received two data symbol (D13 and D14) of the corresponding data stream 335 and stored the data symbols (D13 and D14) at the tail of the data buffer 340 based on the reconstructed clock signal 365 corresponding to the data buffer 340 in the order in which the data buffer 340 received the data symbols (D13 and D14). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

In the embodiment illustrated in FIGS. 5A-F and described above, each of the data buffers 340 outputs two symbols to the corresponding deskew unit 350 in a clock cycle of the receiver clock signal 370. For example, the receiver 125 may receive the data streams 115 at a gen-2 serdes data rate. In another embodiment, the data buffers 340 output one symbol to the corresponding deskew unit 350 in a clock cycle of the receiver clock signal 370 and the deskew unit 350 outputs one symbol in the clock cycle. For example, the receiver 125 may receive the data streams 115 at a gen-1 serdes data rate.

In one embodiment, the receiver 125 receives the data streams 115 at a gen-1 serdes date rate. In this embodiment, the deskew unit 350 writes symbols received from the corresponding data buffer 340 into the data queue 400*a* (e.g., the even data queue) of the deskew unit 350 in even clock cycles of the receiver clock signal 370. Further, the deskew unit 350 writes symbols received from the corresponding data buffer 340 into the data queue 400*b* (e.g., the odd data queue) of the deskew unit 350 in odd clock cycles of the receiver clock signal 370. Additionally, the deskew unit 350 outputs one symbol in each clock cycle of the receiver clock signal 370. For example, the deskew unit 350 may output symbols from the data queue 400*a* of the deskew unit 350 in even clock cycles of the receiver clock signal 370 and output symbols from the data queue 400*b* of the deskew unit 350 in odd clock cycles of the receiver clock signal 370.

Figure 6A:
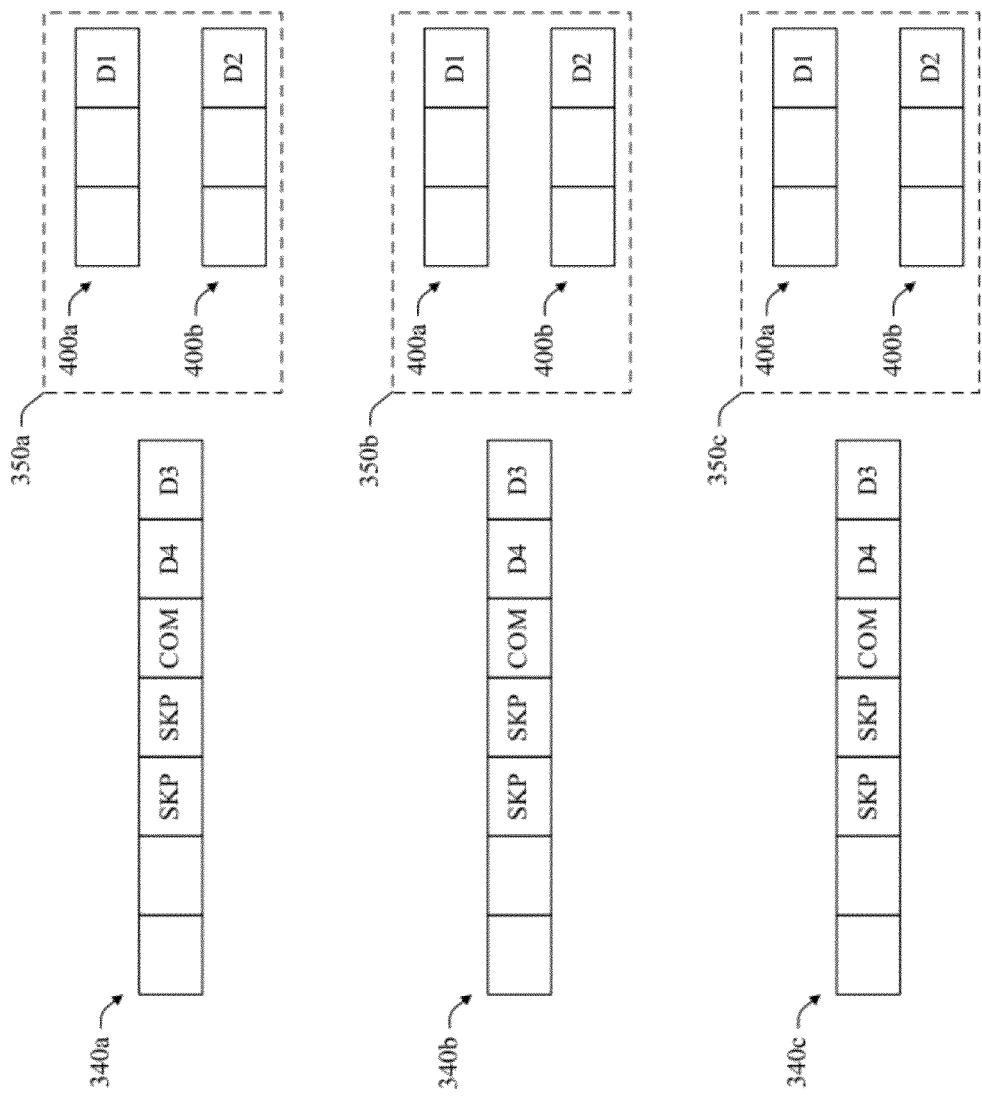

FIGS. 6A-G illustrate data buffers 340 of the compensation module 310 and data queues 400 of the deskew module 315, in accordance with an embodiment of the present invention. In this embodiment, the deskew module 315 generates minimal skip ordered sets based on the skip ordered sets of the data streams 345 and stores the minimal skip ordered sets into the deskew units 350 (e.g., the deskew units 350*a-c*) of the deskew module 315. As illustrated in FIG. 6A, the data buffers 340 (e.g., the data buffers 340*a-c*) of the compensation module 310 contain symbols of exemplary data streams 335 and the deskew units 350 of the deskew module 315 contain symbols of exemplary data streams 345.

Each of the data buffers 340 contains symbols of the data stream 335 corresponding to the data buffer 340 and each of the data queues 400 of the deskew units 350 contains symbols of the data stream 345 corresponding to the deskew unit 350. In FIGS. 6A-G, the data symbols (D) are enumerated in the order in which each data buffer 340 of the compensation module 310 receives the data symbols from the corresponding data stream 335. Although the symbols stored in the data buffers 340 are aligned across the data buffers 340 in FIG. 6A, the symbols may be misaligned from each other because the compensation module 310 modifies the number of symbols in skip ordered sets of the data streams 335 to compensate for frequency differences between the transmitter clock signal 250 and the receiver clock signal 370 and between the reconstructed clock signals 365 and the receiver clock signal 370.

As further illustrated in FIG. 6A, each of the data queues 400*a* contains a data symbol (D1) at the head of the data queue 400*a* and each of the data queues 400*b* contains a data symbol (D2) at the head of the data queue 400*b*. Each of the data buffers 340 contains a data symbol (D3) at the head of the data buffer 340, followed by another data symbol (D4) which is followed by a skip ordered set containing a comma symbol (COM) followed by two skip symbols (SKP).

Figure 6B:
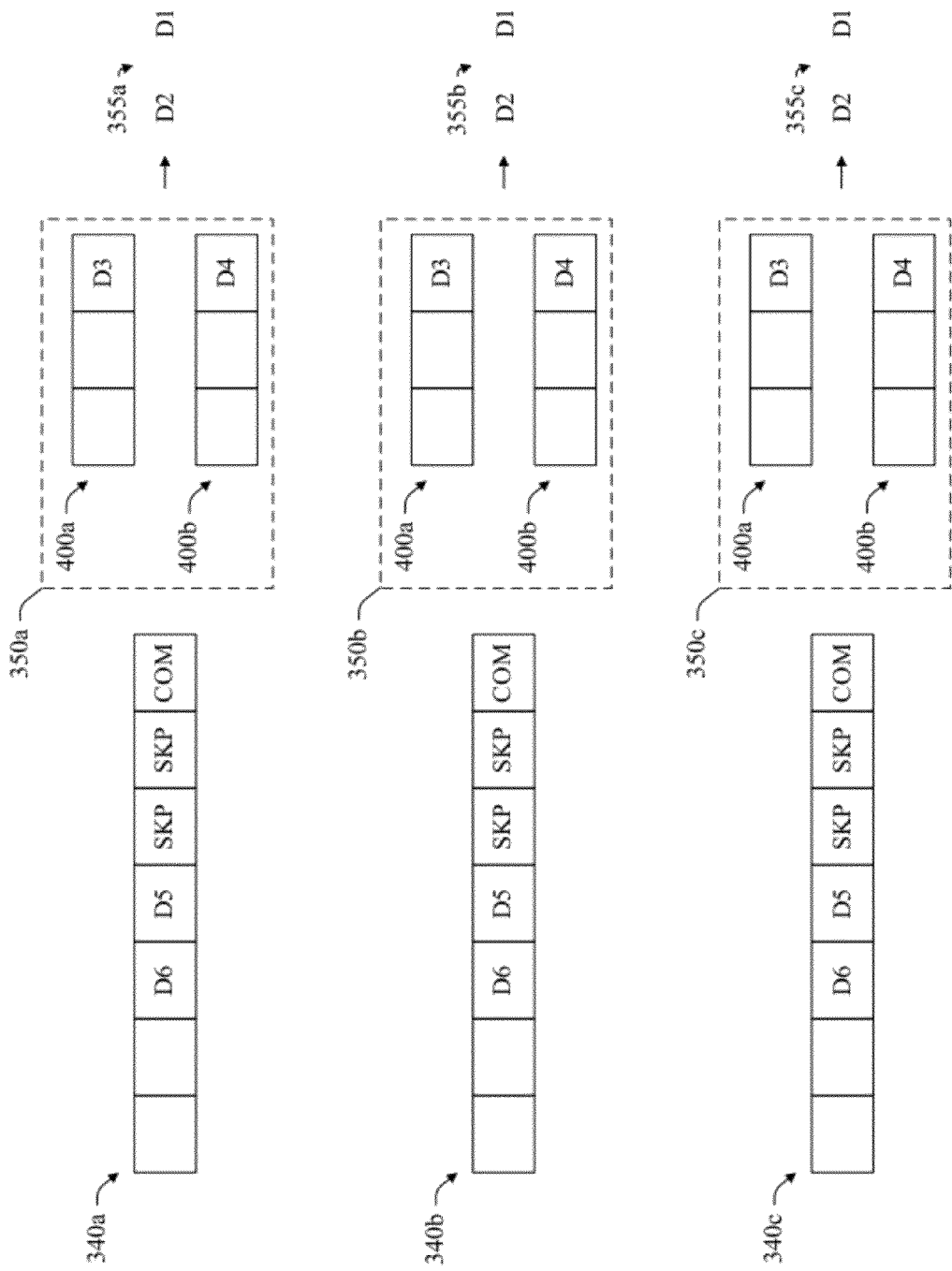

FIG. 6B illustrates the data buffers 340 and the deskew units 350 in the next clock cycle of the receiver clock signal 370. As may be envisioned from FIGS. 6A and 6B, each of the deskew units 350 has output the data symbol (D1) at the head of the data queue 400*a* in the deskew unit 350 and the data symbol (D2) at the head of the data queue 400*b* in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Each of the data buffers 340 has output the data symbol (D3) at the head of the data buffer 340 and the following data symbol (D4) in the data buffer 340 to the deskew unit 350 corresponding to the data buffer 340. Each of the deskew units 350 has received the data symbols (D3 and D4) output from the corresponding data buffer 340 and stored the first data symbol (D3) received from the data buffer 340 at the tail of the data queue 400*a* in the deskew unit 350, which is also the head of the data queue 400*a* in the deskew unit 350. Further, each of the deskew units 350 has stored the second data symbol (D4) received from the corresponding data buffer 340 at the tail of the data queue 400*b* in the deskew unit 350, which is also the head of the data queue 400*b* in the deskew unit 350.

Additionally, each of the data buffers 340 has received two data symbol (D5 and D6) of the corresponding data stream 335 and stored the data symbols (D5 and D6) at the tail of the data buffer 340 in the order in which the data buffer 340 received the data symbols (D5 and D6). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 6C:
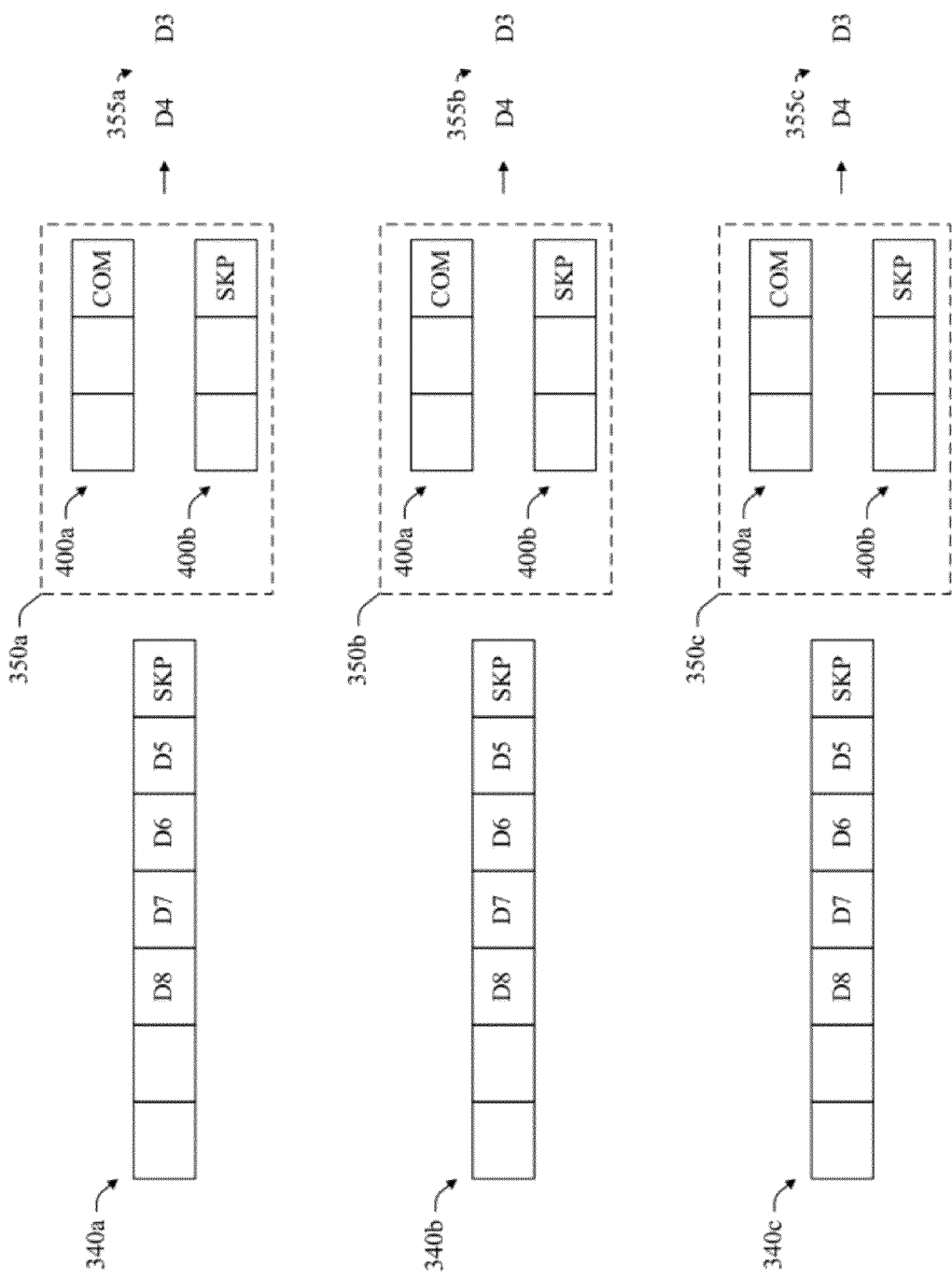

FIG. 6C illustrates the data buffers 340 and the deskew units 350 in the next clock cycle of the receiver clock signal 370. As may be envisioned from FIGS. 6B and 6C, each of the deskew units 350 has output the data symbol (D3) at the head of the data queue 400*a* in the deskew unit 350 and the data symbol (D4) at the head of the data queue 400*b* in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Each of the data buffers 340 has output the comma symbol (COM) at the head of the data buffer 340 and the following skip symbol (SKP) in the data buffer 340 to the deskew unit 350 corresponding to the data buffer 340. Each of the deskew units 350 has received the comma symbol (COM) and the skip symbol (SKP) output from the corresponding data buffer 340 and stored the comma symbol (COM) received from the data buffer 340 at the tail of the data queue 400a in the deskew unit 350, which is also the head of the data queue 400a in the deskew unit 350. Further, each of the deskew units 350 has stored the skip symbol (SKP) received from the corresponding data buffer 340 at the tail of the data queue 400b in the deskew unit 350, which is also the head of the data queue 400b in the deskew unit 350.

Additionally, each of the data buffers 340 has received two data symbol (D7 and D8) of the corresponding data stream 335 and stored the data symbols (D7 and D8) at the tail of the data buffer 340 in the order in which the data buffer 340 received the data symbols (D7 and D8). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 6D:
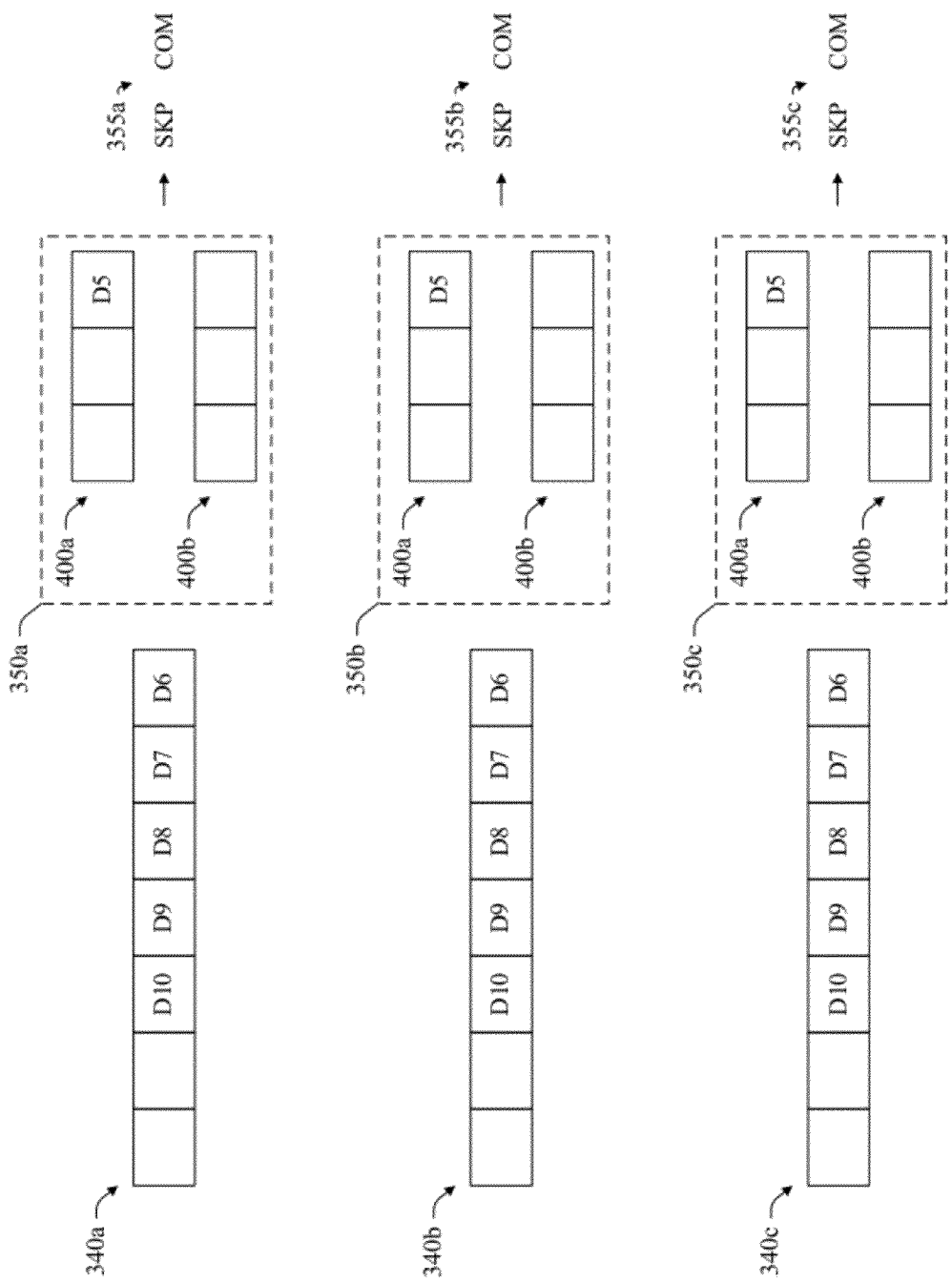

FIG. 6D illustrates the data buffers 340 and the deskew units 350 in the next clock cycle of the receiver clock signal 370. As may be envisioned from FIGS. 6C and 6D, each of the deskew units 350 has output the comma symbol (COM) at the head of the data queue 400a in the deskew unit 350 and the skip symbol (SKP) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Each of the data buffers 340 has output the skip symbol (SKP) at the head of the data buffer 340 and the following data symbol (D5) in the data buffer 340 to the deskew unit 350 corresponding to the data buffer 340. Each of the deskew units 350 has received the skip symbol (SKP) and the data symbol (D5) output from the corresponding data buffer 340 but has not stored the skip symbol (SKP) received from the data buffer 340. In this way, each of the deskew units 350 has deleted the skip symbol (SKP) received from the corresponding data buffer 340 and generated a minimal skip ordered set containing a comma symbol (COM) followed by a skip symbol (SKP). Further, each of the deskew units 350 has stored the data symbol (D5) received from the corresponding data buffer 340 at the tail of the data queue 400a in the deskew unit 350, which is also the head of the data queue 400a in the deskew unit 350.

Additionally, each of the data buffers 340 has received two data symbol (D9 and D10) of the corresponding data stream 335 and stored the data symbols (D9 and D10) at the tail of the data buffer 340 in the order in which the data buffer 340 received the data symbols (D9 and D10). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

FIG. 6E illustrates the data buffers 340 and the deskew units 350 in the next clock cycle of the receiver clock signal 370. As may be envisioned from FIGS. 6E and 6F, each of the deskew units 350 has inserted two the skip symbol (SKP) into the corresponding data stream 355 in the clock cycle without outputting a symbol from the data queues 400a-b in the deskew unit 350 because the head of the data queue 400a in the deskew unit 350 contained a data symbol (D5) but the head of the data queue 400b in the deskew unit 350 was void (e.g., did not contain a symbol). Moreover, each of the deskew units 350 has output a symbol received from the corresponding data buffer 340 of the compensation module 310 into the corresponding data stream 355 in the same order in which the deskew unit 350 received the symbol from the corresponding data buffer 340.

Each of the data buffers 340 has output the data symbol (D6) at the head of the data buffer 340 and the following data symbol (D7) in the data buffer 340 to the deskew unit 350 corresponding to the data buffer 340. Each of the deskew units 350 has received the data symbols (D6 and D7) output from the corresponding data buffer 340 and stored the first data symbol (D6) received from the data buffer 340 at the tail of the data queue 400b in the deskew unit 350, which is also the head of the data queue 400b in the deskew unit 350. Further, each of the deskew units 350 has stored the second data symbol (D7) received from the corresponding data buffer 340 at the tail of the data queue 400a in the deskew unit 350, which follows the head of the data queue 400a in the deskew unit 350.

Additionally, each of the data buffers 340 has received two data symbol (D11 and D12) of the corresponding data stream 335 and stored the data symbols (D11 and D12) at the tail of the data buffer 340 in the order in which the data buffer 340 received the data symbols (D11 and D12). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

FIG. 6F illustrates the data buffers 340 and the deskew units 350 in the next clock cycle of the receiver clock signal 370. As may be envisioned from FIGS. 6E and 6F, each of the deskew units 350 has output the data symbol (D5) at the head of the data queue 400b in the deskew unit 350 and the data symbol (D7) at the head of the data queue 400a in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Further, each of the deskew units 350 has advanced the data symbol (D7) following the head of the data queue 400a in the deskew unit 350 toward the head of the data queue 400a in the deskew unit 350. Each of the data buffers 340 has output the data symbol (D8) at the head of the data buffer 340 and the following data symbol (D9) in the data buffer 340 to the deskew unit 350 corresponding to the data buffer 340. Each of the deskew units 350 has received the data symbols (D8 and D9) output from the corresponding data buffer 340 and stored the first data symbol (D8) received from the data buffer 340 at the tail of the data queue 400b in the deskew unit 350, which is also the head of the data queue 400b in the deskew unit 350. Further, each of the deskew units 350 has stored the second data symbol (D9) received from the corresponding data buffer 340 at the tail of the data queue 400a in the deskew unit 350, which follows the head of the data queue 400a in the deskew unit 350.

FIG. 6G illustrates the data buffers 340 and the deskew units 350 in the next clock cycle of the receiver clock signal 370. As may be envisioned from FIGS. 6F and 6G, each of the deskew units 350 has output the data symbol (D7) at the head of the data queue 400b in the deskew unit 350 and the data symbol (D8) at the head of the data queue 400a in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Further, each of the deskew units 350 has advanced the data symbol (D9) following the head of the data queue 400a in the deskew unit 350 toward the head of the data queue 400a in the dekskew unit 350. Each of the data buffers 340 has output the data symbol (D10) at the head of the data buffer 340 and the following data symbol (D11) in the data buffer 340 to the deskew unit 350 corresponding to the data buffer 340. Each of the deskew units 350 has received the data symbols (D10 and D11) output from the corresponding data buffer 340 and stored the first data symbol (D10) received from the data buffer 340 at the tail of the data queue 400b in the deskew unit 350, which is also the head of the data queue 400b in the deskew unit 350. Further, each of the deskew units 350 has stored the second data symbol (D11) received from the corresponding data buffer 340 at the tail of the data queue 400a in the deskew unit 350, which follows the head of the data queue 400a in the deskew unit 350.

In the embodiment illustrated in FIGS. 6A-G and described above, each of the data buffers 340 outputs two symbols to the corresponding deskew unit 350 in a clock cycle of the receiver clock signal 370. For example, the receiver 125 may receive the data streams 115 at a gen-2 serdes data rate. In another embodiment, the data buffers 340 output one symbol to the corresponding deskew unit 350 in a clock cycle of the receiver clock signal 370 and the deskew unit 350 outputs one symbol in the clock cycle. For example, the receiver 125 may receive the data streams 115 at a gen-1 serdes data rate.

In one embodiment, the receiver 125 receives the data streams 115 at a gen-1 serdes date rate. In this embodiment, the deskew unit 350 writes symbols received from the corresponding data buffer 340 into the data queue 400a (e.g., the even data queue) of the deskew unit 350 in even clock cycles of the receiver clock signal 370. Further, the deskew unit 350 writes symbols received from the corresponding data buffer 340 into the data queue 400b (e.g., the odd data queue) of the deskew unit 350 in odd clock cycles of the receiver clock signal 370. Additionally, the deskew unit 350 outputs one symbol in each clock cycle of the receiver clock signal 370. For example, the deskew unit 350 may output symbols from the data queue 400a of the deskew unit 350 in even clock cycles of the receiver clock signal 370 and output symbols from the data queue 400b of the deskew unit 350 in odd clock cycles of the receiver clock signal 370.

Figure 7A:
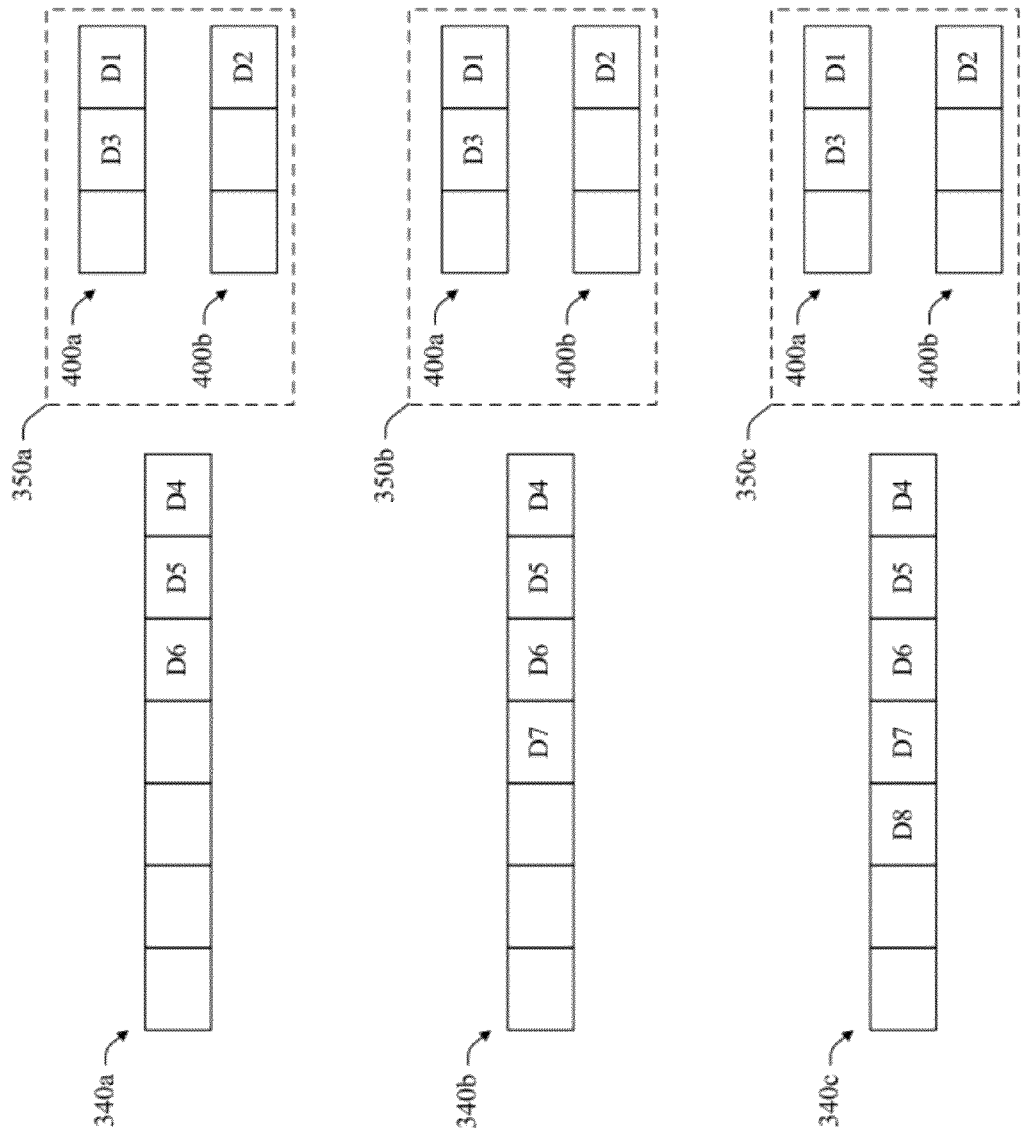

FIGS. 7A-H illustrate data buffers 340 of the compensation module 310 and data queues 400 of the deskew module 315, in accordance with an embodiment of the present invention. In this embodiment, the deskew module 315 generates minimal skip ordered sets based on the skip ordered sets of the data streams 345 and stores the minimal skip ordered sets into the deskew units 350 (e.g., the deskew units 350a-c) of the deskew module 315. As illustrated in FIG. 7A, the data buffers 340 (e.g., the data buffers 340a-c) of the compensation module 310 contain symbols of exemplary data streams 335 and the deskew units 350 of the deskew module 315 contain symbols of exemplary data streams 345.

Each of the data buffers 340 contains symbols of the data stream 335 corresponding to the data buffer 340 and each of the data queues 400 of the deskew units 350 contains symbols of the data stream 345 corresponding to the deskew unit 350. Each of the data buffers 340 contains a different number of symbols because the data rates of the data streams 335 have varied over a time period. As may be envisioned from FIG. 7A, the data rate of the data stream 335a is slower than the data rate of the data stream 335b and the data rate of the data stream 335c is faster than the data rate of the data stream 335b. In FIGS. 7A-H, the data symbols (D) are enumerated in the order in which each data buffer 340 of the compensation module 310 receives the data symbols from the corresponding data stream 335. Although the symbols stored in the data buffers 340 are aligned across the data buffers 340 in FIG. 7A, the symbols may be misaligned from each other because the compensation module 310 modifies the number of symbols in skip ordered sets of the data streams 335 to compensate for frequency differences between the transmitter clock signal 250 and the receiver clock signal 370 and between the reconstructed clock signals 365 and the receiver clock signal 370.

As further illustrated in FIG. 7A, each of the data queues 400a of the deskew units 350 contains a data symbol (D1) at the head of the data queue 400a and a data symbol D3 following the head of the data queue 400a. Additionally, each of the data queues 400b of the deskew units 350 contains a data symbol (D2) at the head of the data queue 400b. As may be envisioned from FIGS. 6G and 7A, the data buffers 340 and the deskew units 350 of FIG. 7A contain data units further downstream in the data streams 335 than the data units contained in the data buffers 340 and the deskew units 350 of FIG. 6G.

Figure 7B:
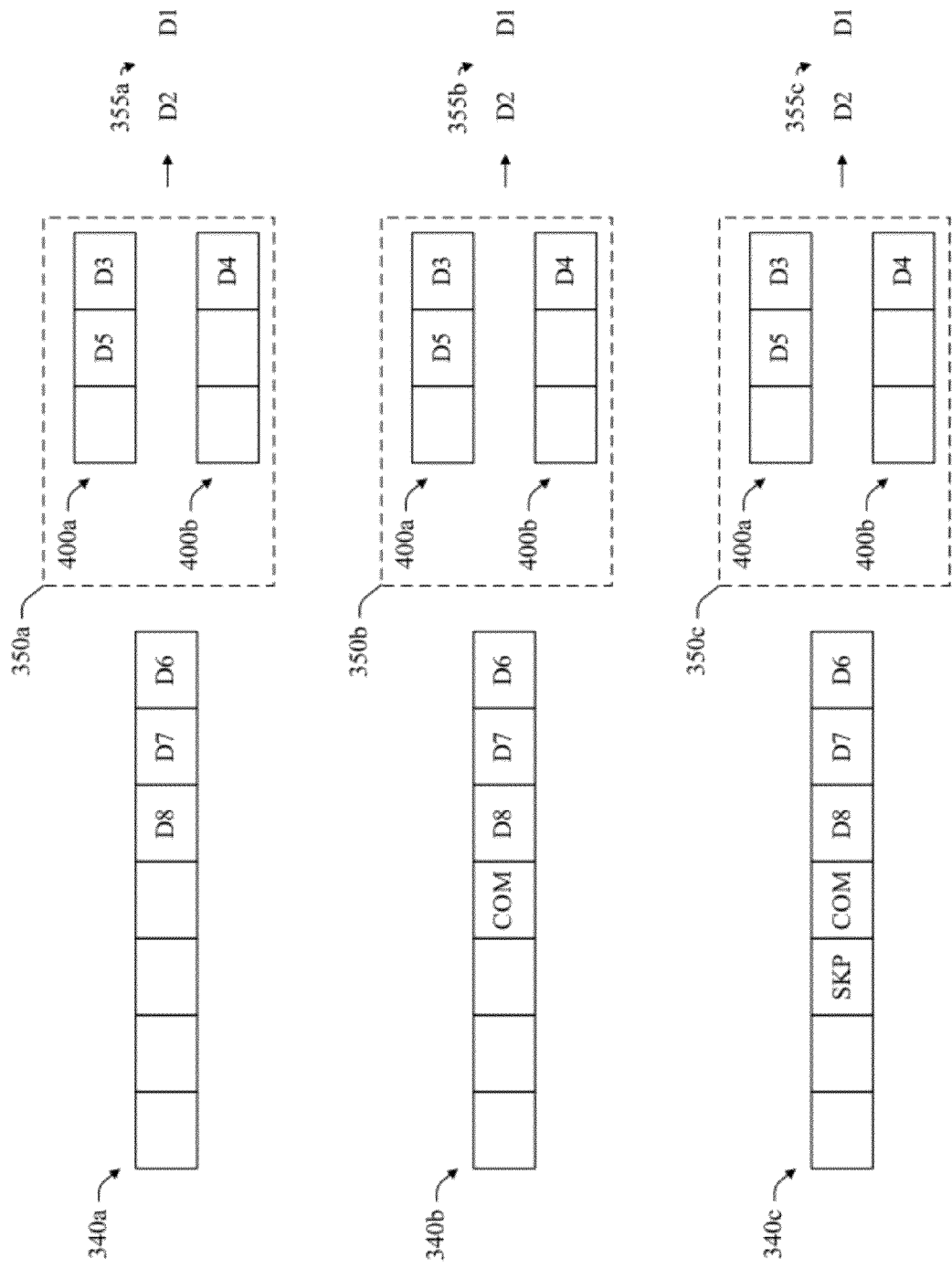

FIG. 7B illustrates the data buffers 340 and the deskew units 350 in the next clock cycle of the receiver clock signal 370. As may be envisioned from FIGS. 7A and 7B, each of the deskew units 350 has output the data symbol (D1) at the head of the data queue 400a in the deskew unit 350 and the data symbol (D2) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Each of the data buffers 340 has output the data symbol (D4) at the head of the data buffer 340 and the following data symbol (D5) in the data buffer 340 to the deskew unit 350 corresponding to the data buffer 340. Each of the deskew units 350 has received the data symbols (D4 and D5) output from the corresponding data buffer 340 and stored the first data symbol (D4) received from the data buffer 340 at the tail of the data queue 400b in the deskew unit 350, which is also the head of the data queue 400b in the deskew unit 350. Further, each of the deskew units 350 has stored the second data symbol (D5) received from the corresponding data buffer 340 at the tail of the data queue 400a in the deskew unit 350, which follows the head of the data queue 400a in the deskew unit 350.

Additionally, each of the data buffers 340 has received two data symbol (D7 and D8) of the corresponding data stream 335 and stored the data symbols (D7 and D8) at the tail of the data buffer 340 in the order in which the data buffer 340a received the data symbols (D7 and D8). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

FIG. 7C illustrates the data buffers 340 and the deskew units 350 in the next clock cycle of the receiver clock signal 370. As may be envisioned from FIGS. 7B and 7C, each of the deskew units 350 has output the data symbol (D3) at the head of the data queue 400b in the deskew unit 350 and the data symbol (D4) at the head of the data queue 400a in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Each of the data buffers 340 has output the data symbol (D6) at the head of the data buffer 340 and the following data symbol (D7) in the data buffer 340 to the deskew unit 350 corresponding to the data buffer 340. Each of the deskew units 350 has received the data symbols (D6 and D7) output from the corresponding data buffer 340 and stored the first data symbol (D6) received from the data buffer 340 at the tail of the data queue 400b in the deskew unit 350, which is also the head of the data queue 400b in the deskew unit 350. Additionally, each of the deskew units 350 has stored the second data symbol (D7) received from the corresponding data buffer 340 at the tail of the data queue 400a in the deskew unit 350, which follows the head of the data queue 400a in the deskew unit 350.

Additionally, the data buffer 340a has received a comma symbol (COM) and a skip symbol (SKP) of a skip ordered set from the corresponding data stream 335a and stored the comma symbol (COM) and the skip symbol (SKP) at the tail of the data buffer 340a in the order in which the data buffer 340a received the comma symbol (COM) and the skip symbol (SKP). Further, the data buffer 340a has added a skip symbol (SKP) at the tail of the data buffer 340a. In this way, the data buffer 340a has modified the number of skip symbols (SKP) in the skip ordered set received from the data stream 335a to compensate for different data rates among the data streams 345a-c. The data buffer 340b has received two skip symbols (SKP) of the corresponding data stream 335b and stored the skip symbols (SKP) at the tail of the data buffer 340b in the order in which the data buffer 340b received the skip symbols (SKP). The data buffer 340c has received a skip symbol (SKP) and a data symbol (D8) and has discarded (e.g., deleted) the skip symbol (SKP) and stored the data symbol (D8) at the tail of the data buffer 340c. In this way, the data buffer 340c has modified the number of skip symbols (SKP) in the skip ordered set received from the data stream 335c to compensate for different data rates among the data streams 345a-c. Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 7D:
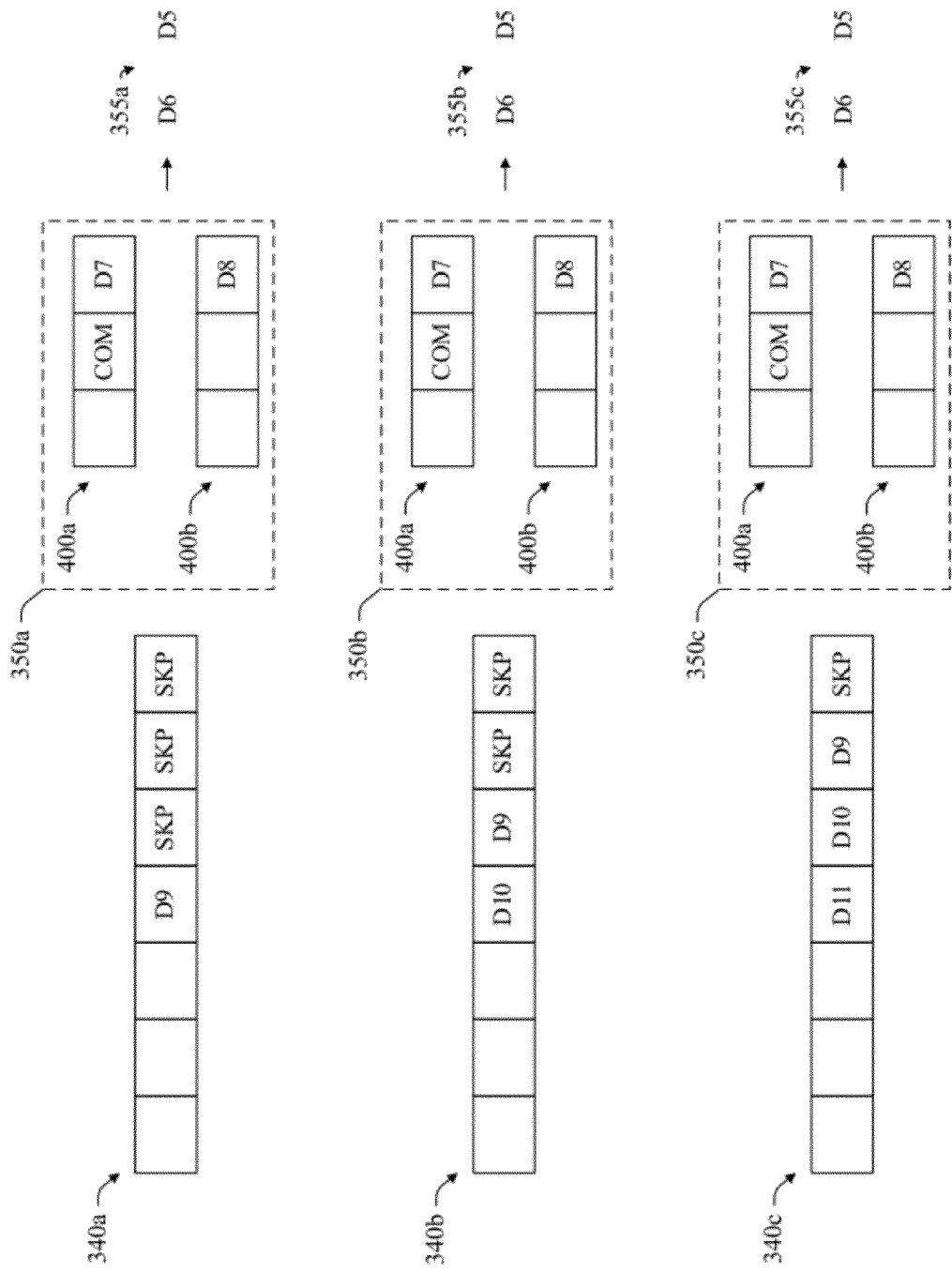

FIG. 7D illustrates the data buffers 340 and the deskew units 350 in the next clock cycle of the receiver clock signal 370. As may be envisioned from FIGS. 7C and 7D, each of the deskew units 350 has output the data symbol (D5) at the head of the data queue 400a in the deskew unit 350 and the data symbol (D6) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Each of the data buffers 340 has output the data symbol (D8) at the head of the data buffer 340 and the following comma symbol (COM) in the data buffer 340 to the deskew unit 350 corresponding to the data buffer 340. Each of the deskew units 350 has received the data symbol (D8) and the comma symbol (COM) output from the corresponding data buffer 340 and stored the data symbol (D8) received from the data buffer 340 at the tail of the data queue 400b in the deskew unit 350, which is also the head of the data queue 400b in the deskew unit 350. Further, each of the deskew units 350 has stored the comma symbol (COM) received from the corresponding data buffer 340 at the tail of the data queue 400a in the deskew unit 350, which follows the head of the data queue 400a in the deskew unit 350.

Additionally, the data buffer 340a has received a skip symbol (SKP) and a data symbol (D9) of the corresponding data stream 335a and stored the skip symbol (SKP) and the data symbol (D9) at the tail of the data buffer 340a in the order in which the data buffer 340a received the skip symbol (SKP) and the data symbol (D9). The data buffer 340b has received two data symbols (D9 and D10) of the corresponding data stream 335b and stored the data symbols (D9 and D10) at the tail of the data buffer 340b in the order in which the data buffer 340b received the data symbols (D9 and D10). The data buffer 340c has received two data symbols (D10 and D11) of the corresponding data stream 335c and stored the data symbols (D10 and D11) at the tail of the data buffer 340c in the order in which the data buffer 340c received the data symbols (D10 and D11). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 7E:
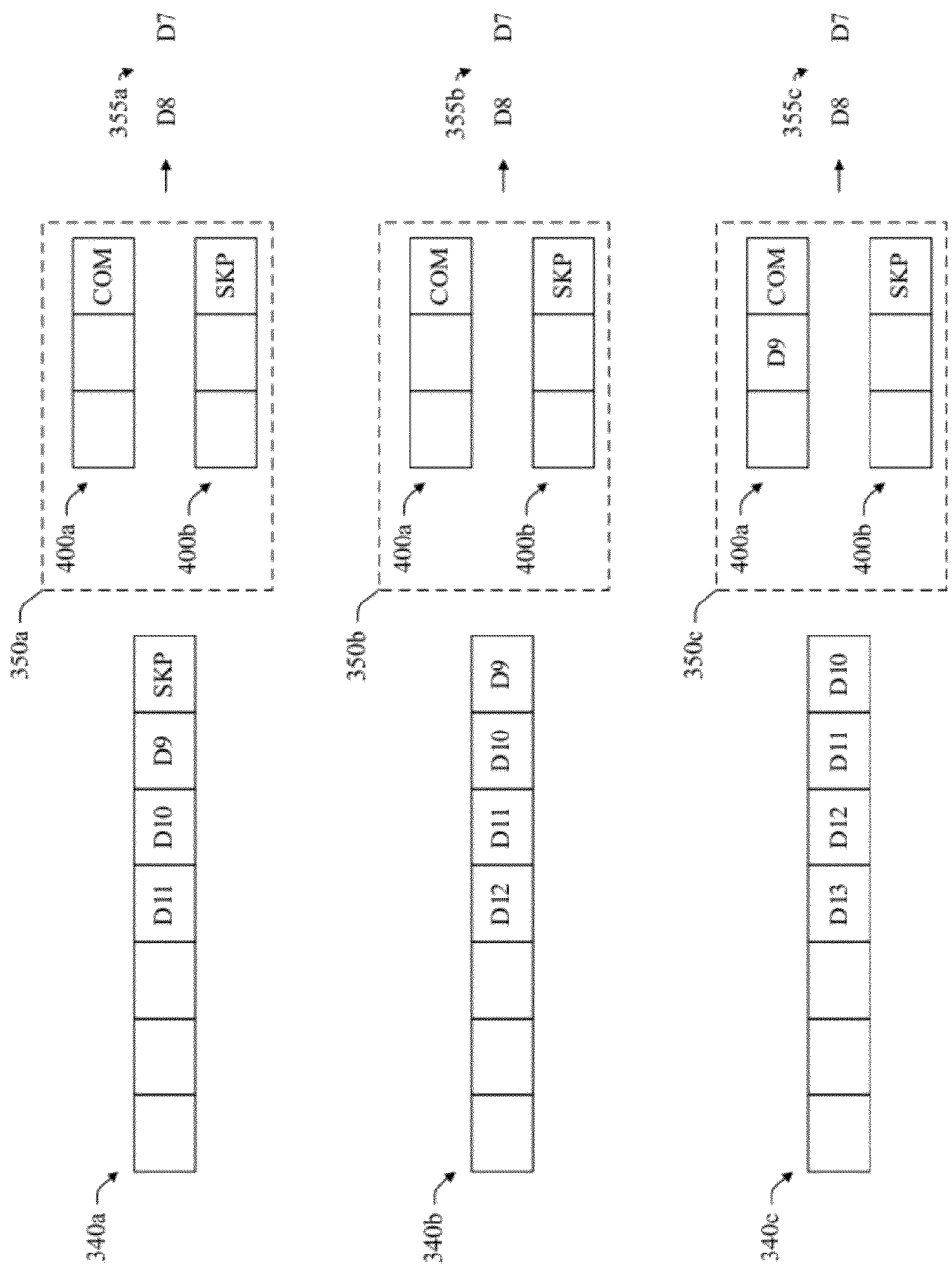

FIG. 7E illustrates the data buffers 340 and the deskew units 350 in the next clock cycle of the receiver clock signal 370. As may be envisioned from FIGS. 7D and 7E, each of the deskew units 350 has output the data symbol (D7) at the head of the data queue 400a in the deskew unit 350 and the data symbol (D8) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

The data buffer 340a has output the skip symbol (SKP) at the head of the data buffer 340a and the following skip symbol (SKP) in the data buffer 340a to the deskew unit 350a corresponding to the data buffer 340a. The deskew unit 350a has received the two skip symbols (SKP) output from the corresponding data buffer 340a and stored one of the skip symbols received from the corresponding data buffer 340a at the tail of the data queue 400b in the deskew unit 350a, which is also the head of the data queue 400b in the deskew unit 350a. In this way, the deskew unit 350a has discarded (e.g., deleted) one of the skip symbols (SKP) received from the corresponding data buffer 340a and generated a minimal skip ordered set containing a comma symbol (COM) followed by a skip symbol (SKP).

The data buffer 340b has output the skip symbol (SKP) at the head of the data buffer 340b and the following skip symbol (SKP) in the data buffer 340b to the deskew unit 350b corresponding to the data buffer 340b. The deskew unit 350b has received the two skip symbols (SKP) output from the corresponding data buffer 340b and stored one of the skip symbols received from the corresponding data buffer 340b at the tail of the data queue 400b in the deskew unit 350b, which is also the head of the data queue 400b in the deskew unit 350b. In this way, the deskew unit 350b has discarded (e.g., deleted) one of the skip symbols (SKP) received from the corresponding data buffer 340*b* and generated a minimal skip ordered set containing a comma symbol (COM) followed by a skip symbol (SKP).

The data buffer 340*c* has output the skip symbol (SKP) at the head of the data buffer 340*b* and the following data symbol (D9) in the data buffer 340*c* to the deskew unit 350*c* corresponding to the data buffer 340*c*. The deskew unit 350*c* has received the skip symbol (SKP) and the data symbol (D9) output from the corresponding data buffer 340*c* and stored the skip symbol (SKP) received from the corresponding data buffer 340*c* at the tail of the data queue 400*b* in the deskew unit 350*c*, which is also the head of the data queue 400*c* in the deskew unit 350*b*. Additionally, the deskew unit 350*c* has stored the data symbol (D9) received from the corresponding data buffer 340*c* at the tail of the data queue 400*a* in the deskew unit 350*c*, which follows the head of the data queue 400*a* in the deskew unit 350*c*. In this way, the deskew unit 350*c* has generated a minimal skip ordered set containing a comma symbol (COM) followed by a skip symbol (SKP).

Additionally, the data buffer 340*a* has received two data symbols (D10 and D11) of the corresponding data stream 335*a* and stored the data symbols (D10 and D11) at the tail of the data buffer 340*a* in the order in which the data buffer 340*a* received the data symbols (D10 and D11). The data buffer 340*b* has received two data symbols (D11 and D12) of the corresponding data stream 335*b* and stored the data symbols (D11 and D12) at the tail of the data buffer 340*b* in the order in which the data buffer 340*b* received the data symbols (D11 and D12). The data buffer 340*c* has received two data symbols (D12 and D13) of the corresponding data stream 335*c* and stored the data symbols (D12 and D13) at the tail of the data buffer 340*c* in the order in which the data buffer 340*c* received the data symbols (D12 and D13). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 7F:
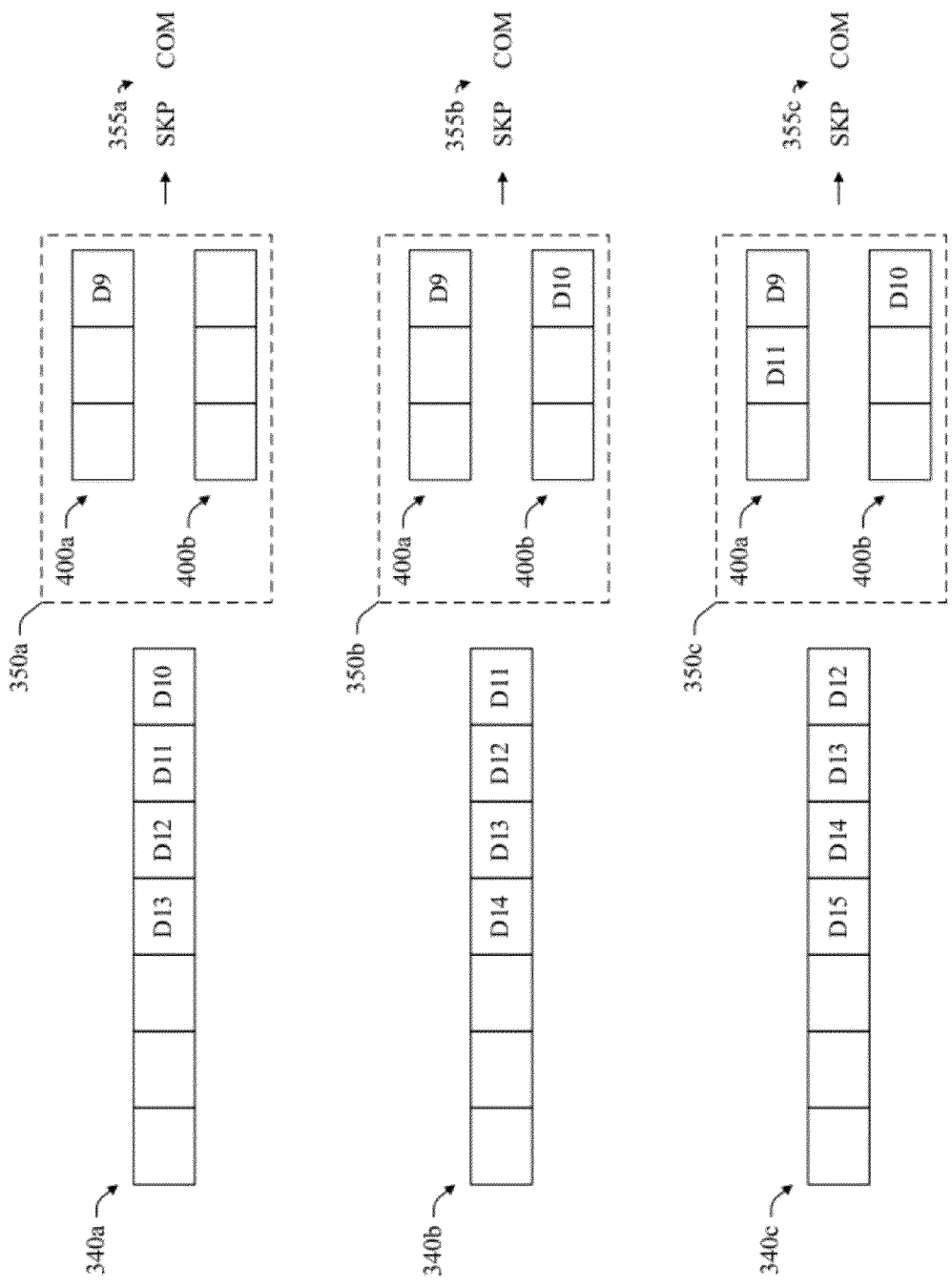

FIG. 7F illustrates the data buffers 340 and the deskew units 350 in the next clock cycle of the receiver clock signal 370. As may be envisioned from FIGS. 7E and 7F, each of the deskew units 350 has output the comma symbol (COM) at the head of the data queue 400*a* in the deskew unit 350 and the skip symbol (SKP) at the head of the data queue 400*b* in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Further, the deskew unit 350*c* has advanced the data symbol (D9) in the data queue 400*a* of the deskew unit 350*c* toward the head of the data queue 400*a* in the deskew unit 350*c*. The data buffer 340*a* has output the skip symbol (SKP) at the head of the data buffer 340*a* and the following data symbol (D9) in the data buffer 340*a* to the deskew unit 350*a* corresponding to the data buffer 340*a*. The deskew unit 350*a* has received the skip symbol (SKP) and the data symbol (D9) output from the corresponding data buffer 340*a* and stored the data symbol (D9) received from the corresponding data buffer 340*a* at the tail of the data queue 400*a* in the deskew unit 350*a*, which follows the head of the data queue 400*a* in the deskew unit 350*a*. In this way, the deskew unit 350*a* has deleted the skip symbol (SKP) received from the corresponding data buffer 340*a*.

The data buffer 340*b* has output the data symbol (D9) at the head of the data buffer 340*b* and the following data symbol (D10) in the data buffer 340*b* to the deskew unit 350*b* corresponding to the data buffer 340*b*. The deskew unit 350*b* has received the data symbols (D9 and D10) output from the corresponding data buffer 340*b* and stored the first data symbol (D9) received from the corresponding data buffer 340*b* at the tail of the data queue 400*a* in the deskew unit 350*b*, which is also the head of the data queue 400*a* in the deskew unit 350*b*. Additionally, the deskew unit 350*b* has stored the second data symbol (D10) received from the corresponding data buffer 340*b* at the tail of the data queue 400*b* in the deskew unit 350*b*, which is also the head of the data queue 400*b* in the deskew unit 350*b*.

The data buffer 340*c* has output the data symbol (D10) at the head of the data buffer 340*c* and the following data symbol (D11) in the data buffer 340*c* to the deskew unit 350*c* corresponding to the data buffer 340*c*. The deskew unit 350*c* has received the data symbols (D10 and D11) output from the corresponding data buffer 340*c* and stored the first data symbol (D10) received from the corresponding data buffer 340*c* at the tail of the data queue 400*b* in the deskew unit 350*c*, which is also the head of the data queue 400*b* in the deskew unit 350*c*. Additionally, the deskew unit 350*c* has stored the second data symbol (D11) received from the corresponding data buffer 340*c* at the tail of the data queue 400*a* in the deskew unit 350*c*, which follows the head of the data queue 400*a* in the deskew unit 350*c*.

Additionally, the data buffer 340*a* has received two data symbols (D12 and D13) of the corresponding data stream 335*a* and stored the data symbols (D12 and D13) at the tail of the data buffer 340*a* in the order in which the data buffer 340*a* received the data symbols (D12 and D13). The data buffer 340*b* has received two data symbols (D13 and D14) of the corresponding data stream 335*b* and stored the data symbols (D13 and D14) at the tail of the data buffer 340*b* in the order in which the data buffer 340*b* received the data symbols (D13 and D14). The data buffer 340*c* has received two data symbols (D14 and D15) of the corresponding data stream 335*c* and stored the data symbols (D14 and D15) at the tail of the data buffer 340*c* in the order in which the data buffer 340*c* received the data symbols (D14 and D15). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 7G:
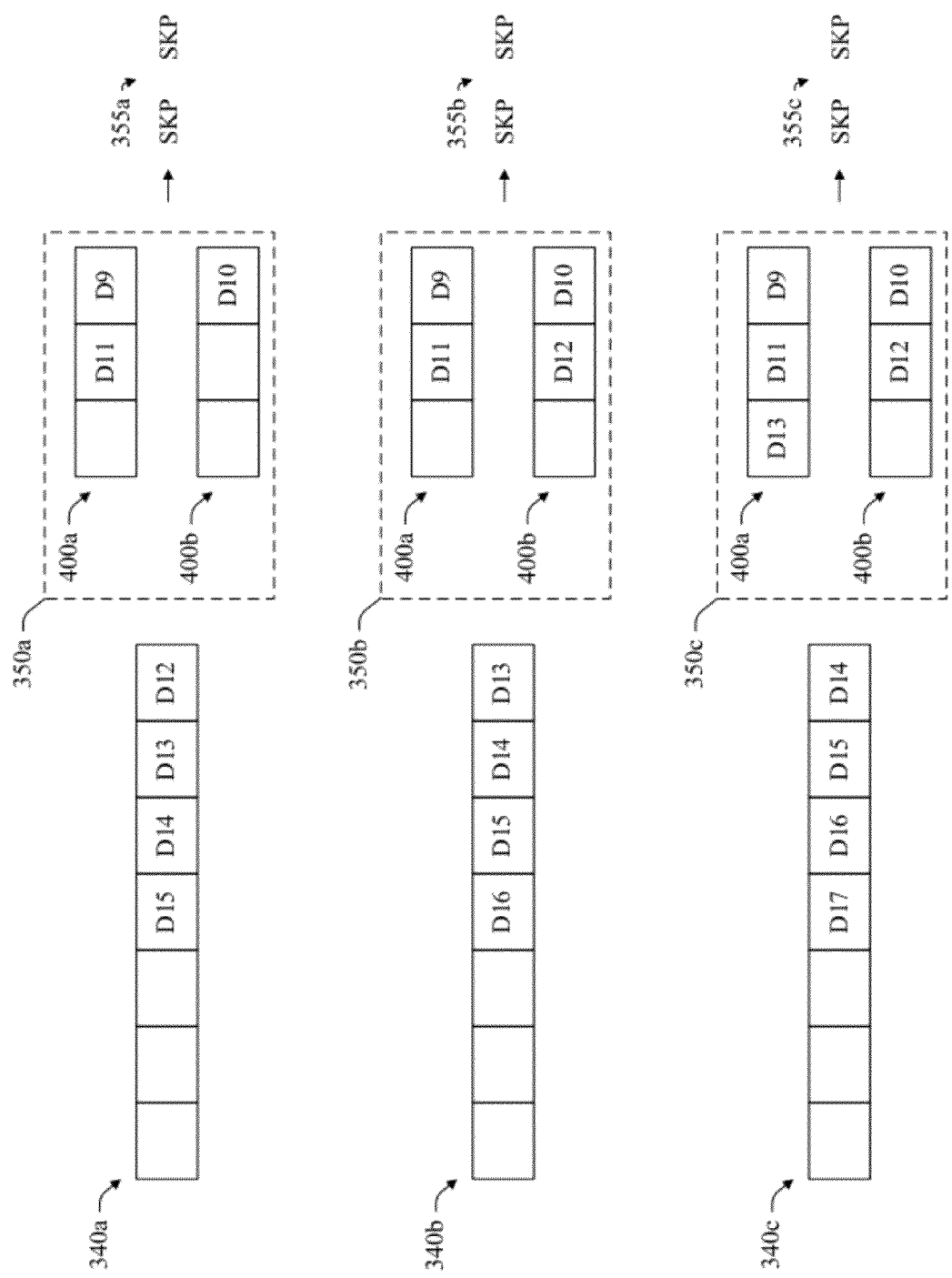

FIG. 7G illustrates the data buffers 340 and the deskew units 350 in the next clock cycle of the receiver clock signal 370. As may be envisioned from FIGS. 7F and 7G, each of the deskew units 350 has output two skip symbols (SKP) because each of the data queues 400 in the deskew unit 350*a* does not have a data symbol at the head of the data queue 400 and therefore data symbols are not aligned across the heads of the data queues 400 in the deskew units 350. In this way, each of the deskew units 350 has inserted two skip symbols (SKP) into the data stream 355 corresponding to the deskew unit 350. Nonetheless, the order of the symbols output from the data queues 400*a*-*b* of each deskew unit 350 is the same order in which the deskew unit 350 received the symbols from the corresponding data buffer 340 of the compensation module 310.

Additionally, the data buffer 340*a* has output the data symbol (D10) at the head of the data buffer 340*a* and the following data symbol (D11) in the data buffer 340*a* to the deskew unit 350*a* corresponding to the data buffer 340*a*. The deskew unit 350*a* has received the data symbols (D10 and D11) output from the corresponding data buffer 340*a* and stored the first data symbol (D10) received from the corresponding data buffer 340*a* at the tail of the data queue 400*b* in the deskew unit 350*a*, which is also the head of the data queue 400*b*. Additionally, the deskew unit 350*a* has stored the second data symbol (D11) received from the corresponding data buffer 340*a* at the tail of the data queue 400*a* in the deskew unit 350*a*, which follows the head of the data queue 400*a* in the deskew unit 350*a*.

The data buffer 340*b* has output the data symbol (D11) at the head of the data buffer 340*b* and the following data symbol (D12) in the data buffer 340*b* to the deskew unit 350*b* corresponding to the data buffer 340*b*. The deskew unit 350*b* has received the data symbols (D11 and D12) output from the corresponding data buffer 340*b* and stored the first data symbol (D11) received from the corresponding data buffer 340*b* at the tail of the data queue 400*a* in the deskew unit 350*b*, which follows the head of the data queue 400*a* in the deskew unit 350*b*. Additionally, the deskew unit 350*b* has stored the second data symbol (D12) received from the corresponding data buffer 340*b* at the tail of the data queue 400*b* in the deskew unit 350*b*, which follows the head of the data queue 400*b* in the deskew unit 350*b*.

The data buffer 340*c* has output the data symbol (D12) at the head of the data buffer 340*c* and the following data symbol (D13) in the data buffer 340*c* to the deskew unit 350*c* corresponding to the data buffer 340*c*. The deskew unit 350*c* has received the data symbols (D12 and D13) output from the corresponding data buffer 340*c* and stored the first data symbol (D12) received from the corresponding data buffer 340*c* at the tail of the data queue 400*b* in the deskew unit 350*c*, which follows the head of the data queue 400*b* in the deskew unit 350*c*. Additionally, the deskew unit 350*c* has stored the second data symbol (D13) received from the corresponding data buffer 340*c* at the tail of the data queue 400*a* in the deskew unit 350*c* after the data symbol (D11) which follows the head of the data queue 400*a*. Moreover, the data symbols (D8 and D9) are now aligned across the data queues 400 of the deskew units 350.

Additionally, the data buffer 340*a* has received two data symbols (D14 and D15) of the corresponding data stream 335*a* and stored the data symbols (D14 and D15) at the tail of the data buffer 340*a* in the order in which the data buffer 340*a* received data symbols (D14 and D15). The data buffer 340*b* has received two data symbols (D15 and D16) of the corresponding data stream 335*b* and stored the data symbols (D15 and D16) at the tail of the data buffer 340*b* in the order in which the data buffer 340*b* received the data symbols (D15 and D16). The data buffer 340*c* has received two data symbols (D16 and D17) of the corresponding data stream 335*c* and stored the data symbols (D16 and D17) at the tail of the data buffer 340*c* in the order in which the data buffer 340*c* received the data symbols (D16 and D17). Thus, each of the data buffers 340 has received two symbols in the clock cycle and has output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 7H:
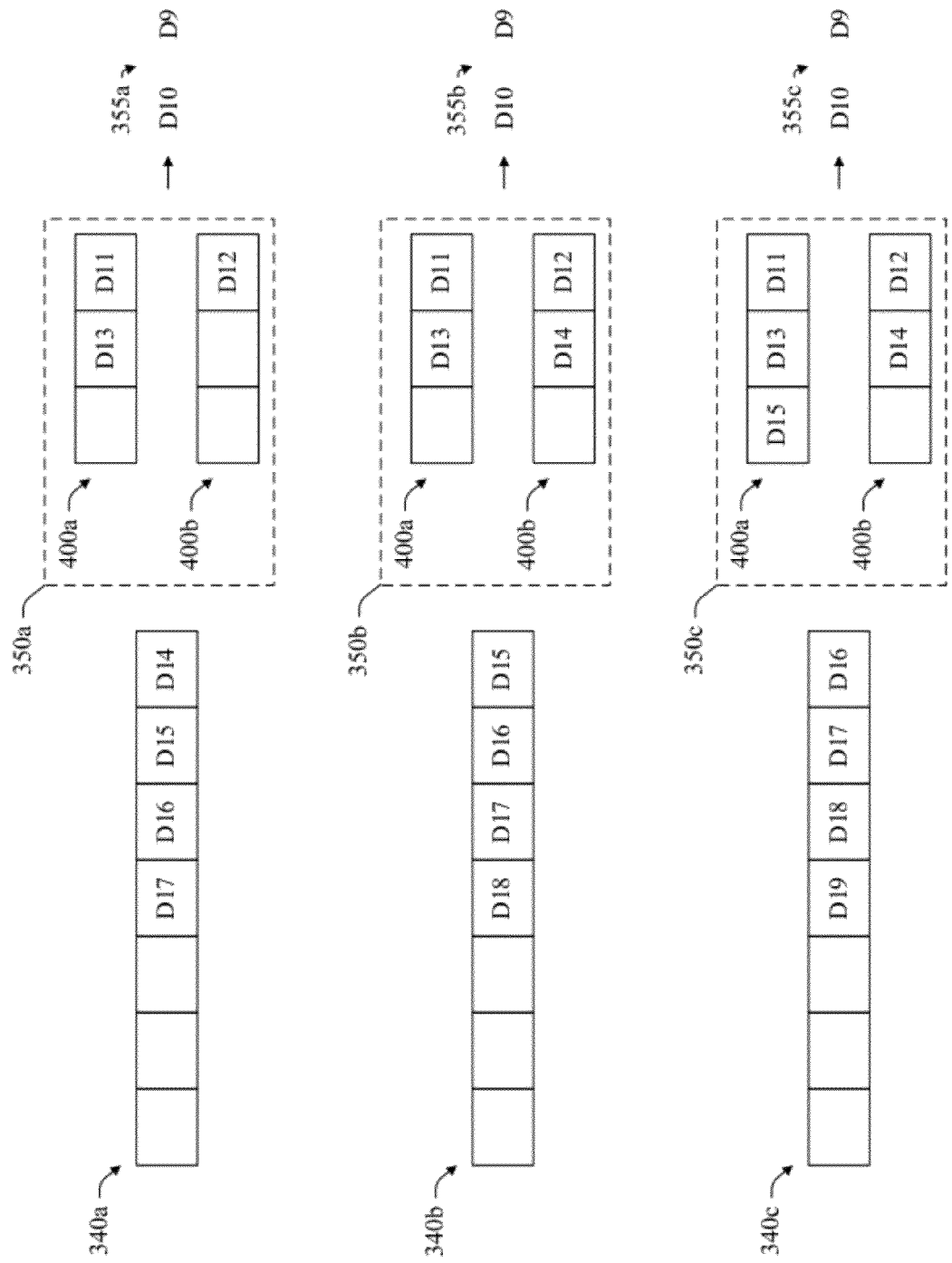

FIG. 7H illustrates the data buffers 340 and the deskew units 350 in the next clock cycle of the receiver clock signal 370. As may be envisioned from FIGS. 7G and 7H, each of the deskew units 350 has output the data symbol (D9) at the head of the data queue 400*a* in the deskew unit 350 and the data symbol (D10) at the head of the data queue 400*b* in the deskew unit 350 into the corresponding data stream 355 in the clock cycle. The order of the symbols output from the data queues 400*a-b* of each deskew unit 350 is the same order in which the deskew unit 350 received the symbols from the corresponding data buffer 340 of the compensation module 310. Moreover, the data symbols (D9 and D10) are aligned across the data streams 355 and the data symbols stored at the heads of the data queues 400*a-b* in the deskew units 350 are considered to be aligned across the deskew units 350.

Further, the deskew unit 350*a* has advanced the data symbol (D11) in the data queue 400*a* of the deskew unit 350*a* toward the head of the data queue 400*a* in the deskew unit 350*a*. The deskew unit 350*b* has advanced the data symbol (D11) in the data queue 400*a* of the deskew unit 350*b* toward the head of the data queue 400*a* in the deskew unit 350*b* and the data symbol (D12) in the data queue 400*b* of the deskew unit 350*b* toward the head of the data queue 400*b* in the deskew unit 350*b*. The deskew unit 350*c* has advanced the data symbols (D11 and D13) in the data queue 400*a* of the deskew unit 350*c* toward the head of the data queue 400*a* in the deskew unit 350*c* and the data symbol (D12) in the data queue 400*b* of the deskew unit 350*c* toward the head of the data queue 400*b* in the deskew unit 350*c*.

Additionally, the data buffer 340*a* has output the data symbol (D12) at the head of the data buffer 340*a* and the following data symbol (D13) in the data buffer 340*a* to the deskew unit 350*a* corresponding to the data buffer 340*a*. The deskew unit 350*a* has received the data symbols (D12 and D13) output from the corresponding data buffer 340*a* and stored the first data symbol (D12) received from the corresponding data buffer 340*a* at the tail of the data queue 400*b* in the deskew unit 350*a*, which is also the head of the data queue 400*b*. Additionally, the deskew unit 350*a* has stored the second data symbol (D13) received from the corresponding data buffer 340*a* at the tail of the data queue 400*a* in the deskew unit 350*a*, which follows the head of the data queue 400*a* in the deskew unit 350*a*.

The data buffer 340*b* has output the data symbol (D13) at the head of the data buffer 340*b* and the following data symbol (D14) in the data buffer 340*b* to the deskew unit 350*b* corresponding to the data buffer 340*b*. The deskew unit 350*b* has received the data symbols (D13 and D14) output from the corresponding data buffer 340*b* and stored the first data symbol (D13) received from the corresponding data buffer 340*b* at the tail of the data queue 400*a* in the deskew unit 350*b*, which follows the head of the data queue 400*a* in the deskew unit 350*b*. Additionally, the deskew unit 350*b* has stored the second data symbol (D14) received from the corresponding data buffer 340*b* at the tail of the data queue 400*b* in the deskew unit 350*b*, which follows the head of the data queue 400*b* in the deskew unit 350*b*.

The data buffer 340*c* has output the data symbol (D14) at the head of the data buffer 340*c* and the following data symbol (D15) in the data buffer 340*c* to the deskew unit 350*c* corresponding to the data buffer 340*c*. The deskew unit 350*c* has received the data symbols (D14 and D15) output from the corresponding data buffer 340*c* and stored the first data symbol (D14) received from the corresponding data buffer 340*c* at the tail of the data queue 400*b* in the deskew unit 350*c*, which follows the head of the data queue 400*b* in the deskew unit 350*c*. Additionally, the deskew unit 350*c* has stored the second data symbol (D15) received from the corresponding data buffer 340*c* at the tail of the data queue 400*a* in the deskew unit 350*c* after the data symbol (D13) following the head of the data queue 400a in the deskew unit 350c. Additionally, the data buffer 340a has received two data symbols (D16 and D17) of the corresponding data stream 335a and stored the data symbols (D16 and D17) at the tail of the data buffer 340a in the order in which the data buffer 340a received data symbols (D16 and D17). The data buffer 340b has received two data symbols (D17 and D18) of the corresponding data stream 335b and stored the data symbols (D17 and D18) at the tail of the data buffer 340b in the order in which the data buffer 340b received the data symbols (D17 and D18). The data buffer 340c has received two data symbols (D18 and D19) of the corresponding data stream 335c and stored the data symbols (D18 and D19) at the tail of the data buffer 340c in the order in which the data buffer 340c received the data symbols (D18 and D19). Thus, each of the data buffers 340 has received two symbols in the clock cycle and has output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

In the embodiment illustrated in FIGS. 7A-H and described above, each of the data buffers 340 outputs two symbols to the corresponding deskew unit 350 in a clock cycle of the receiver clock signal 370. For example, the receiver 125 may receive the data streams 115 at a gen-2 serdes data rate. In another embodiment, the data buffers 340 output one symbol to the corresponding deskew unit 350 in a clock cycle of the receiver clock signal 370 and the deskew unit 350 outputs one symbol in the clock cycle. For example, the receiver 125 may receive the data streams 115 at a gen-1 serdes data rate.

In one embodiment, the receiver 125 receives the data streams 115 at a gen-1 serdes date rate. In this embodiment, the deskew unit 350 writes symbols received from the corresponding data buffer 340 into the data queue 400a (e.g., the even data queue) of the deskew unit 350 in even clock cycles of the receiver clock signal 370. Further, the deskew unit 350 writes symbols received from the corresponding data buffer 340 into the data queue 400b (e.g., the odd data queue) of the deskew unit 350 in odd clock cycles of the receiver clock signal 370. Additionally, the deskew unit 350 outputs one symbol in each clock cycle of the receiver clock signal 370. For example, the deskew unit 350 may output symbols from the data queue 400a of the deskew unit 350 in even clock cycles of the receiver clock signal 370 and output symbols from the data queue 400b of the deskew unit 350 in odd clock cycles of the receiver clock signal 370.

Figure 8A:
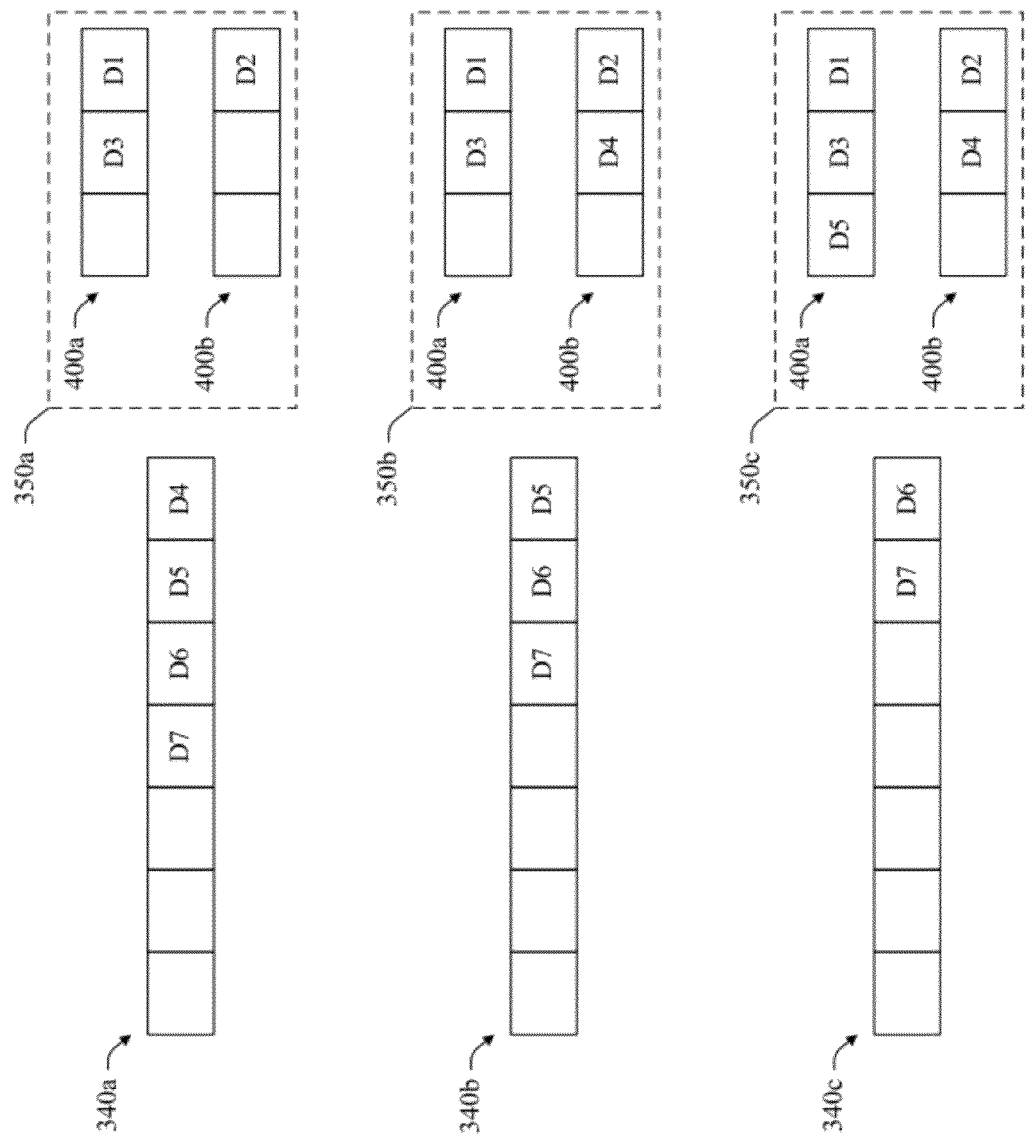
FIGS. 8A-G are block diagrams of data buffers of a compensation module and data queues of a deskew module, in accordance with an embodiment of the present invention.

FIGS. 8A-G illustrate data buffers 340 of the compensation module 310 and data queues 400 of the deskew module 315, in accordance with an embodiment of the present invention. In this embodiment, the deskew module 315 generates minimal skip ordered sets based on the skip ordered sets of the data streams 345 and stores the minimal skip ordered sets into the deskew units 350 (e.g., the deskew units 350a-c) of the deskew module 315. As illustrated in FIG. 8A, the data buffers 340 (e.g., the data buffers 340a-c) of the compensation module 310 contain symbols of exemplary data streams 335 and the deskew units 350 of the deskew module 315 contain symbols of exemplary data streams 345.

Each of the data buffers 340 contains symbols of the data stream 335 corresponding to the data buffer 340 and each of the data queues 400 of the deskew units 350 contains symbols of the data stream 345 corresponding to the deskew unit 350. Each of the data buffers 340 contains a different number of symbols because the data rates of the data streams 345 have varied over a time period. As may be envisioned from FIG. 8A, the data rate of the data stream 335a is faster than the data rate of the data stream 335b and the data rate of the data stream 335c is slower than the data rate of the data stream 335b. In FIGS. 8A-H, the data symbols (D) are enumerated in the order in which each data buffer 340 of the compensation module 310 receives the data symbols from the corresponding data stream 335. Although the symbols stored in the data buffers 340 are aligned across the data buffers 340 in FIG. 8A, the symbols may be misaligned from each other because the compensation module 310 modifies the number of symbols in skip ordered sets of the data streams 335 to compensate for frequency differences between the transmitter clock signal 250 and the receiver clock signal 370 and between the reconstructed clock signals 365 and the receiver clock signal 370.

As further illustrated in FIG. 8A, the data queue 400a of the deskew unit 350a contains a data symbol (D1) at the head of the data queue 400a and a data symbol (D3) following the head of the data queue 400a. Additionally, the data queue 400b of the deskew unit 350a contains a data symbol (D2) at the head of the data queue 400b. The data queue 400a of the deskew unit 350b contains a data symbol (D1) at the head of the data queue 400a and a data symbol (D3) following the head of the data queue 400a. Additionally, the data queue 400b of the deskew unit 350b contains a data symbol (D2) at the head of the data queue 400b and a data symbol (D4) following the head of the data queue 400b. The data queue 400a of the deskew unit 350c contains a data symbol (D1) at the head of the data queue 400a, a data symbol (D3) following the head of the data queue 400a, and a data symbol (D5) following the data symbol (D2) which follows the head of the data queue 400a. Additionally, the data queue 400b of the deskew unit 350c contains a data symbol (D2) at the head of the data queue 400b and a data symbol (D4) following the head of the data queue 400b. As may be envisioned from FIGS. 7H and 8A, the data buffers 340 and the deskew units 350 of FIG. 8A contain data units further downstream in the data streams 335 than the data units contained in the data buffers 340 and the deskew units 350 of FIG. 7H.

Figure 8B:
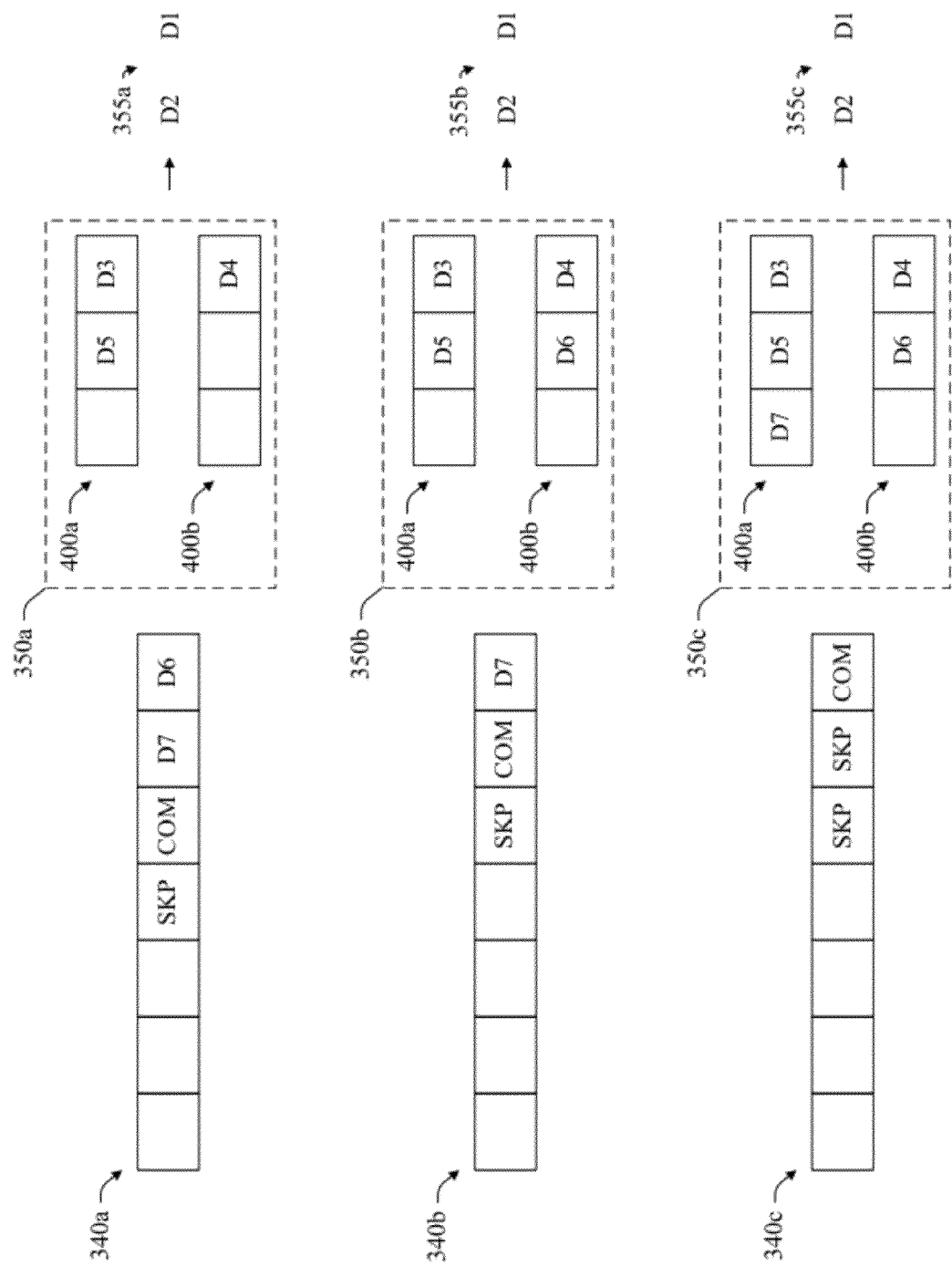

FIG. 8B illustrates the data buffers 340 and the deskew units 350 in the next clock cycle of the receiver clock signal 370. As may be envisioned from FIGS. 8A and 8B, each of the deskew units 350 has output the data symbol (D1) at the head of the data queue 400a in the deskew unit 350 and the data symbol (D2) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Further, the deskew unit 350a has advanced the data symbol (D3) in the data queue 400a of the deskew unit 350a toward the head of the data queue 400a in the deskew unit 350a. The deskew unit 350b has advanced the data symbol (D3) in the data queue 400a of the deskew unit 350b toward the head of the data queue 400a in the deskew unit 350b and the data symbol (D4) in the data queue 400b of the deskew unit 350b toward the head of the data queue 400b in the deskew unit 350b. The deskew unit 350c has advanced the data symbols (D3 and D5) in the data queue 400a of the deskew unit 350c toward the head of the data queue 400a in the deskew unit 350c and the data symbol (D4) in the data queue 400b of the deskew unit 350c toward the head of the data queue 400b in the deskew unit 350c.

Additionally, the data buffer 340a has output the data symbol (D4) at the head of the data buffer 340 and the following data symbol (D5) in the data buffer 340 to the deskew unit 350a corresponding to the data buffer 340a. The deskew unit 350*a* has received the data symbols (D4 and D5) output from the corresponding data buffer 340*a* and stored the first data symbol (D4) received from the data buffer 340*a* at the tail of the data queue 400*b* in the deskew unit 350*a*, which is also the head of the data queue 400*b* in the deskew unit 350*a*. Further, the deskew unit 350*a* has stored the second data symbol (D5) received from the corresponding data buffer 340*a* at the tail of the data queue 400*a* in the deskew unit 350*a*, which follows the head of the data queue 400*a* in the deskew unit 350*a*.

The data buffer 340*b* has output the data symbol (D5) at the head of the data buffer 340*b* and the following data symbol (D6) in the data buffer 340*b* to the deskew unit 350*b* corresponding to the data buffer 340*b*. The deskew unit 350*b* has received the data symbols (D5 and D6) output from the corresponding data buffer 340*b* and stored the first data symbol (D5) received from the data buffer 340*b* at the tail of the data queue 400*a* in the deskew unit 350*b*, which follows the head of the data queue 400*a* in the deskew unit 350*b*. Further, the deskew unit 350*b* has stored the second data symbol (D6) received from the corresponding data buffer 340*b* at the tail of the data queue 400*b* in the deskew unit 350*b*, which follows the head of the data queue 400*b* in the deskew unit 350*b*.

The data buffer 340*c* has output the data symbol (D6) at the head of the data buffer 340*b* and the following data symbol (D7) in the data buffer 340*b* to the deskew unit 350*c* corresponding to the data buffer 340*c*. The deskew unit 350*c* has received the data symbols (D6 and D7) output from the corresponding data buffer 340*c* and stored the first data symbol (D6) received from the data buffer 340*c* at the tail of the data queue 400*b* in the deskew unit 350*c*, which follows the head of the data queue 400*b* in the deskew unit 350*c*. Further, the deskew unit 350*c* has stored the second data symbol (D7) received from the corresponding data buffer 340*c* at the tail of the data queue 400*a* in the deskew unit 350*c* following the data symbol (D5) which follows the head of the data queue 400*a* in the deskew unit 350*c*.

Additionally, each of the data buffers 340 has received a comma symbol (COM) and a skip symbol (SKP) of a skip ordered set from the corresponding data stream 335 and stored the symbols (COM and SKP) at the tail of the data buffer 340 in the order in which the data buffer 340 received the symbols (COM and SKP). Further, the data buffer 340*c* has added a skip symbol (SKP) at the tail of the data buffer 340*c* to compensate for the different data rates of the data streams 335. Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 8C:
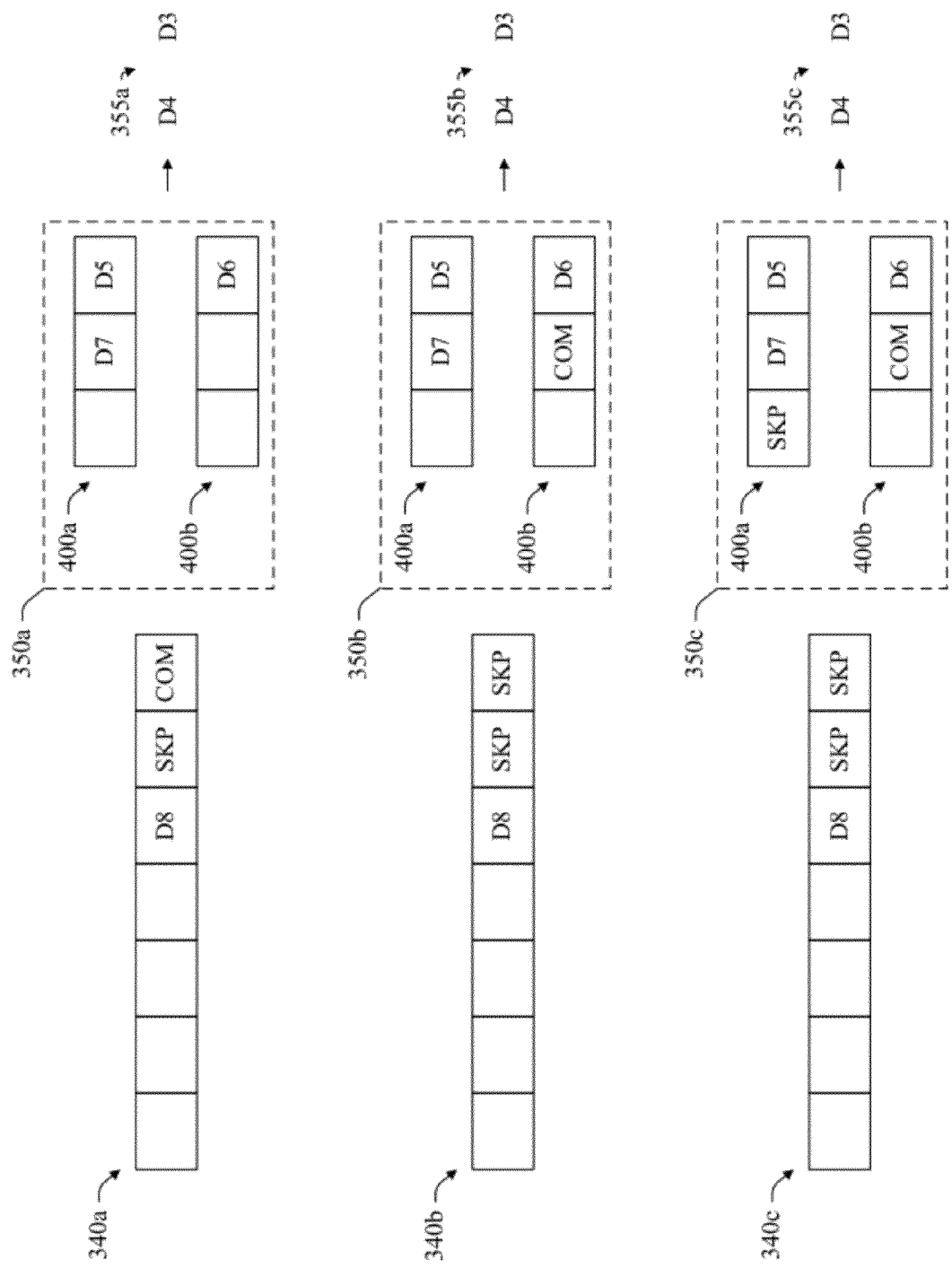

FIG. 8C illustrates the data buffers 340 and the deskew units 350 in the next clock cycle of the receiver clock signal 370. As may be envisioned from FIGS. 8B and 8C, each of the deskew units 350 has output the data symbol (D3) at the head of the data queue 400*a* in the deskew unit 350 and the data symbol (D4) at the head of the data queue 400*b* in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Further, the deskew unit 350*a* has advanced the data symbol (D5) in the data queue 400*a* of the deskew unit 350*a* toward the head of the data queue 400*a* in the deskew unit 350*a*. The deskew unit 350*b* has advanced the data symbol (D5) in the data queue 400*a* of the deskew unit 350*b* toward the head of the data queue 400*a* in the deskew unit 350*b* and the data symbol (D6) in the data queue 400*b* of the deskew unit 350*b* toward the head of the data queue 400*b* in the deskew unit 350*b*. The deskew unit 350*c* has advanced the data symbols (D5 and D7) in the data queue 400*a* of the deskew unit 350*c* toward the head of the data queue 400*a* in the deskew unit 350*c* and the data symbol (D6) in the data queue 400*b* of the deskew unit 350*c* toward the head of the data queue 400*b* in the deskew unit 350*c*.

Additionally, the data buffer 340*a* has output the data symbol (D6) at the head of the data buffer 340*a* and the following data symbol (D7) in the data buffer 340*a* to the deskew unit 350*a* corresponding to the data buffer 340*a*. The deskew unit 350*a* has received the two data symbols (D6 and D7) output from the corresponding data buffer 340*a* and stored the first data symbol (D6) received from the corresponding data buffer 340*a* at the tail of the data queue 400*b* in the deskew unit 350*a*, which is also the head of the data queue 400*b* in the deskew unit 350*a*. Additionally, the deskew unit 350*a* has stored the second data symbol (D7) at the tail of the data queue 400*a* in the deskew unit 350*a*, which follows the head of the data queue 400*a* in the deskew unit 350*a*.

The data buffer 340*b* has output the data symbol (D7) at the head of the data buffer 340*b* and the following comma symbol (COM) in the data buffer 340*b* to the deskew unit 350*b* corresponding to the data buffer 340*b*. The deskew unit 350*b* has received the two symbols (D7 and COM) output from the corresponding data buffer 340*b* and stored the data symbol (D7) received from the corresponding data buffer 340*b* at the tail of the data queue 400*a* in the deskew unit 350*b*, which follows the head of the data queue 400*a* in the deskew unit 350*b*. Additionally, the deskew unit 350*b* has stored the comma symbol (COM) at the tail of the data queue 400*b* in the deskew unit 350*b*, which follows the head of the data queue 400*b* in the deskew unit 350*b*.

The data buffer 340*c* has output the comma symbol (COM) at the head of the data buffer 340*b* and the following skip symbol (SKP) in the data buffer 340*c* to the deskew unit 350*c* corresponding to the data buffer 340*c*. The deskew unit 350*c* has received the comma symbol (COM) and the skip symbol (SKP) output from the corresponding data buffer 340*c* and stored the comma symbol (COM) received from the corresponding data buffer 340*c* at the tail of the data queue 400*b* in the deskew unit 350*c*, which follows the head of the data queue 400*b* in the deskew unit 350*c*. Additionally, the deskew unit 350*c* has stored the skip symbol (SKP) received from the corresponding data buffer 340*c* at the tail of the data queue 400*a* after the data symbol (D7) which follows the head of the data queue 400*a* in the deskew unit 350*c*.

Additionally, the data buffer 340*a* has received a skip symbol (SKP) and a data symbol (D8) of the corresponding data stream 335*a* and stored the data symbol (D8) at the tail of the data buffer 340*a* but has discarded (e.g., deleted) the skip symbol (SKP). In this way, the data buffer 340*a* has modified the number of skip symbols (SKP) in the skip ordered set received from the data stream 335*a* to compensate for different data rates among the data streams 345*a*-*c*. The data buffer 340*b* has received a skip symbol (SKP) and a data symbol (D8) of the corresponding data stream 335*b* and stored the skip symbol (SKP) and the data symbol (D8) at the tail of the data buffer 340*b* in the order in which the data buffer 340*b* received the skip symbol (SKP) and the data symbol (D8). The data buffer 340*c* has received a skip symbol (SKP) and a data symbol (D8) of the corresponding data stream 335*b* and stored the skip symbol (SKP) and the data symbol (D8) at the tail of the data buffer 340*c* in the order in which the data buffer 340c received the skip symbol (SKP) and the data symbol (D8). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 8D:
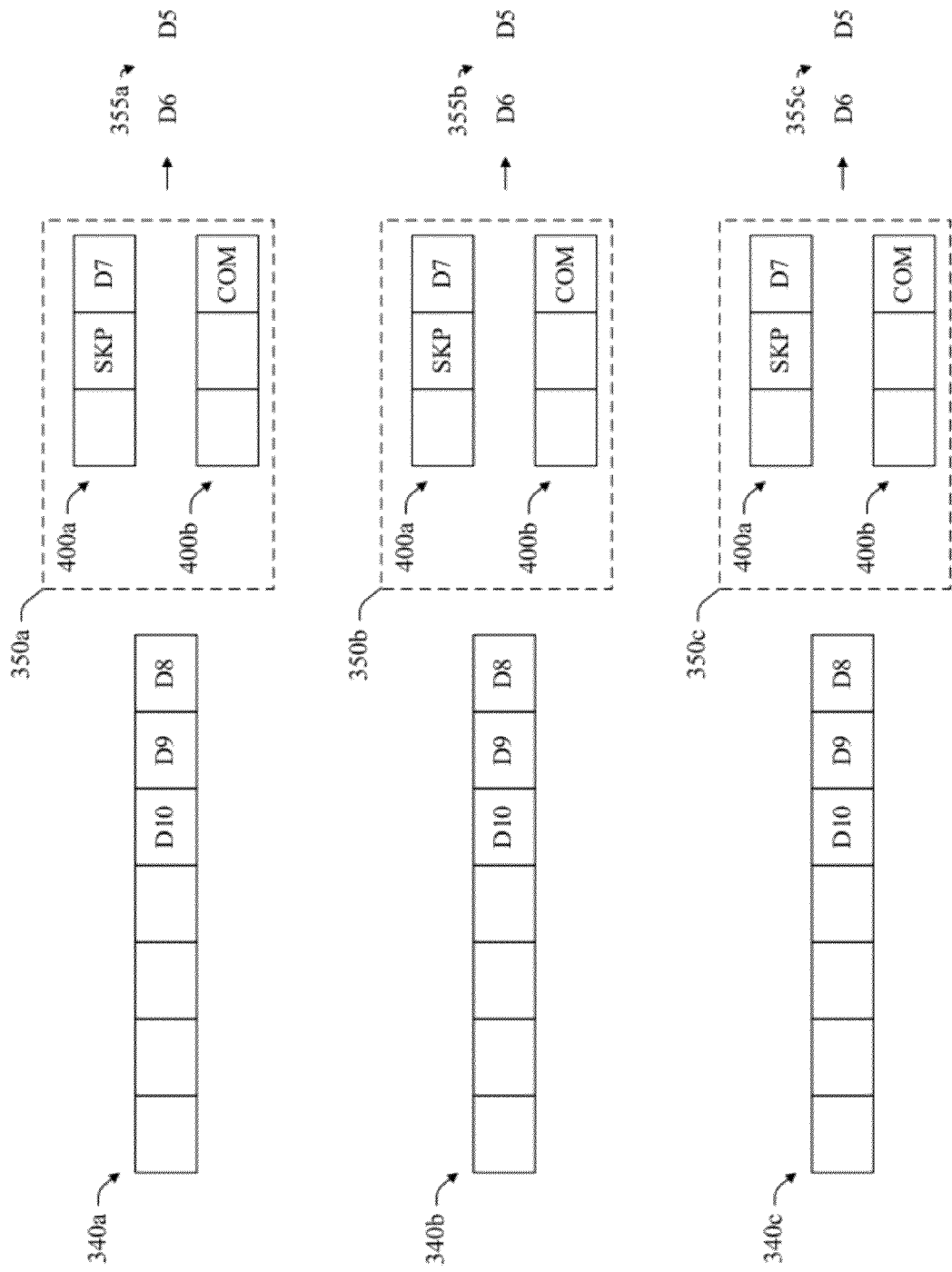

FIG. 8D illustrates the data buffers 340 and the deskew units 350 in the next clock cycle of the receiver clock signal 370. As may be envisioned from FIGS. 8C and 8D, each of the deskew units 350 has output the data symbol (D5) at the head of the data queue 400a in the deskew unit 350 and the data symbol (D6) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Further, the deskew unit 350a has advanced the data symbol (D7) in the data queue 400a of the deskew unit 350a toward the head of the data queue 400a in the deskew unit 350a. The deskew unit 350b has advanced the data symbol (D7) in the data queue 400a of the deskew unit 350b toward the head of the data queue 400a in the deskew unit 350b and the comma symbol (COM) in the data queue 400b of the deskew unit 350b toward the head of the data queue 400b in the deskew unit 350b. The deskew unit 350c has advanced the data symbol (D7) and the skip symbol (SKP) in the data queue 400a of the deskew unit 350c toward the head of the data queue 400a in the deskew unit 350c and the comma symbol (COM) in the data queue 400b of the deskew unit 350c toward the head of the data queue 400b in the deskew unit 350c.

The data buffer 340a has output the comma symbol (COM) at the head of the data buffer 340a and the following skip symbol (SKP) in the data buffer 340a to the deskew unit 350a corresponding to the data buffer 340a. The deskew unit 350a has received the comma symbol (COM) and the skip symbol (SKP) output from the corresponding data buffer 340a and stored the comma symbol (COM) received from the corresponding data buffer 340a at the tail of the data queue 400b in the deskew unit 350a, which is also the head of the data queue 400b in the deskew unit 350a. Additionally, the deskew unit 350a has stored the skip symbol (SKP) at the tail of the data queue 400a in the deskew unit 350a, which follows the head of the data queue 400a in the deskew unit 350a.

The data buffer 340b has output the skip symbol (SKP) at the head of the data buffer 340b and the following skip symbol (SKP) in the data buffer 340b to the deskew unit 350b corresponding to the data buffer 340b. The deskew unit 350b has received the skip symbols (SKP) output from the corresponding data buffer 340b and stored one of the skip symbol (SKP) received from the corresponding data buffer 340b at the tail of the data queue 400a in the deskew unit 350b, which follows the head of the data queue 400a in the deskew unit 350b. The deskew unit 350b has discarded (e.g., deleted) the other skip symbol (SKP) received from the corresponding data buffer 340b. In this way, the deskew unit 350b has generated a minimal skip ordered set containing a comma symbol (COM) followed by a skip symbol (SKP).

The data buffer 340c has output the skip symbol (SKP) at the head of the data buffer 340c and the following skip symbol (SKP) in the data buffer 340c to the deskew unit 350c corresponding to the data buffer 340c. The deskew unit 350c has received the skip symbols (SKP) output from the corresponding data buffer 340c and stored one of the skip symbol (SKP) received from the corresponding data buffer 340c at the tail of the data queue 400a in the deskew unit 350c following the data symbol (D7) which follows the head of the data queue 400a in the deskew unit 350c. The deskew unit 350c has discarded (e.g., deleted) the two skip symbols (SKP) received from the corresponding data buffer 340c. In this way, the deskew unit 350c has generated a minimal skip ordered set containing a comma symbol (COM) followed by a skip symbol (SKP) in the deskew unit 350c.

Additionally, each of the data buffers 340 has received two data symbols (D9 and D10) of the corresponding data stream 335 and stored the data symbols (D9 and D10) at the tail of the data buffer 340 in the order in which the data buffer 340a received the data symbols (D9 and D10). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 8E:
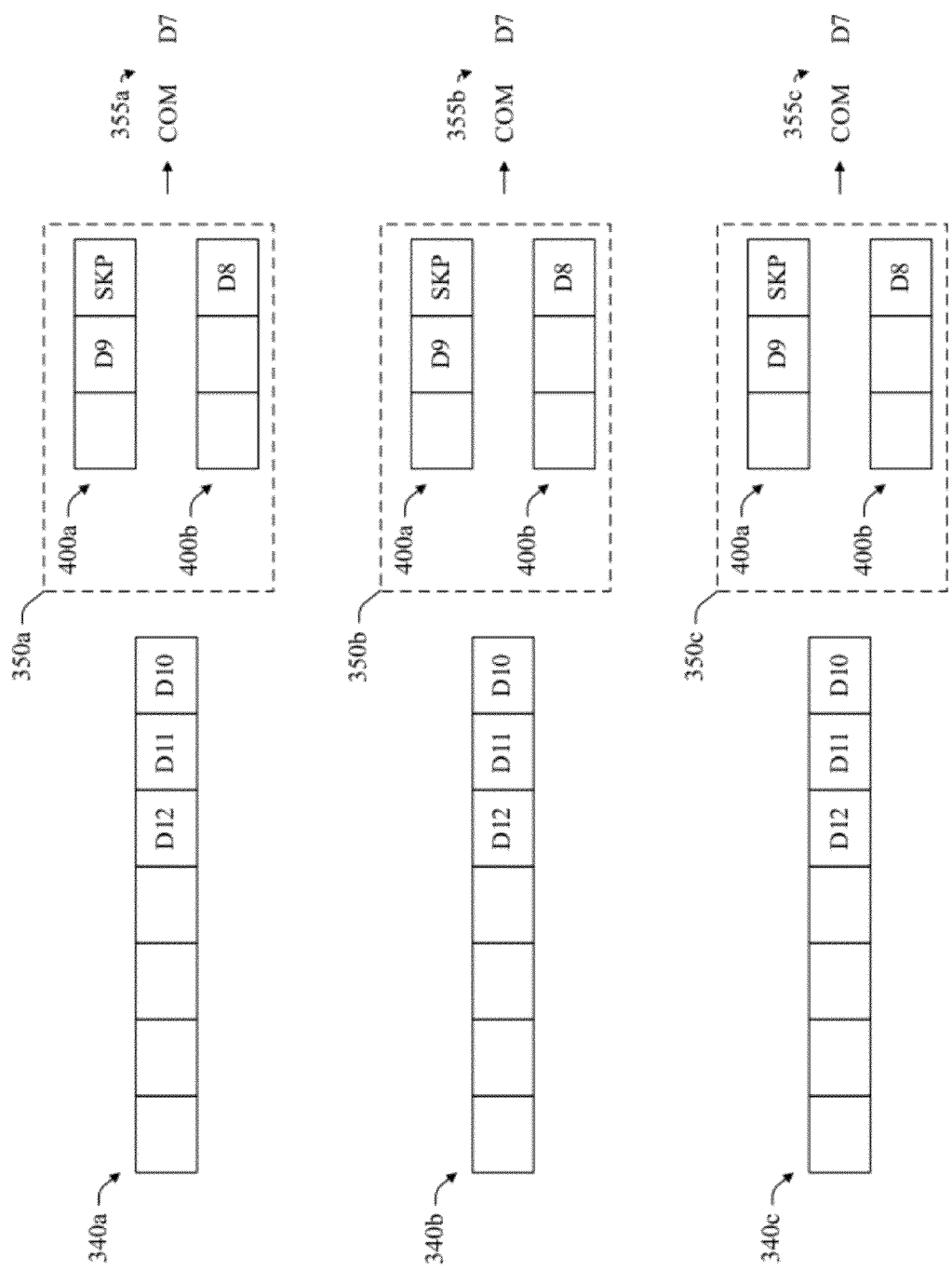

FIG. 8E illustrates the data buffers 340 and the deskew units 350 in the next clock cycle of the receiver clock signal 370. As may be envisioned from FIGS. 8D and 8E, each of the deskew units 350 has output the data symbol (D7) at the head of the data queue 400a in the deskew unit 350 and the comma symbol (COM) at the head of the data queue 400b in the deskew unit 350 into the corresponding data stream 355 in the clock cycle. In this way, each of the deskew units 350 has output symbols received from the corresponding data buffer 340 of the compensation module 310 into the corresponding data stream 355 in the same order in which the deskew unit 350 received the symbols from the corresponding data buffer 340.

Further, each of the deskew units 350a has advanced the skip symbol (SKP) in the data queue 400a of the deskew unit 350 toward the head of the data queue 400a in the deskew unit 350. Each of the data buffers 340 has output the data symbol (D8) at the head of the data buffer 340 and the following data symbol (D9) in the data buffer 340 to the deskew unit 350 corresponding to the data buffer 340. Additionally, each of the deskew units 350 has received the data symbols (D8 and D9) output from the corresponding data buffer 340 and stored the first data symbol (D8) received from the corresponding data buffer 340 at the tail of the data queue 400b in the deskew unit 350, which is also the head of the data queue 400b in the deskew unit 350. Further, each of the deskew units 350 has stored the second data symbol (D9) received from the corresponding data buffer 340 at the tail of the data queue 400a in the deskew unit 350, which follows the head of the data queue 400b in the deskew unit 350. Additionally, each of the data buffers 340 has received a data symbol (D11) and a data symbol (D12) from the corresponding data stream 335 and stored the data symbols (D11 and D12) at the tail of the data buffer 340 in the order in which the data buffer 340 received the data symbols (D11 and D12). Thus, each of the data buffers 340 has received two symbols in the clock cycle and output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 8F:
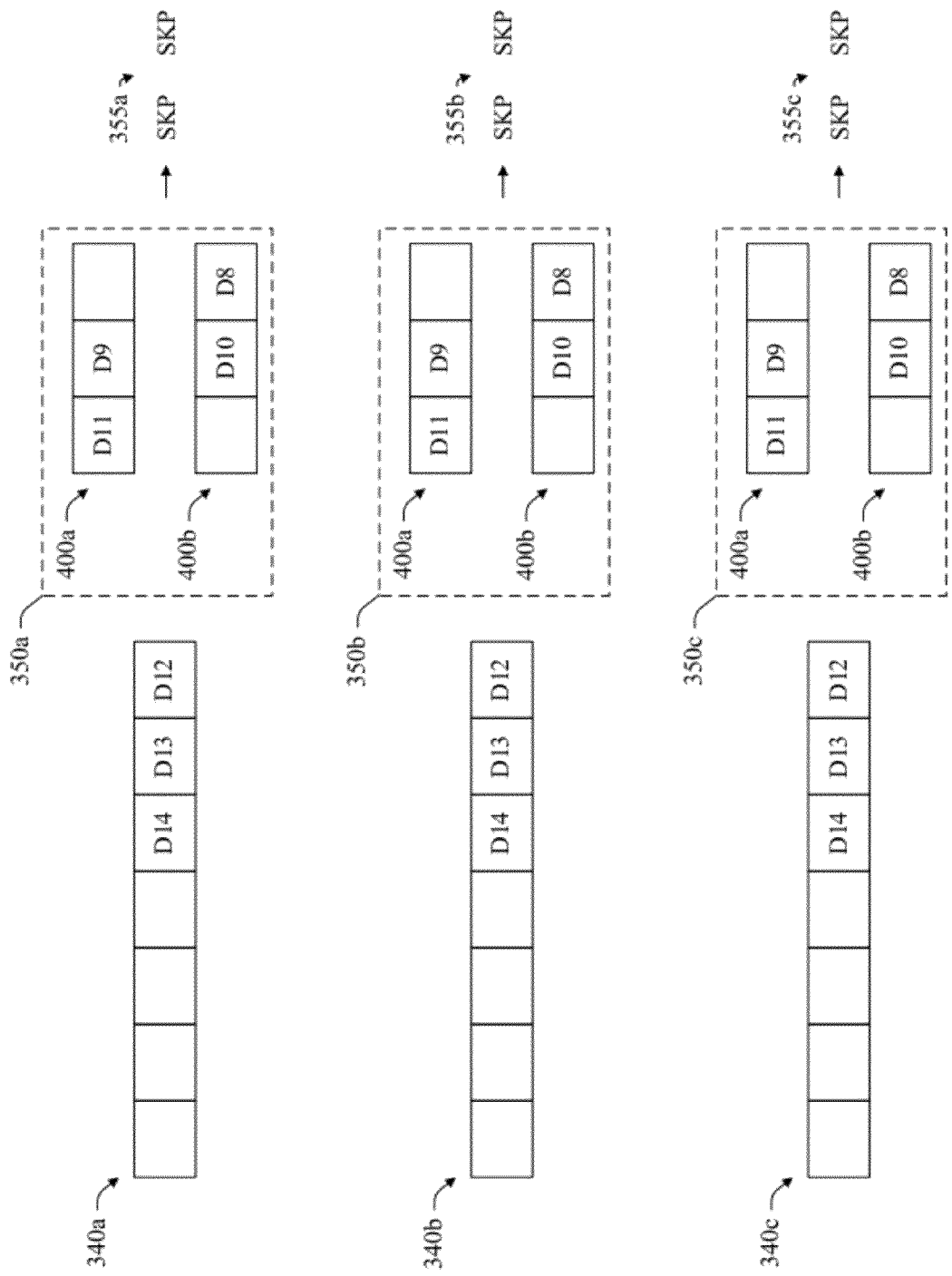

FIG. 8F illustrates the data buffers 340 and the deskew units 350 in the next clock cycle of the receiver clock signal 370. As may be envisioned from FIGS. 8E and 8F, each of the deskew units 350 has output the skip symbol (SKP) at the head of the data queue 400b in the deskew unit 350 into the corresponding data stream 355 in the clock cycle. Additionally, each of the deskew units 350 has inserted a skip symbol (SKP) into the corresponding data stream 355 because the head of the data queue 400a in the deskew unit 350 contained a skip symbol (SKP) and the head of the data queue 400b in the deskew unit 350 contained a data symbol (D8). As a result, the head of the data queue 400a in each deskew unit 350 is void (e.g., does not contain a symbol) and the data symbols (D8) at the heads of the data queues 400b in the deskew units 350 are aligned across the deskew units 350. Moreover, the order of the symbols output from the data queues 400a-b of each deskew unit 350 is the same order in which the deskew unit 350 received the symbols from the corresponding data buffer 340 of the compensation module 310. Moreover, the data symbols (D8) are aligned across the data streams 355 and the data symbols stored in the data queues 400a-b of the deskew units 350 are aligned across the deskew units 350.

Additionally, each of the data buffers 340 has output the data symbol (D10) at the head of the data buffer 340 and the following data symbol (D11) in the data buffer 340 to the deskew unit 350 corresponding to the data buffer 340. Each of the deskew units 350 has received the data symbols (D10 and D11) output from the corresponding data buffer 340 and stored the first data symbol (D10) received from the corresponding data buffer 340 at the tail of the data queue 400b in the deskew unit 350, which follows the head of the data queue 400b. Additionally, each of the deskew units 350 has stored the second data symbol (D11) received from the corresponding data buffer 340 at the tail of the data queue 400a in the deskew unit 350 following the data symbol (D9) which follows the head of the data queue 400a in the deskew unit 350. Further, the deskew units 350 do not advance any symbol in the data queues 400a or the data queues 400b of the deskew units 350 and the head of the data queue 400a in each of the deskew units 350 remains void (e.g., does not contain a symbol). Moreover, each of the deskew units 350 has stored the data symbols (D10 and D11) received from the corresponding data buffer 340 by writing symbols alternatively among the data queues 400a-b of the deskew unit 350 so that the order of the symbols stored in the data queues 400a-b of the deskew unit 350 is the same order in which the deskew unit 350 received the symbols.

Additionally, each of the data buffers 340 has received two data symbols (D13 and D14) of the corresponding data stream 335 and stored the data symbols (D13 and D14) at the tail of the data buffer 340 in the order in which the data buffer 340 received data symbols (D13 and D14). Thus, each of the data buffers 340 has received two symbols in the clock cycle and has output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

Figure 8G:
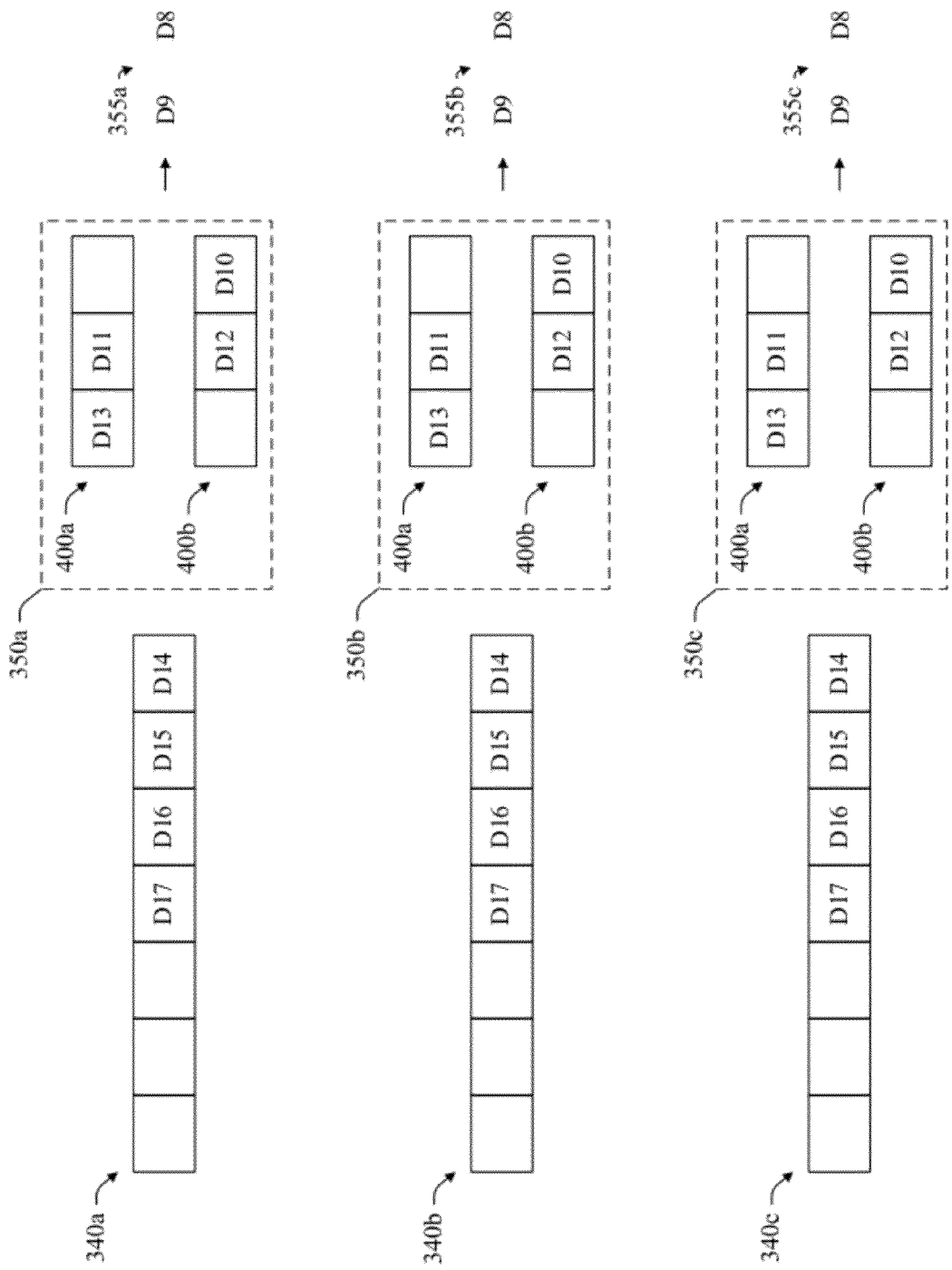

FIG. 8G illustrates the data buffers 340 and the deskew units 350 in the next clock cycle of the receiver clock signal 370. As may be envisioned from FIGS. 8F and 8G, each of the deskew units 350 has output the data symbol (D8) at the head of the data queue 400b in the deskew unit 350 and the data symbol (D9) following the head of the data queue 400a in the deskew unit 350 into the corresponding data stream 355 in the clock cycle. Moreover, the order of the symbols output from the data queues 400a-b of each deskew unit 350 is the same order in which the deskew unit 350 received the symbols from the corresponding data buffer 340 of the compensation module 310. Moreover, the data symbols (D9 and D10) output from deskew units 350 are aligned across the data streams 355 and the data symbols stored in the data queues 400a-b of the deskew units 350 are aligned across the deskew units 350.

Further, each of the deskew units 350 has advanced the data symbol (D11) at the tail of the data queue 400a in the deskew unit 350 toward the head of the data queue 400a in the deskew unit 350. Additionally, each of the deskew units 350 has advanced the data symbol (D10) at the tail of the data queue 400b in the deskew unit 350 toward the head of the data queue 400b in the deskew unit 350. Each of the data buffers 340 has output the data symbol (D12) at the head of the data buffer 340 and the following data symbol (D13) in the data buffer 340 to the deskew unit 350 corresponding to the data buffer 340. Each of the deskew units has received the data symbols (D12 and D13) output from the corresponding data buffer 340 and stored the first data symbol (D12) received from the corresponding data buffer 340 at the tail of the data queue 400b in the deskew unit 350, which follows the head of the data queue 400b. Additionally, each of the deskew units 350 has stored the second data symbol (D13) received from the corresponding data buffer 340 at the tail of the data queue 400a in the deskew unit 350 following the data symbol (D11) which follows the head of the data queue 400a in the deskew unit 350. Further, the head of the data queue 400a in each of the deskew units 350 remains void (e.g., does not contain a symbol). Moreover, each of the deskew units 350 has stored the data symbols (D12 and D13) received from the corresponding data buffer 340 by writing symbols alternatively among the data queues 400a-b of the deskew unit 350 so that the order of the symbols stored in the data queues 400a-b of the deskew unit 350 is the same order in which the deskew unit 350 received the symbols.

Further, each of the data buffers 340 has received two data symbols (D16 and D17) of the corresponding data stream 335 and stored the data symbols (D16 and D17) at the tail of the data buffer 340 in the order in which the data buffer 340 received data symbols (D16 and D17). Thus, each of the data buffers 340 has received two symbols in the clock cycle and has output two symbols to the corresponding deskew unit 350 in the clock cycle. Moreover, each of the deskew units 350 has received two symbols from the corresponding data buffer 340 in the clock cycle and output two symbols into the corresponding data stream 355 in the clock cycle.

In the embodiment illustrated in FIGS. 8A-G and described above, each of the data buffers 340 outputs two symbols to the corresponding deskew unit 350 in a clock cycle of the receiver clock signal 370. For example, the receiver 125 may receive the data streams 115 at a gen-2 serdes data rate. In another embodiment, the data buffers 340 output one symbol to the corresponding deskew unit 350 in a clock cycle of the receiver clock signal 370 and the deskew unit 350 outputs one symbol in the clock cycle. For example, the receiver 125 may receive the data streams 115 at a gen-1 serdes data rate.

In one embodiment, the receiver 125 receives the data streams 115 at a gen-1 serdes date rate. In this embodiment, the deskew unit 350 writes symbols received from the corresponding data buffer 340 into the data queue 400a (e.g., the even data queue) of the deskew unit 350 in even clock cycles of the receiver clock signal 370. Further, the deskew unit 350 writes symbols received from the corresponding data buffer 340 into the data queue 400b (e.g., the odd data queue) of the deskew unit 350 in odd clock cycles of the receiver clock signal 370. Additionally, the deskew unit 350 outputs one symbol in each clock cycle of the receiver clock signal 370. For example, the deskew unit 350 may output symbols from the data queue 400a of the deskew unit 350 in even clock cycles of the receiver clock signal 370 and output symbols from the data queue 400b of the deskew unit 350 in odd clock cycles of the receiver clock signal 370.

Figure 9:
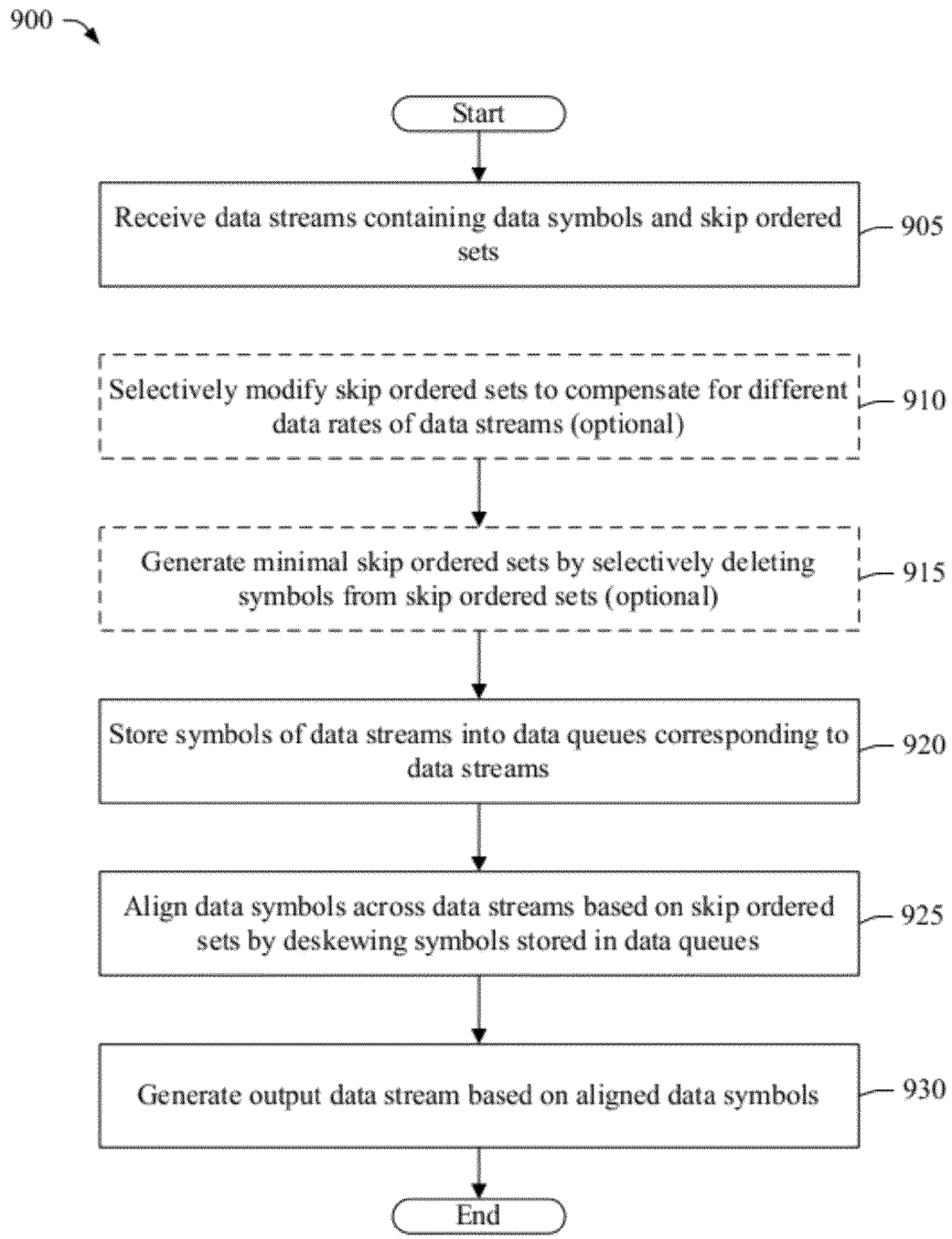
FIG. 9 is a flow chart of a method for aligning data symbols across data streams, in accordance with an embodiment of the present invention.

FIG. 9 illustrates a method 900 for aligning data symbols across data streams, in accordance with an embodiment of the present invention. In step 905, data streams containing data symbols and skip ordered sets are received. In one embodiment, the receiver 125 receives the data streams 115, each of which contains a skip ordered set. The method 900 then proceeds to step 910.

In optional step 910, the skip ordered sets in the data streams are selectively modified to compensate for differences in data rates of the data streams. In one embodiment, the compensation module 310 selectively modifies symbols in the skip ordered sets of the data streams 115 by selectively adding symbols to skip ordered sets and selectively deleting symbols from skip ordered sets in the data streams 335. For example, the deserializer module 300 may generate the data streams 325 by deserializing symbols in the data streams 115, the decoder module 305 may decode symbols in the data streams 115 by decoding symbols in the data streams 325, and the compensation module 310 may selectively modify symbols in the data streams 115 by selectively adding symbols to, or deleting symbols from, skip ordered sets in the data streams 335. The method 900 then proceeds to step 915.

In optional step 915, minimal skip ordered sets are generated by selectively deleting symbols from the skip ordered sets. In one embodiment the deskew module 315 generates minimal skip ordered sets by selectively deleting symbols from the skip ordered sets in the data streams 345. Although each of the minimal skip ordered sets has a same predetermined number of symbols, a symbol need not be deleted from each skip ordered set in the data streams 345 to generate the minimal skip ordered sets. For example, a skip ordered set in a data stream 345 may have the same number of symbols as a minimal skip ordered set generated from skip ordered set in the data stream 345, namely the predetermined number of symbol. The method 900 then proceeds to step 920.

In step 920, symbols of the data streams are stored into data queues corresponding to the data streams. In one embodiment, each deskew unit 350 of the deskew module 315 receives symbols of the data stream 345 corresponding to the deskew unit 350 and stores the symbols into the corresponding data queues 400 of the deskew unit 350. In various embodiments, the deskew unit 350 distributes symbols received from the corresponding data stream 345 among the data queues 400 of the deskew unit 350 by writing the symbols into the data queues 400 of the deskew unit 350 to maintain the order in which the deskew unit 350 received the symbols. In embodiments in which the deskew module 315 generates minimal skip ordered sets, the deskew unit 350 maintains the order in which the deskew unit 350 received the symbols but the deskew unit 350 selectively deletes other symbols received from the corresponding data stream 345 without storing the deleted symbols into the data queues 400 of the deskew unit 350. The method 900 then proceeds to step 925.

In step 925, data symbols in the data streams are aligned based on the skip ordered sets. In one embodiment, the deskew module 315 aligns data symbols in the data streams 345 by deskewing data symbols of the data streams 345 stored in deskew units 350 of the deskew module 315 based on the skip ordered sets stored into the deskew units 350. Further, the deskew module 315 generates the data streams 355 based on the skip ordered sets and the data symbols.

In various embodiment, the deskew module 315 aligns data symbols stored in the deskew module 315 by selectively adding symbols to the skip ordered sets in the data streams 355 without storing the added symbols in the data queues 400 of the deskew units 350 in the deskew module 315. In some embodiments, the deskew module 315 aligns data symbols stored in the deskew module 315 by selectively adding symbols to minimal skip ordered sets in the data streams 355 without storing the added symbols in the data queues 400 of the deskew units 350 in the deskew module 315. In some embodiments, the deskew module 315 aligns data symbols stored in the deskew module 315 by selectively adding symbols to the skip ordered sets in the data streams 345 without storing the added symbols in the receiver 125. The method 900 then proceeds to step 930.

In step 930, an output data stream is generated based on the aligned data symbols. In one embodiment, the collator 360 generates the data stream 130 (e.g., the output data stream) based on the symbols received from the deskew units 350 in the deskew module 315. For example, the collator 360 may receive symbols from deskew units 350 and collate the symbols to generate the data stream 130. In some embodiments, the collator 360 stores symbols and generates the data stream 130 based on the stored symbols. In other embodiments, the collator 360 generates the data stream 130 without storing symbols, for example by passing symbols through the collator 360. In various embodiments, the collator 360 outputs the data stream 130 from the receiver 125. The method 900 then ends.

In various embodiments, one or more of the steps 905-930 of the method 900 may be performed in a different order than that described above and illustrated in FIG. 9. In some embodiments, the method 900 may include more or fewer steps than the steps 905-930. In various embodiments, two or more of the steps 905-930 may be performed in parallel with each other or substantially simultaneously with each other.

Figure 10:
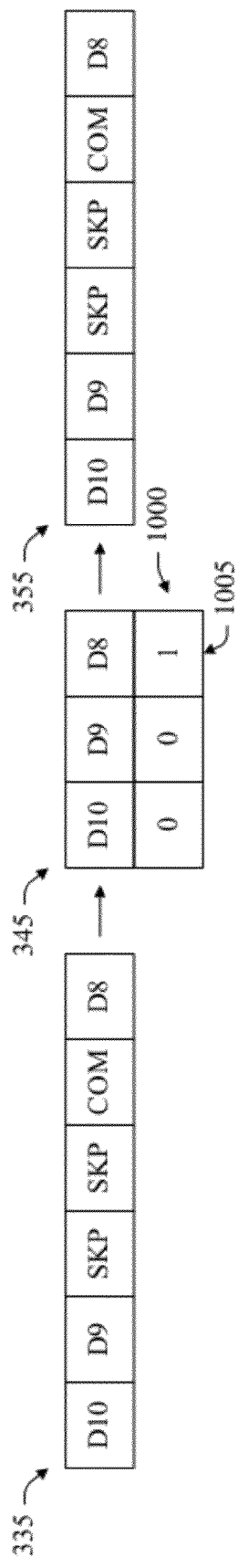
FIG. 10 is a block diagram of data streams generated in a receiver, in accordance with an embodiment of the present invention.

FIG. 10 illustrates data streams 135, 145, and 155 generated in the receiver 125, in accordance with an embodiment of the present invention. As illustrated in FIG. 10, the data stream 335 (e.g., a data stream 335a, or 335b, or 335c) generated by the decoder module 305 includes a data symbol (D8) at the head of the data stream 335 followed by a minimal skip ordered set which includes a comma symbol (COM) followed by two skip symbols (SKP). The minimal skip ordered set in the data stream 335 is followed by a data symbol (D9) which is followed by another data symbol (D10). The compensation module 310 generates the data stream 345 (e.g., a data stream 345a, or 345b, or 345c) corresponding to the data stream 335 generated by the decoder module 305 by deleting each of the symbols of the minimal skip ordered set from the data stream 335 and associating a tag 1005 with the data symbol (D8) immediately preceding the minimal skip ordered set in the data stream 345. As illustrated in FIG. 10, each of the data symbols (D8, D9, and D10) of the data stream 345 is associated with a bit 1000 indicating whether the data symbol (D8, D9, or D10) is associated with a tag 1005. In this embodiment, a data symbol is associated with a tag 1005 if the bit 1000 associated with the data symbol has a binary value of one. Moreover, the tag 1005 indicates that the minimal skip ordered set immediately succeeds the data symbol (D8) associated with the tag 1005. As is also illustrated in FIG. 10, the deskew module 315 generates a data stream 355 (e.g., a data stream 355a, or 355b, or 355c) which corresponds to the data stream 345 generated by the compensation module 310 and includes a minimal skip ordered set immediately succeeding the data symbol (D8) at the head of the data stream 355.

Figure 11:
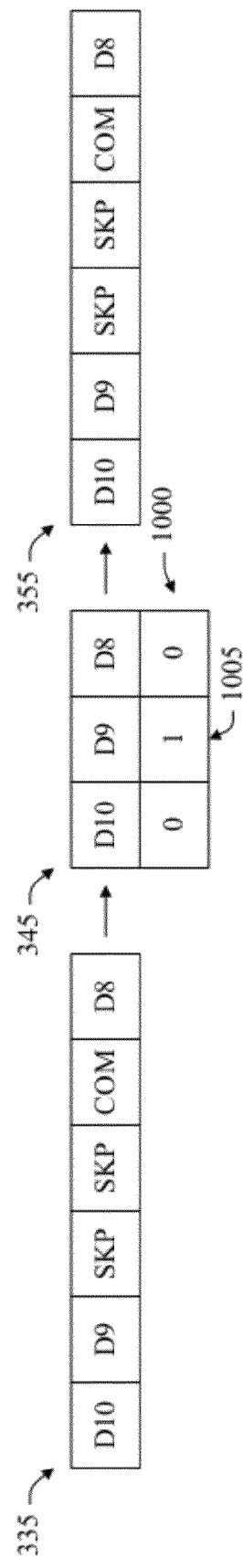
FIG. 11 is a block diagram of data streams generated in a receiver, in accordance with an embodiment of the present invention.

FIG. 11 illustrates data streams 135, 145, and 155 generated in the receiver 125, in accordance with an embodiment of the present invention. As illustrated in FIG. 11, the data stream 335 (e.g., a data stream 335a, or 335b, or 335c) generated by the decoder module 305 includes a data symbol (D8) at the head of the data stream 335 followed by a minimal skip ordered set which includes a comma symbol (COM) followed by two skip symbols (SKP). The minimal skip ordered set in the data stream 335 is followed by a data symbol (D9) which is followed by another data symbol (D10). The compensation module 310 generates the data stream 345 (e.g., a data stream 345a, or 345b, or 345c) corresponding to the data stream 335 generated by the decoder module 305 by deleting each of the symbols of the minimal skip ordered set from the data stream 335 and associating a tag 1005 with the data symbol (D9) immediately succeeding the minimal skip ordered set in the data stream 345. As illustrated in FIG. 11, each of the data symbols (D8, D9, and D10) of the data stream 345 is associated with a bit 1000 indicating whether the data symbol (D8, D9, or D10) is associated with a tag 1005. In this embodiment, a data symbol is associated with a tag 1005 if the bit 1000 associated with the data symbol has a binary value of one. Moreover, the tag 1005 indicates that the minimal skip ordered set immediately precedes the data symbol (D9) associated with the tag 1005. As is also illustrated in FIG. 11, the deskew module 315 generates a data stream 355 (e.g., a data stream 355a, or 355b, or 355c) which corresponds to the data stream 345 generated by the compensation module 310 and includes a minimal skip ordered set immediately succeeding the data symbol (D8) at the head of the data stream 355.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A deskew module for aligning data symbols in a plurality of data streams each comprising a plurality of symbols including data symbols and a skip ordered set comprising a number of symbols, the deskew module comprising:
a plurality of deskew units each corresponding to a respective data lane of a plurality of data lanes, each deskew unit of the plurality of deskew units comprising a plurality of data queues and configured to receive symbols of a corresponding data stream of the plurality of data streams from the data lane corresponding to the deskew unit, wherein the data queues of the plurality of data queues in each deskew unit of the plurality of deskew units are separate and distinct from each other;
a controller coupled to the plurality of deskew units and configured to write symbols of the data stream corresponding to each deskew unit into the plurality of data queues of the deskew unit by distributing symbols of the corresponding data stream among the plurality of data queues of the deskew unit, the controller further configured to deskew data symbols stored in the plurality of data queues of the plurality of deskew units based on the skip ordered sets; and
a compensation module configured to replace a skip ordered set of a data stream in the plurality of data streams with a minimal skip ordered set by deleting each symbol of the skip ordered set from the data stream and generating a tag indicating a location of the minimal skip ordered set in the data stream;
wherein a deskew unit of the plurality of deskew units is further configured to selectively insert a symbol into a skip ordered set of the data stream corresponding to deskew unit without storing the inserted symbol into the plurality of data queues of the deskew unit and output the inserted symbol from the deskew unit.

2. The deskew module of claim 1, wherein the plurality of data queues in each deskew unit comprises a first data queue and a second data queue, and the controller is further configured to distribute symbols of the corresponding data stream among the plurality of data queues of the deskew unit by writing symbols of the corresponding data stream alternatively into the first data queue and the second data queue of the deskew unit.

3. The deskew module of claim 1, where each deskew unit of the plurality of deskew units further comprises a symbol output module configured to receive symbols of the data stream corresponding to the deskew unit from the plurality of data queues of the deskew unit and output the received symbols from the deskew unit in the same order in which the deskew unit received the symbols of the corresponding data stream.

4. The deskew module of claim 1, wherein the deskew module is configurable into a first configuration for deskewing data symbols of the plurality of data streams at a first data rate or a second configuration for deskewing data symbols of the plurality of data streams at a second data rate.

5. The deskew module of claim 4, wherein the first data rate is a gen-1 serdes data rate and the second data rate gen-2 serdes data rate.

6. A system comprising:
a compensation module configured to receive a plurality of data streams each having a data rate and comprising a plurality of symbols including data symbols and a skip ordered set comprising a number of symbols, the compensation module further configured to selectively modify the number of symbols in the skip ordered sets of the plurality of data streams to compensate for differences in the data rates of the data streams in the plurality of data streams by replacing a skip ordered set of a data stream in the plurality of data streams with a minimal skip ordered set by deleting each symbol of the skip ordered set from the data stream and generating a tag indicating a location of the minimal skip ordered set in the data stream; and
a deskew module coupled to the compensation module and comprising a plurality of deskew units each corresponding to respective data lane of a plurality of data lanes, each deskew unit of the plurality of deskew units configured to receive symbols of a corresponding data stream of the plurality of data streams from the data lane corresponding to the deskew unit, each deskew unit of the plurality of deskew units comprising a plurality of data queues, wherein the data queues of the plurality of data queues are separate and distinct from each other, the deskew module further configured to write symbols of the data stream corresponding to each deskew unit into the plurality of data queues of the deskew unit by distributing symbols of the corresponding data stream among the plurality of data queues of the deskew unit, and align data symbols across the plurality of data stream by deskewing data symbols stored in the plurality of data queues of the deskew units based on the skip ordered sets, wherein a deskew unit of the plurality of deskew units is further configured to selectively insert a symbol into a skip ordered set of the data stream corresponding to deskew unit without storing the inserted symbol into the plurality of data queues of the deskew unit and output the inserted symbol from the deskew unit.

7. The system of claim 6, wherein the plurality of data queues in each deskew unit comprises a first data queue and a second data queue and the controller is further configured to distribute symbols of the corresponding data stream among the plurality of data queues of the deskew unit by writing symbols of the corresponding data stream alternatively into the first data queue and the second data queue of the deskew unit.

8. The system of claim 7, wherein each deskew unit of the plurality of deskew units further comprises a symbol output module configured to receive symbols of the data stream corresponding to the deskew unit from the first data queue and the second data queue of the deskew unit and output the received symbols from the deskew unit in the same order in which the deskew unit received the symbols of the corresponding data stream.

9. The system of claim 6, wherein the deskew module is configurable into a first configuration for deskewing data symbols of the plurality of data streams at a first data rate or a second configuration for deskewing data symbols of the plurality of data streams at a second data rate.

10. The system of claim 9, wherein the first data rate is a gen-1 serdes data rate and the second data rate gen-2 serdes data rate.

11. A method comprising:
receiving a plurality of data streams from a corresponding plurality of data lanes at a corresponding plurality of deskew units, each data stream of the plurality of data streams comprising a plurality of symbols including data symbols and a skip ordered set comprising a number of symbols;
storing symbols of each data stream of the plurality of data streams into a plurality of data queues corresponding to both the data stream and the data lane corresponding to the data stream by distributing symbols of the corresponding data stream among the plurality of data queues, wherein the data queues of the plurality of data queues are separate and distinct from each other;
aligning data symbols across the plurality of data streams based on the skip ordered sets by deskewing symbols stored in the data queues;
selectively inserting a symbol into a skip ordered set of a data stream without storing the inserted symbol into the data queues corresponding to the data stream; and
replacing a skip ordered set of a data stream in the plurality of data streams with a minimal skip ordered set by deleting each symbol of the skip ordered set from the data stream and generating a tag indicating a location of the minimal skip ordered set in the data stream.

12. The method of claim 11, wherein each plurality of data queues comprises a first data queue and a second data queue, and storing symbols of each data stream of the plurality of data streams into the plurality of data queues corresponding to the data stream further comprises writing symbols of the data stream alternatively into the first data queue and the second data queue corresponding to the data stream.

13. The method of claim 11, further comprising:
selecting a data rate from a predetermined plurality of data rates; and
deskewing data symbols of the plurality of data streams stored in the data queues based on the skip ordered sets at the selected data rate.

14. The method of claim 13, wherein the predetermined plurality of data rates includes a gen-1 serdes data rate and a gen-2 serdes data rate.

* * * * *